Feb. 12, 1957 R. H. LAWSON ET AL 2,780,931
KNITTING MACHINE AND METHOD
Filed Feb. 13, 1947 30 Sheets-Sheet 1

INVENTORS
Robert H. Lawson &
Paul W. Bristow
BY
ATTORNEYS

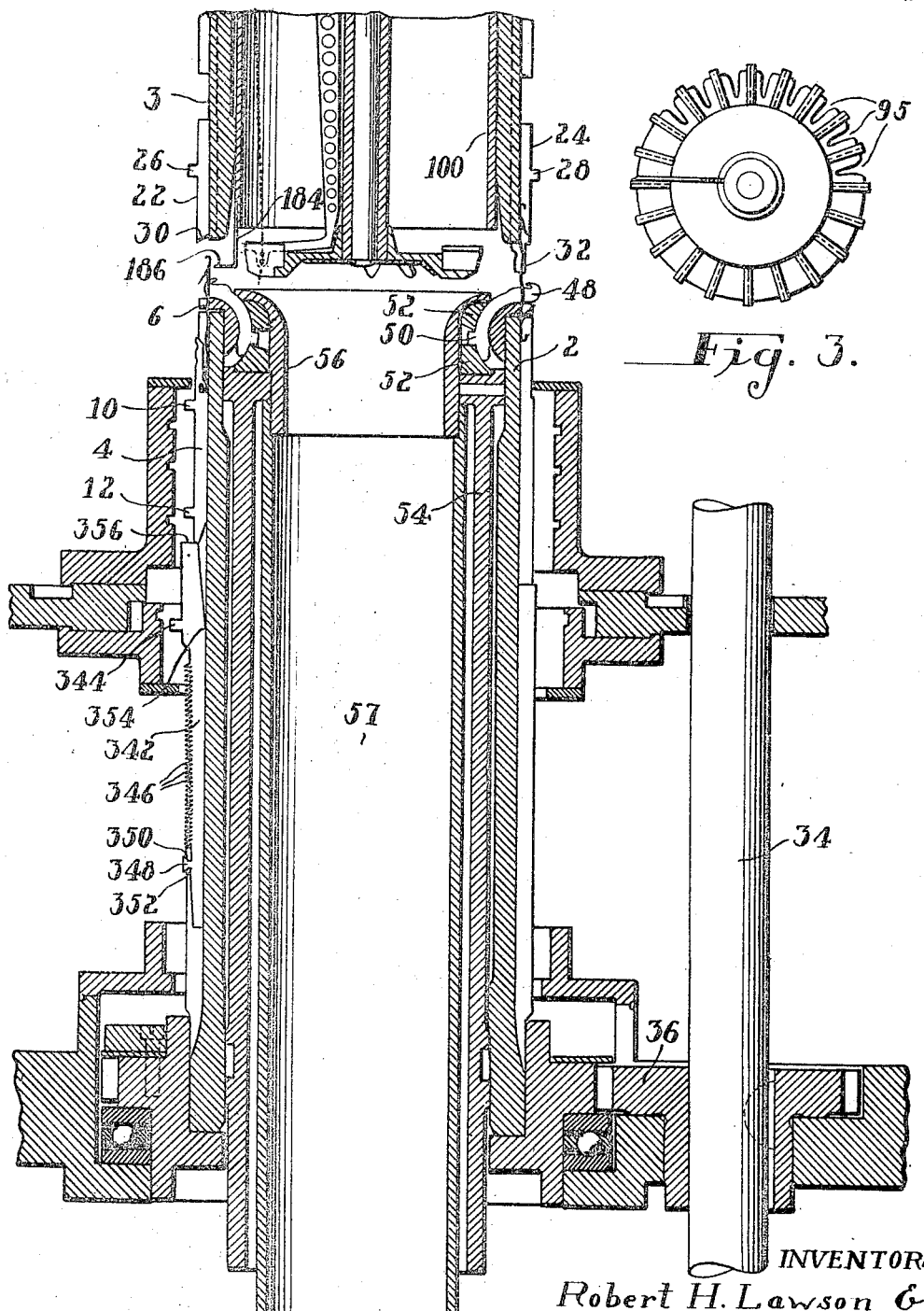

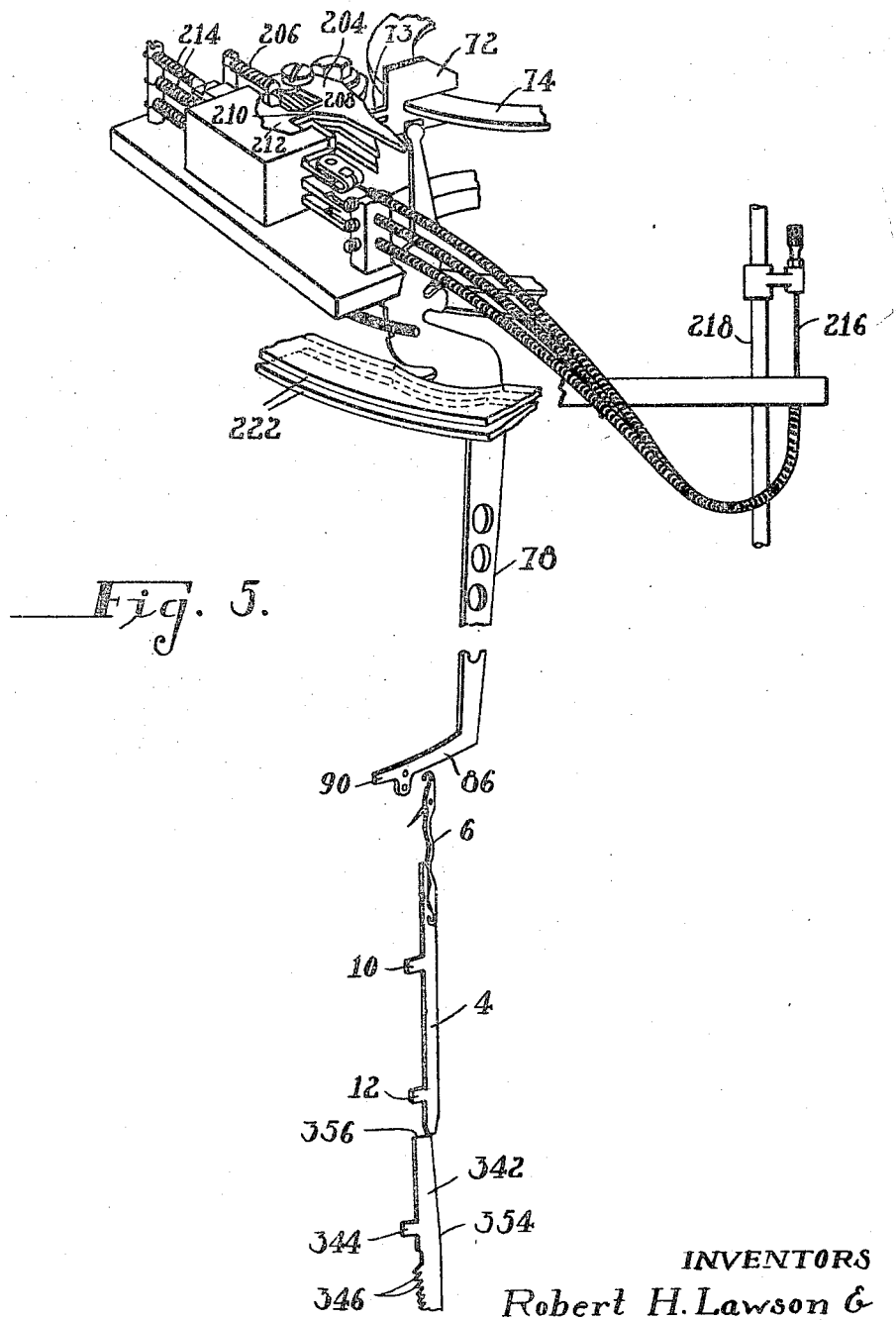

INVENTORS
Robert H. Lawson &
Paul W. Bristow
BY
ATTORNEYS

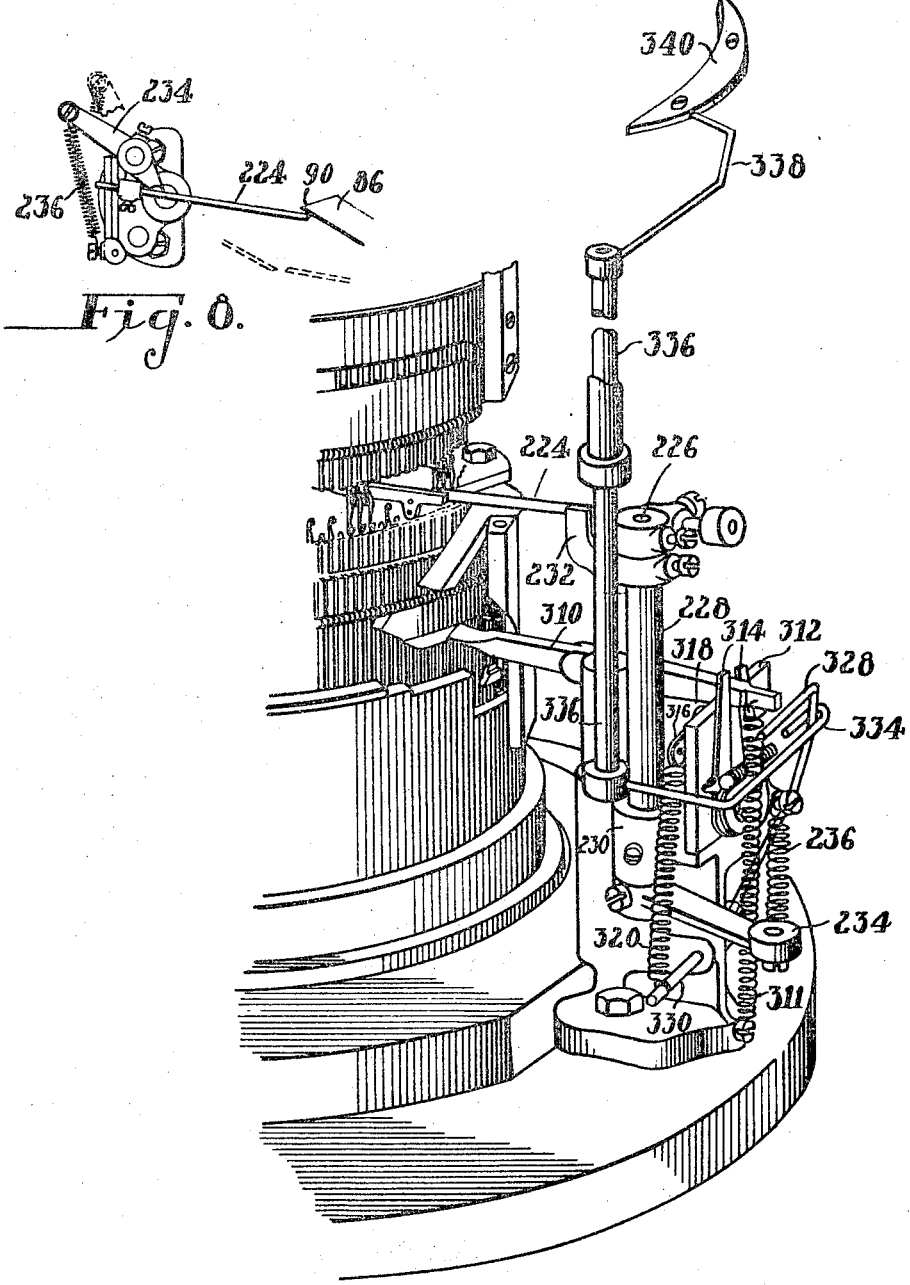

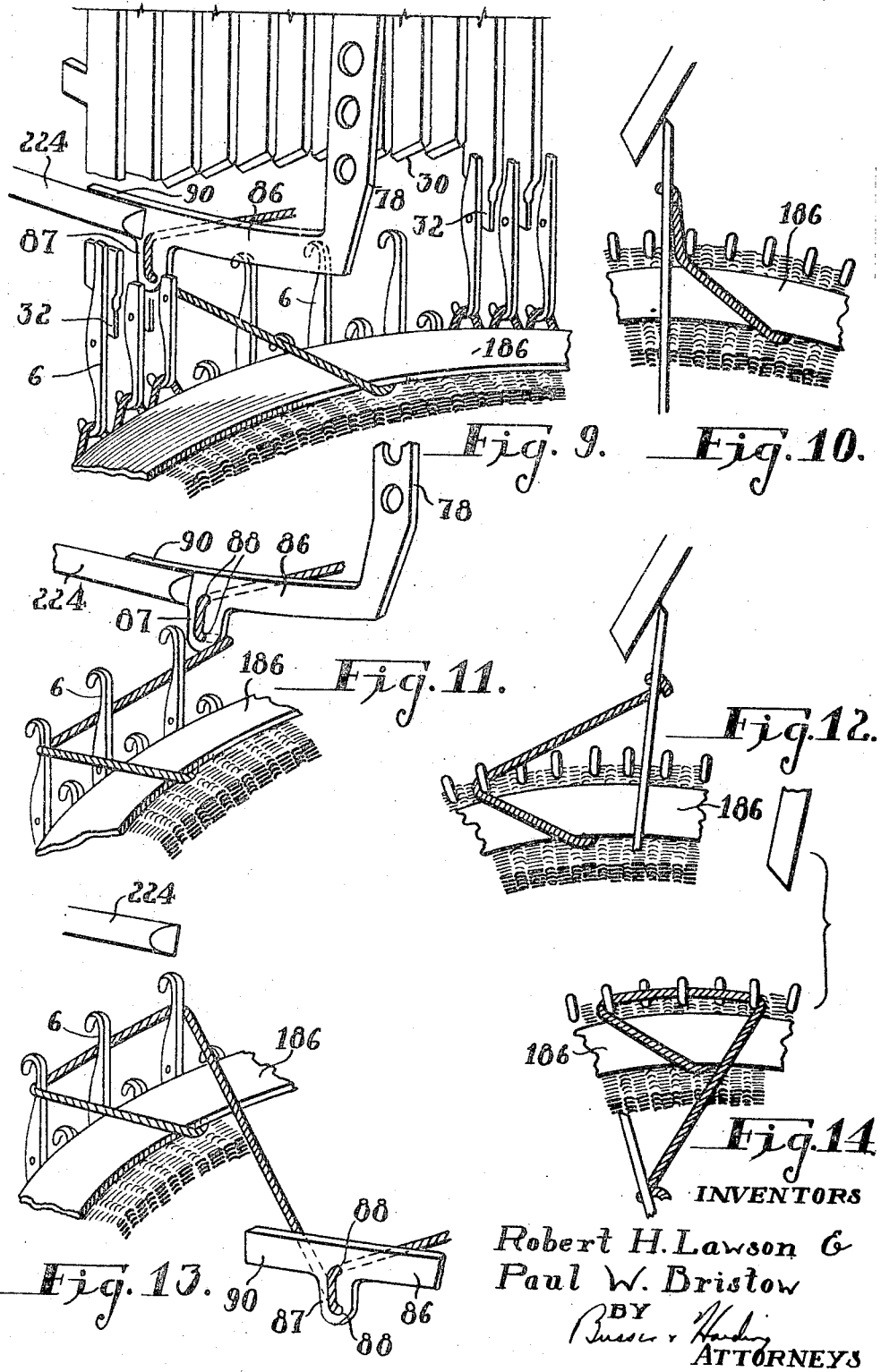

INVENTORS
Robert H. Lawson &
Paul W. Bristow
BY
ATTORNEYS

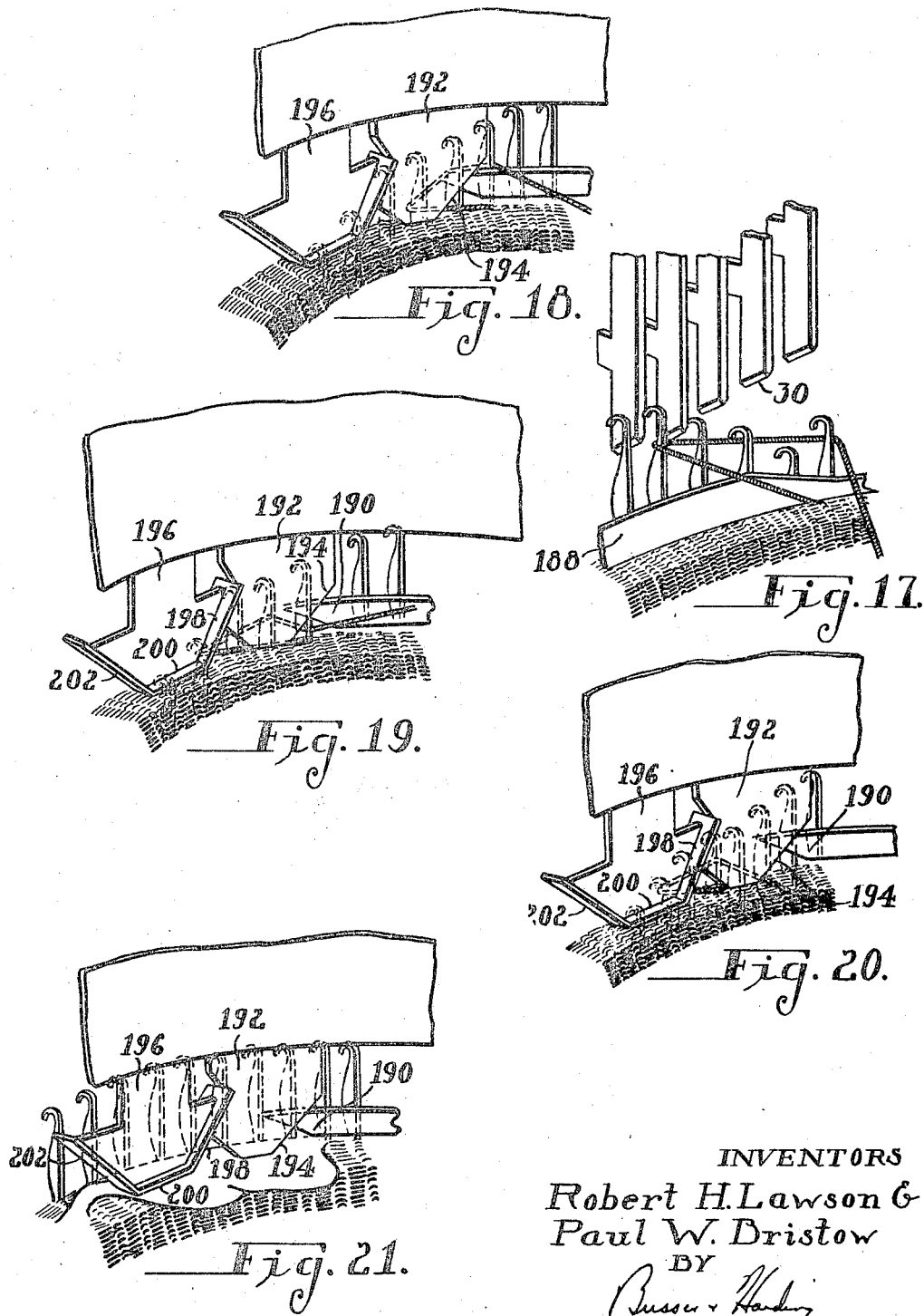

INVENTORS
Robert H. Lawson &
Paul W. Bristow
BY
ATTORNEYS

INVENTORS
Robert H. Lawson &
Paul W. Bristow

INVENTORS
Robert H. Lawson &
Paul W. Bristow
BY
ATTORNEYS

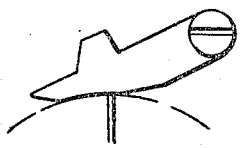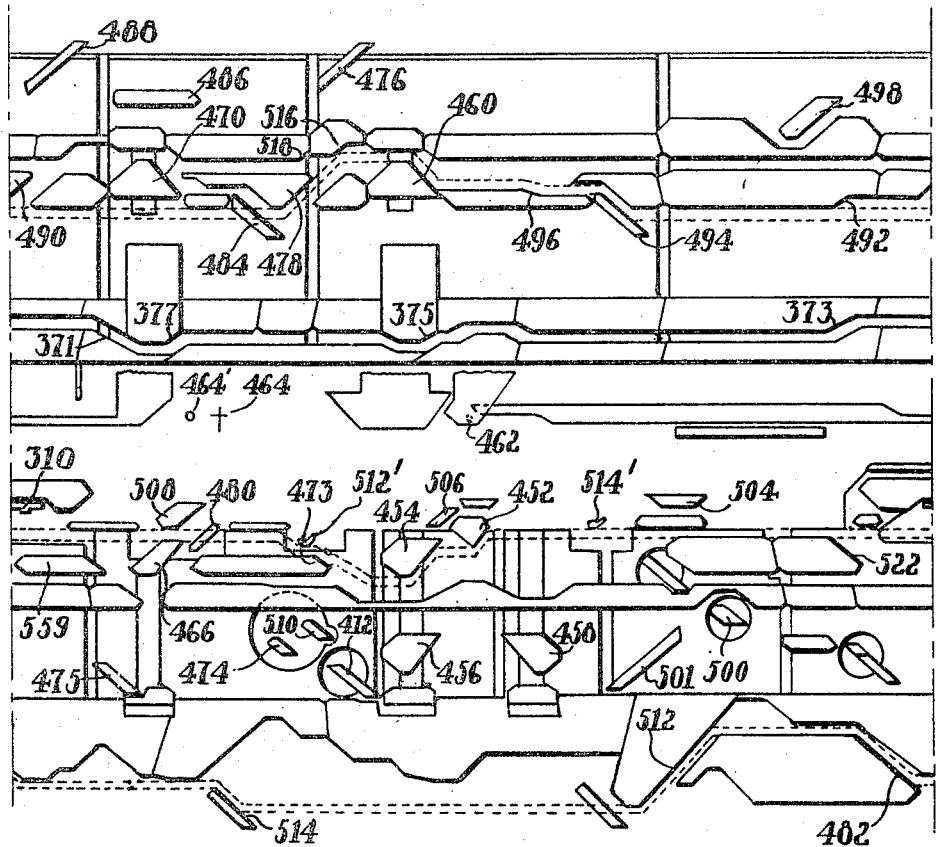
Fig. 31.
INVENTORS
Robert H. Lawson &
Paul W. Bristow
BY
ATTORNEYS INVENTORS
Robert H. Lawson &
Paul W. Bristow
BY
ATTORNEYS Feb. 12, 1957     R. H. LAWSON ET AL     2,780,931
KNITTING MACHINE AND METHOD
Filed Feb. 13, 1947                          30 Sheets-Sheet 16

INVENTORS
Robert H. Lawson &
Paul W. Bristow
BY
ATTORNEYS

Feb. 12, 1957 R. H. LAWSON ET AL 2,780,931
KNITTING MACHINE AND METHOD
Filed Feb. 13, 1947 30 Sheets-Sheet 17
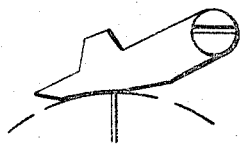
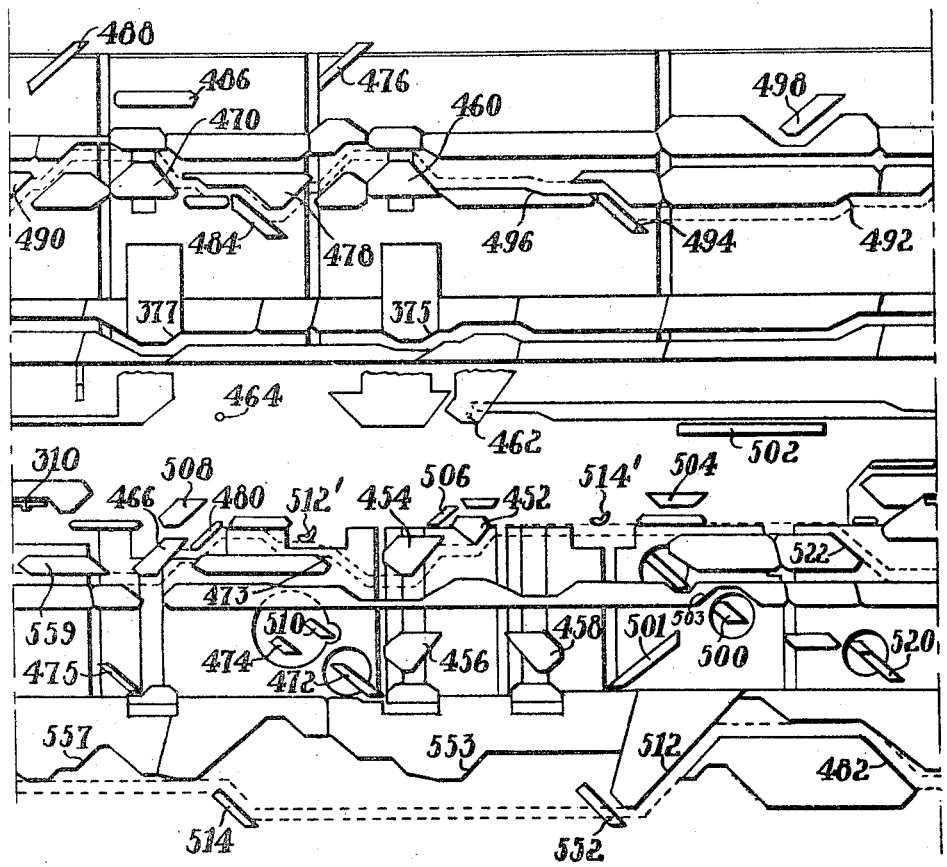
Fig. 37.
INVENTORS
Robert H. Lawson &
Paul W. Dristow
BY
ATTORNEYS INVENTORS
Robert H. Lawson &
Paul W. Bristow
BY
ATTORNEYS Feb. 12, 1957 R. H. LAWSON ET AL 2,780,931
KNITTING MACHINE AND METHOD
Filed Feb. 13, 1947 30 Sheets-Sheet 27

INVENTORS
Robert H. Lawson &
Paul W. Bristow
BY
ATTORNEYS ations February 13, 1947, Serial No. 728,226

United States Patent Office 2,780,931
Patented Feb. 12, 1957

2,780,931

KNITTING MACHINE AND METHOD

Robert H. Lawson and Paul W. Bristow, Laconia, N. H., assignors to Scott & Williams, Incorporated, Laconia, N. H., a corporation of Massachusetts Application February 13, 1947, Serial No. 728,226

70 Claims. (Cl. 66—14)

This invention relates to a knitting method and machine and the products thereof and has particular reference to the type of machine comprising superposed needle cylinders and means for effecting panel wrapping therein although it will be understood that certain features of the invention are not limited to this type of machine.

One of the general objects of the present invention is the provision of an improved method and mechanism for knitting heels and toes particularly in conjunction with wrapping or other pattern formation in the same stocking, the method of knitting the heels and toes permitting continuity of the wrapping or other patterning without interruption through the instep of the stocking.

A further object of the invention relates to improvements in the method and mechanism for selection of needles for wrapping and in the control of wrap fingers.

Still another object of the invention relates to an improved method of wrapping needles accomplished before clearing their latches of the loops of a previous course.

Another object of the invention is the provision of controls whereby knitted fabrics, and specifically stockings, may be provided with elaborate structural and color patterns.

A further object of the invention relates to methods and means for providing pull courses for the separation of stockings or other tubular knitted products made serially in continuous fashion.

A further object of the invention is the provision of an improved type of jack for control of needles and the selections and handling of these jacks for needle control. In particular, a cross-over action is achieved which makes possible elaborate patterning as will become clear hereafter.

Another object of the invention is the provision of stitch cams for the control of needles during rotary and reciprocatory knitting in such fashion as to prevent the stretching of stitches carried by inactive needles during pocket formation.

Another object of the invention involves an improved butt arrangement for control of needles and in particular the formation of narrow heels comprising less wales than those involved in toe formation.

A further object of the invention is the provision of fabrics and stockings of novel types producible by the machine and in accordance with the methods hereafter outlined.

These and other objects of the invention particularly relating to details of construction and operation will become apparent from the following description read in conjunction with the accompanying drawings in which:

Figure 3 is a view showing in plan the means for positioning the lower end of a wrap yarn guide, one of which is illustrated in section;

Figure 4 is an axial section showing the needles and the parts in the vicinity thereof and directly cooperating therewith and showing the construction of the lower cylinder and its associated parts;

Figure 5 is a diagrammatic perspective view showing in particular the needle controlling means and the wrap yarn guide controlling means;

Figure 7 is a perspective view showing in particular the abutment for the wrap yarn guide and the lowering pick and the means for controlling the same;

Figure 8 is a fragmentary plan view showing the yielding action of the abutment;

Figure 9 is a perspective view illustrating the beginning of a wrapping operation and the initial engagement of a wrap yarn guide with the abutment;

Figure 10 is a fragmentary plan view of the same event;

Figure 11 is a perspective view similar to Figure 9 but showing a later event in the needle wrapping operation;

Figure 12 is a fragmentary plan view of the last mentioned matter;

Figure 13 is a further view similar to Figure 9 but showing the completion of a needle wrapping operation;

Figure 14 is a fragmentary plan view of the parts in the condition of Figure 13;

Figures 15, 16:
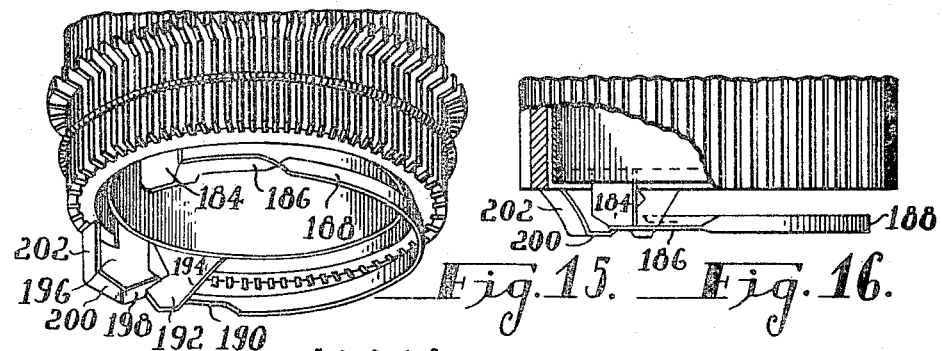
Figure 15 is a perspective view.
Figure 16 is an elevation, partly broken away, of certain elements cooperating with the wrap yarns and the fabric.
Figure 30:
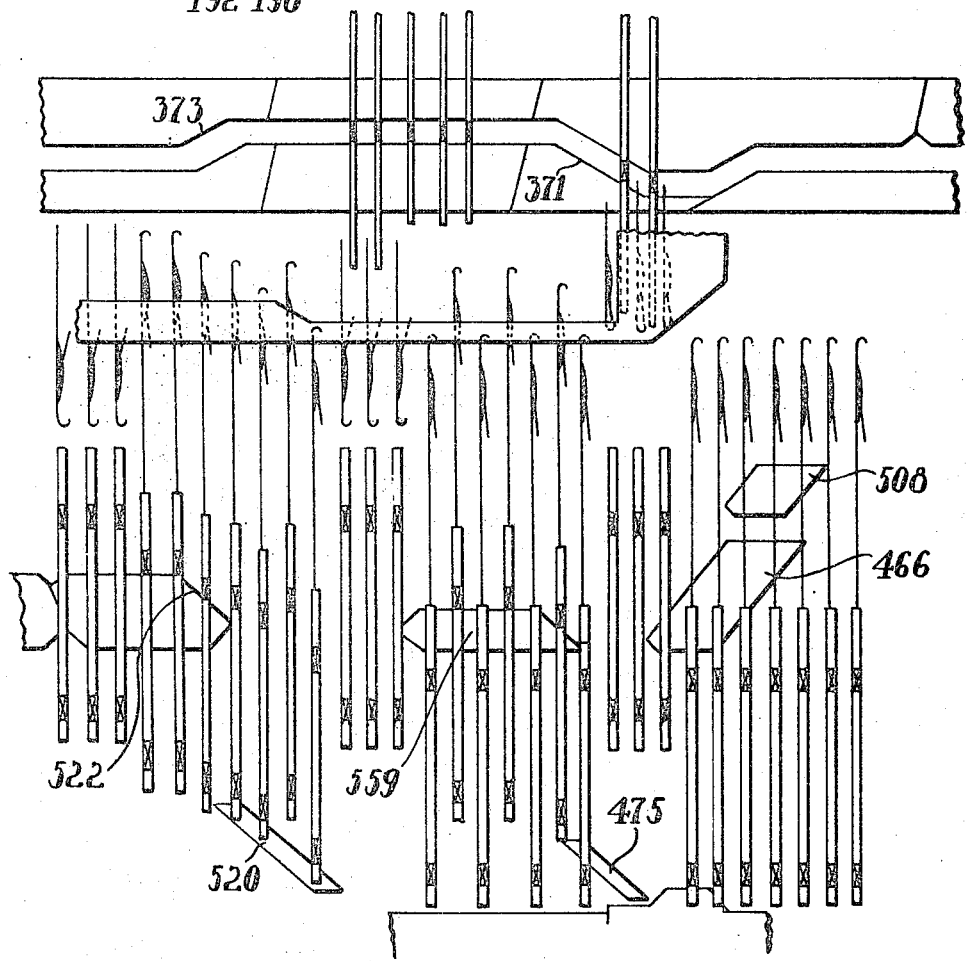
Figure 22:
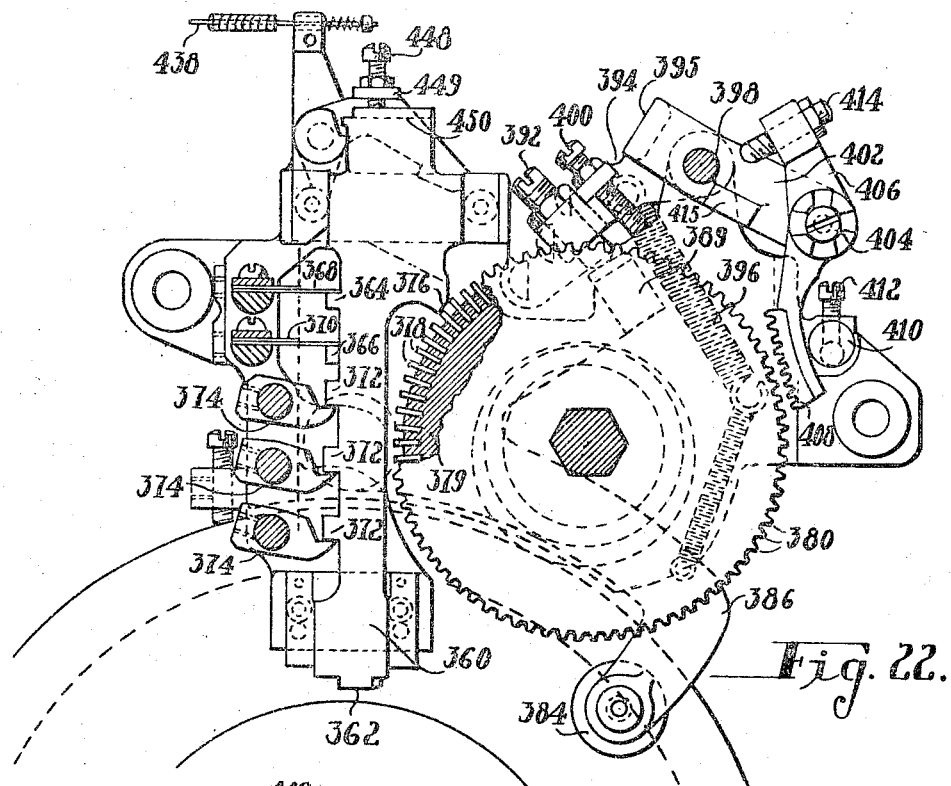
Figure 23:
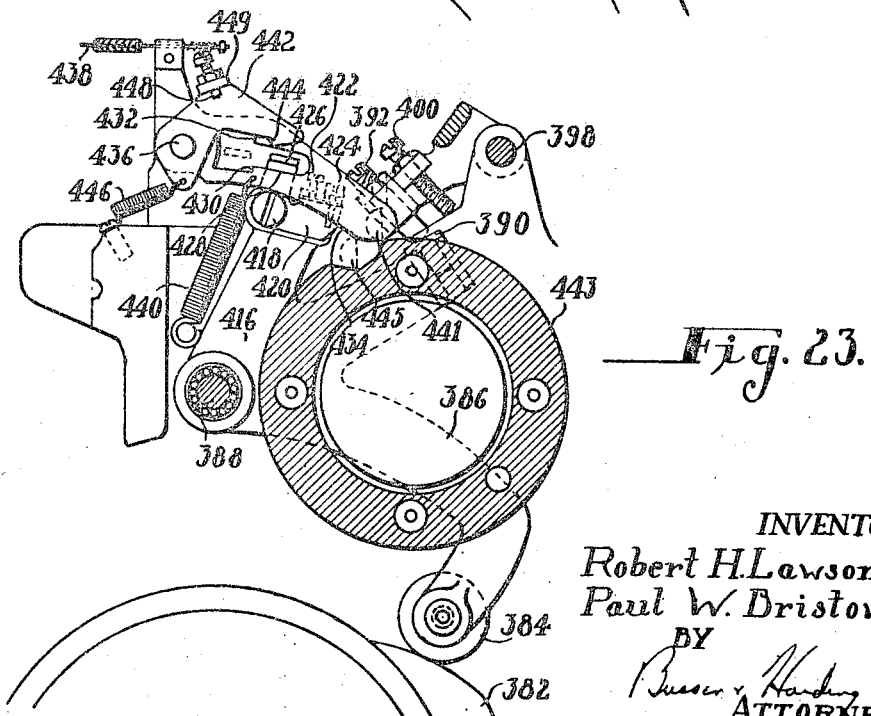
Figures 24, 25:
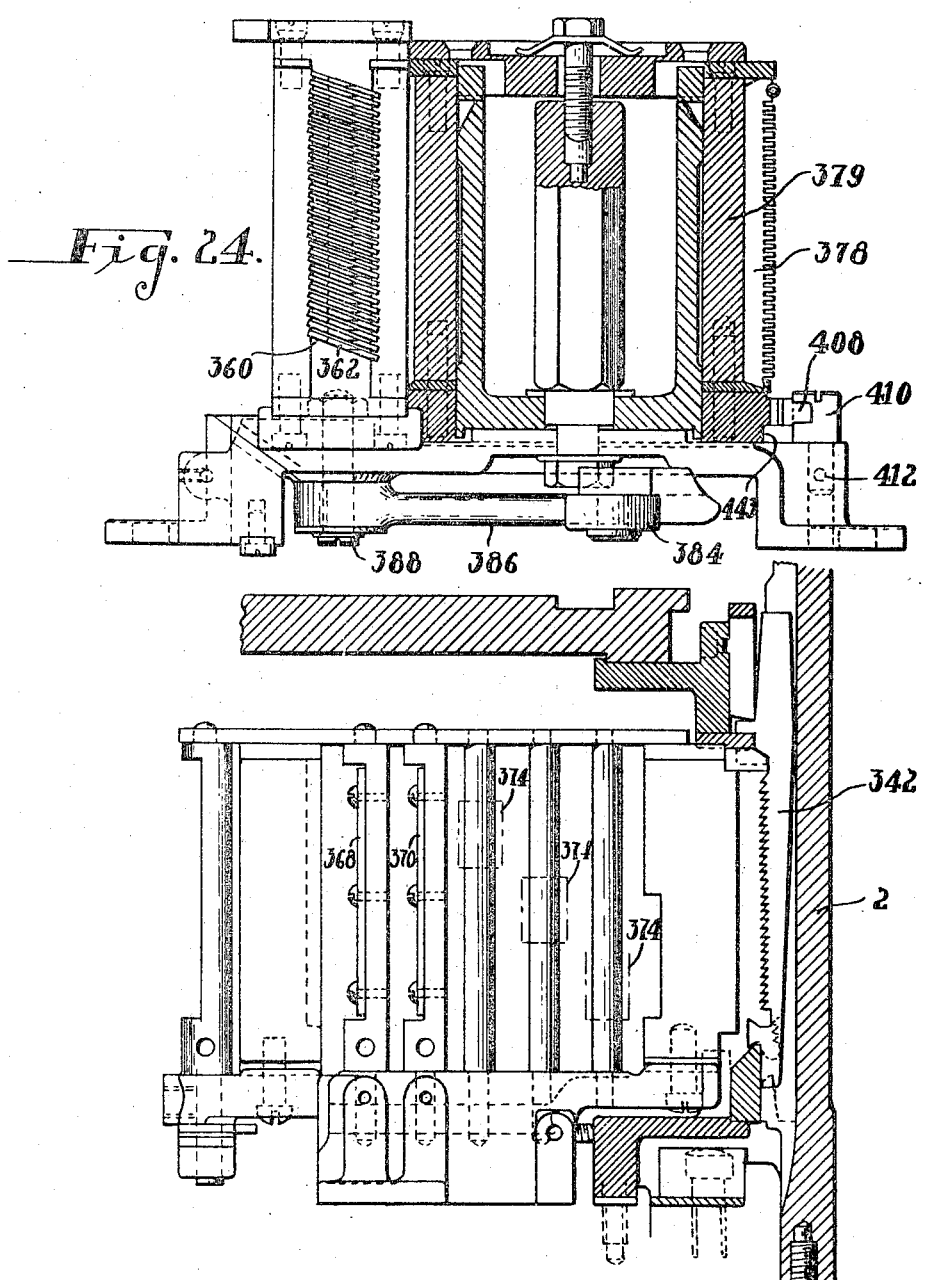
Figure 26:
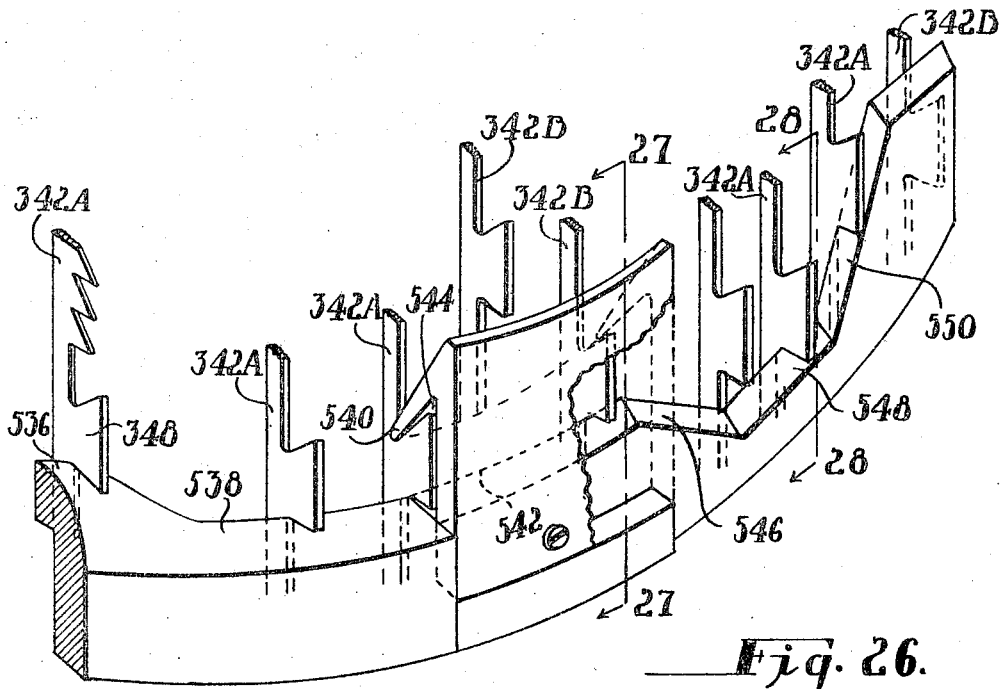
Figures 27, 28, 29:
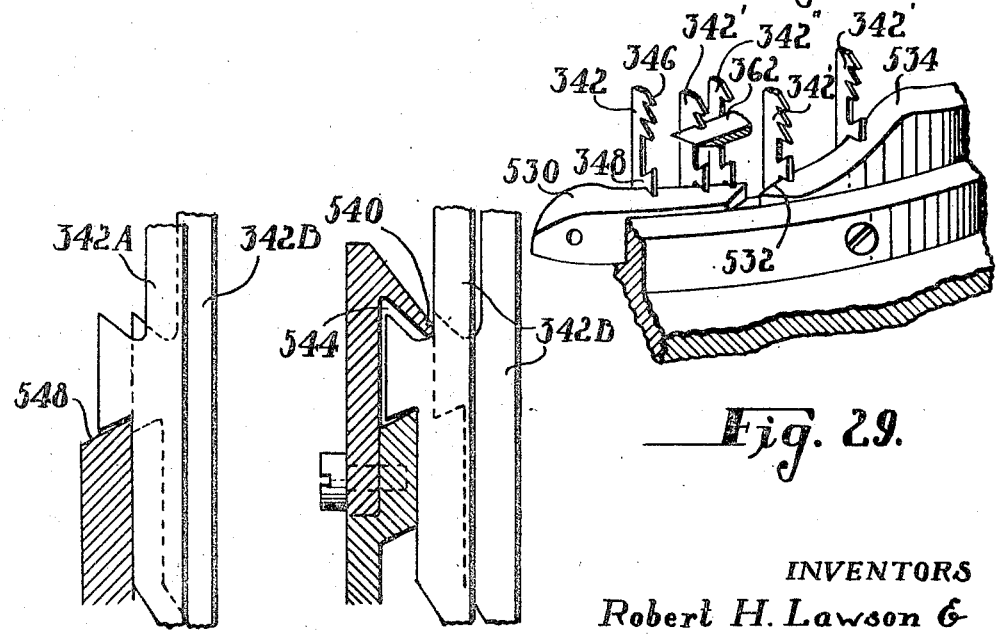
Figure 32:
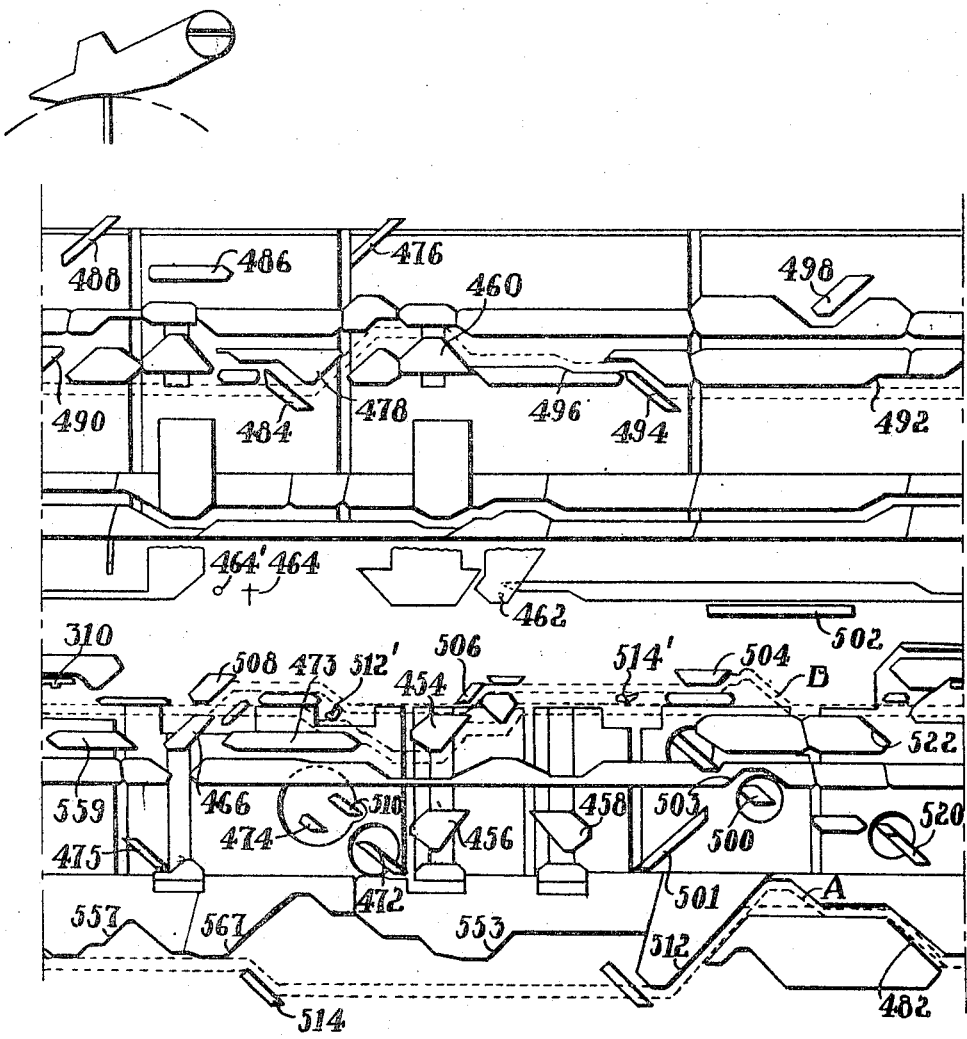
Figure 33:
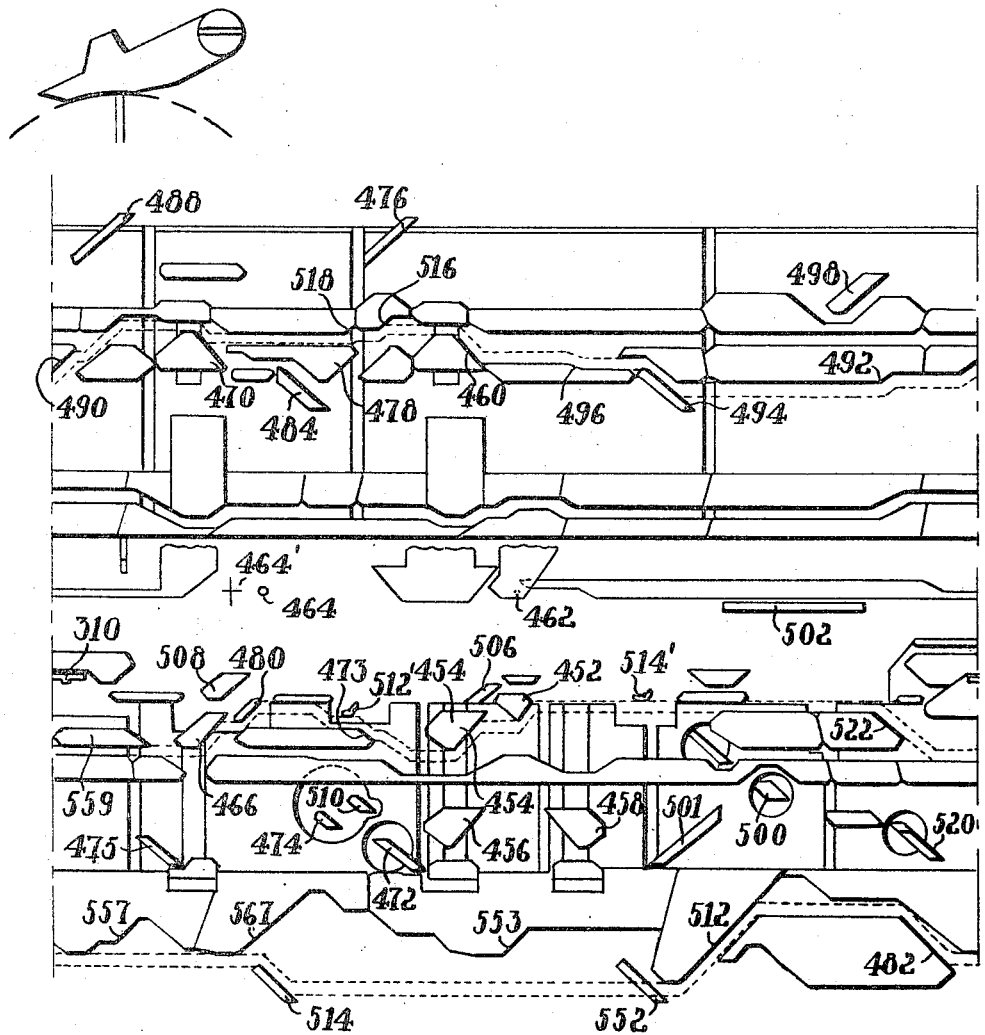
Figure 34:
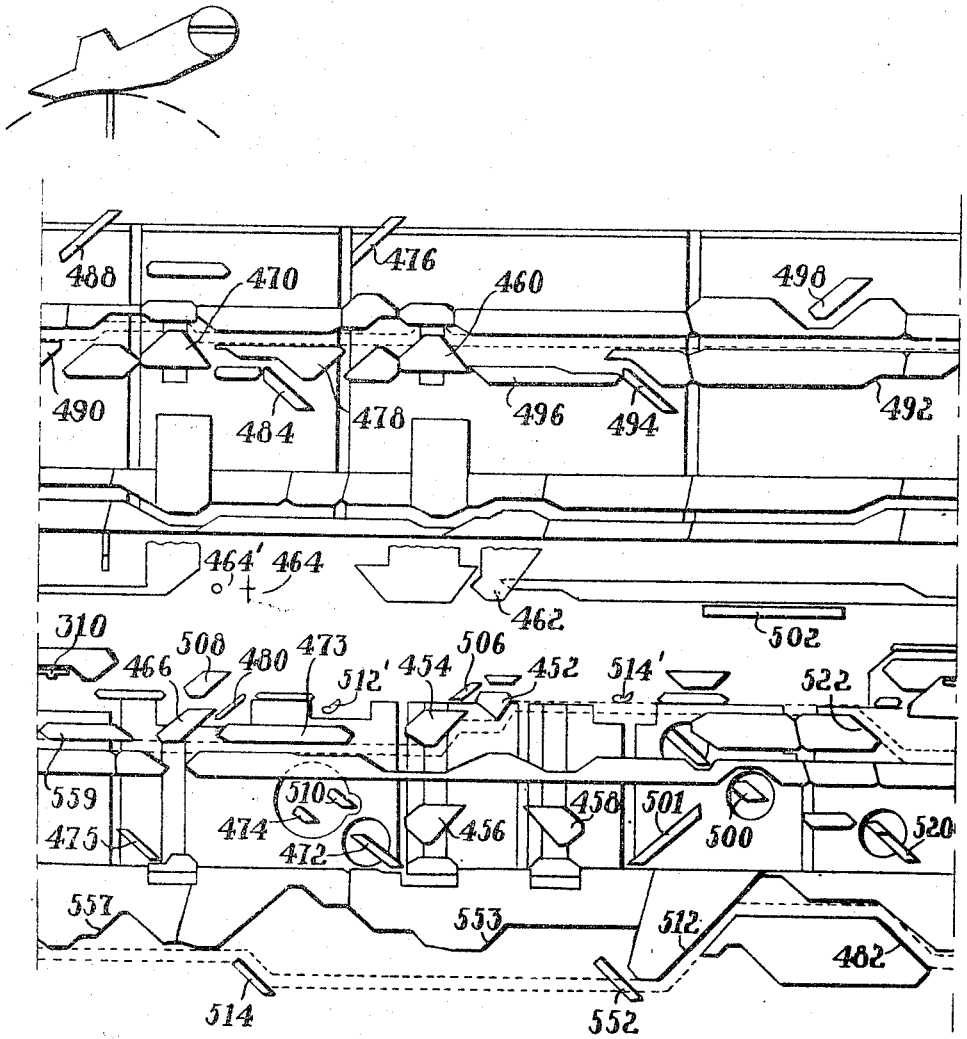
Figure 35:
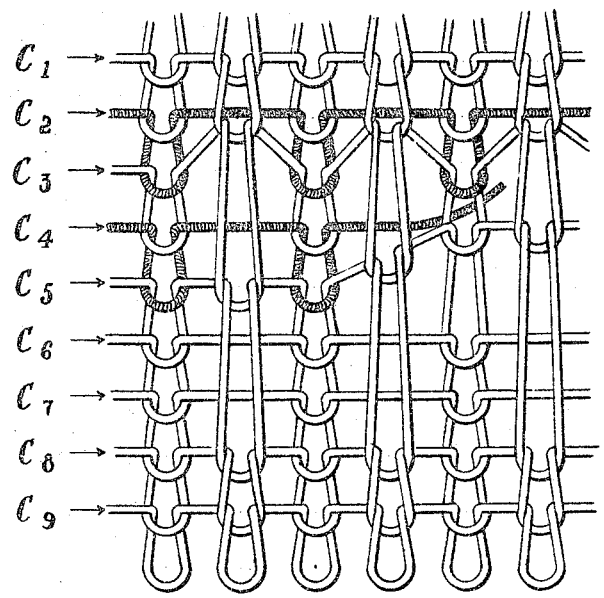
Figure 36:
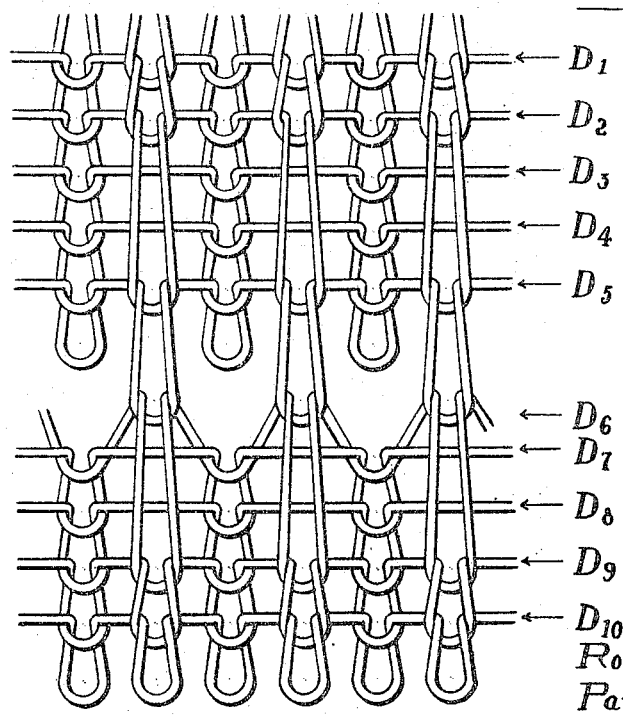
Figure 30:
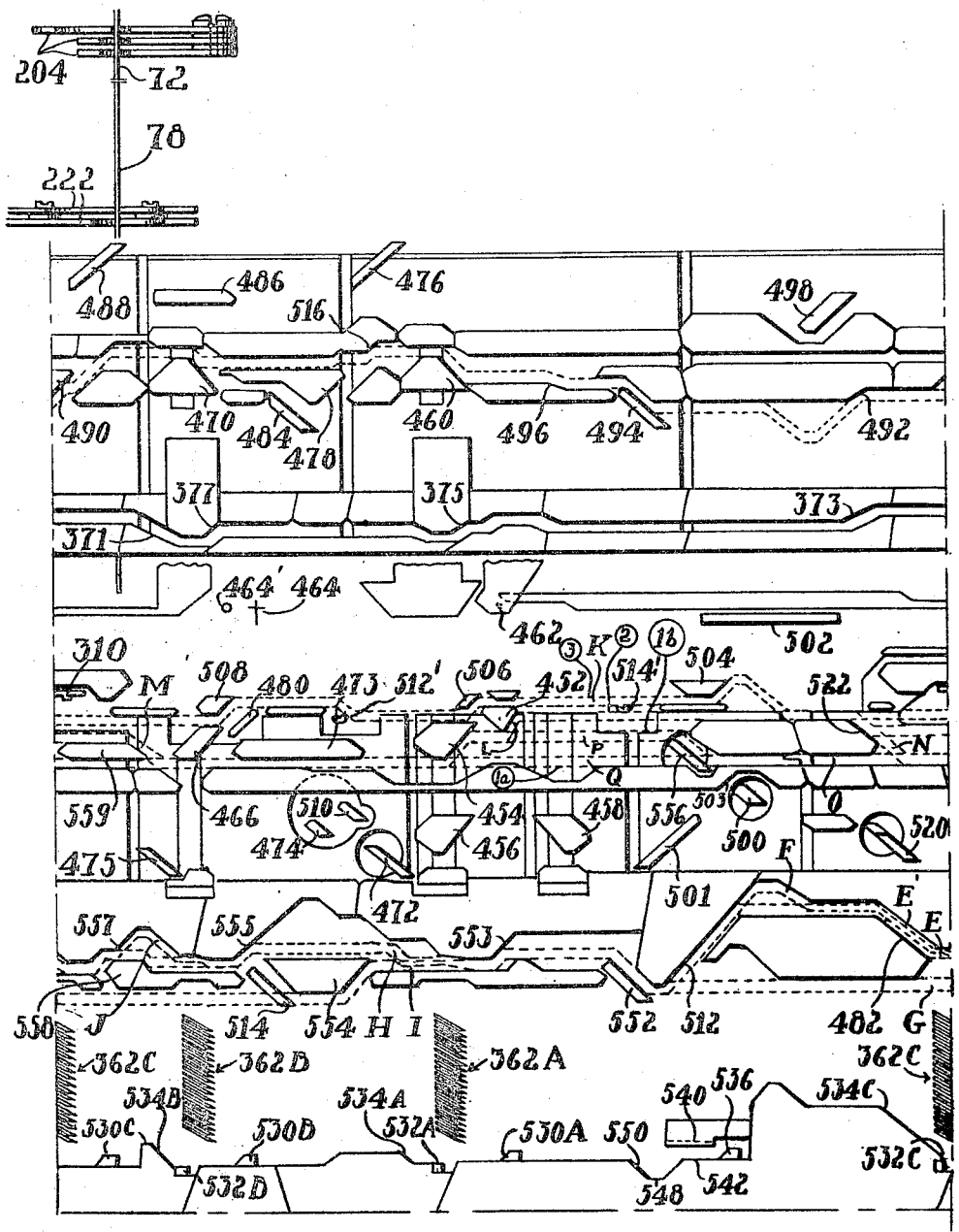
Figure 39:
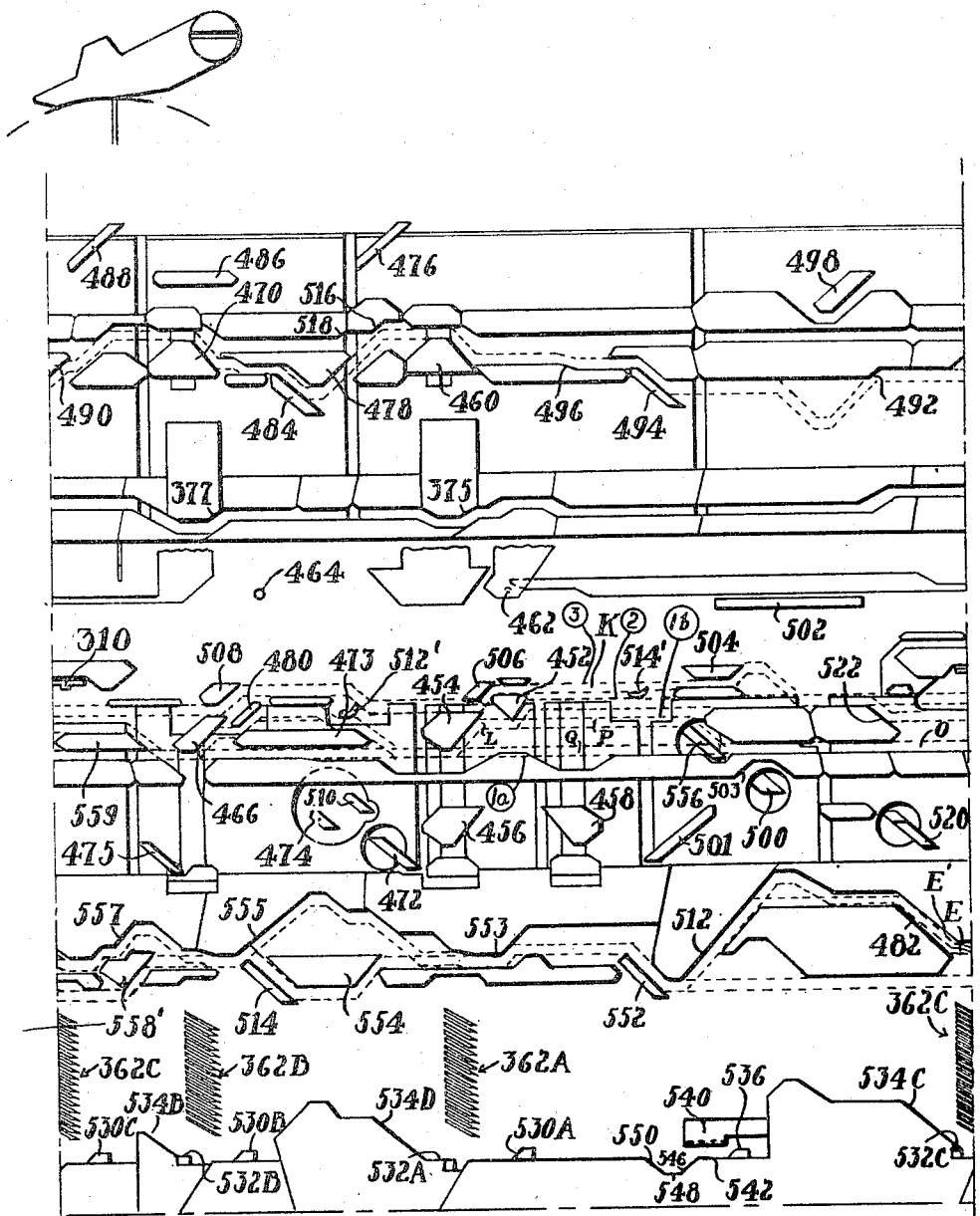
Figure 40:
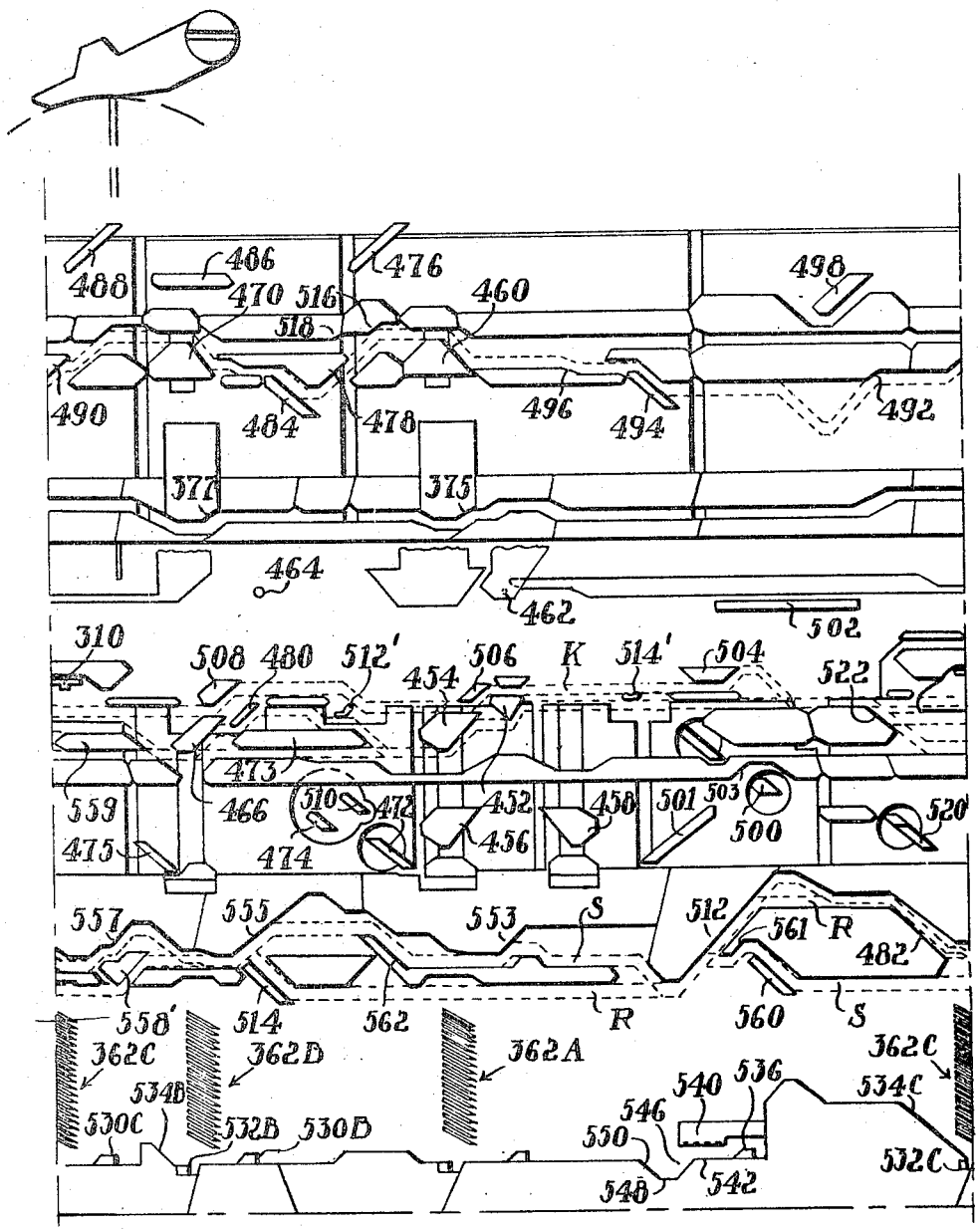
Figure 41:
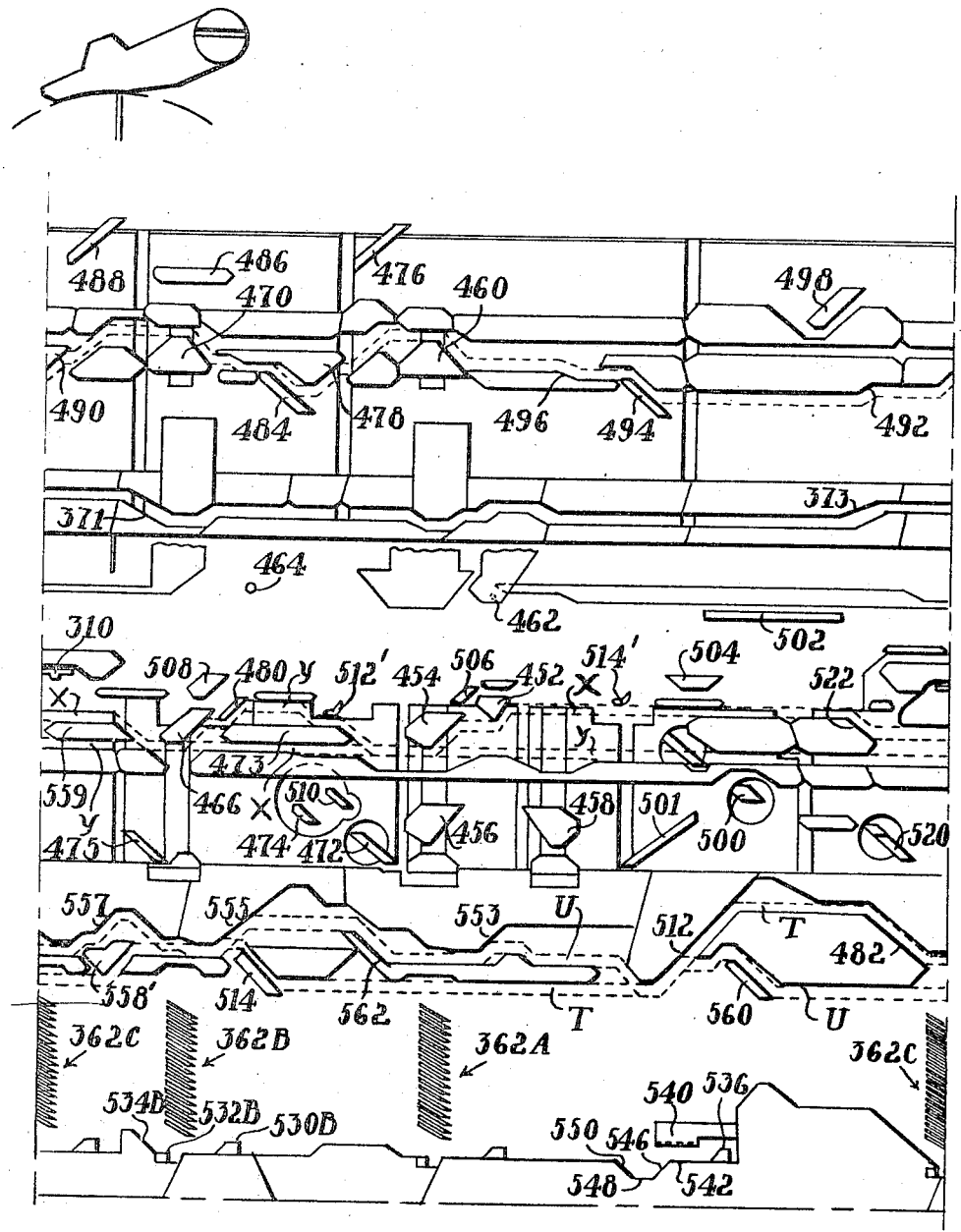
Figure 42:
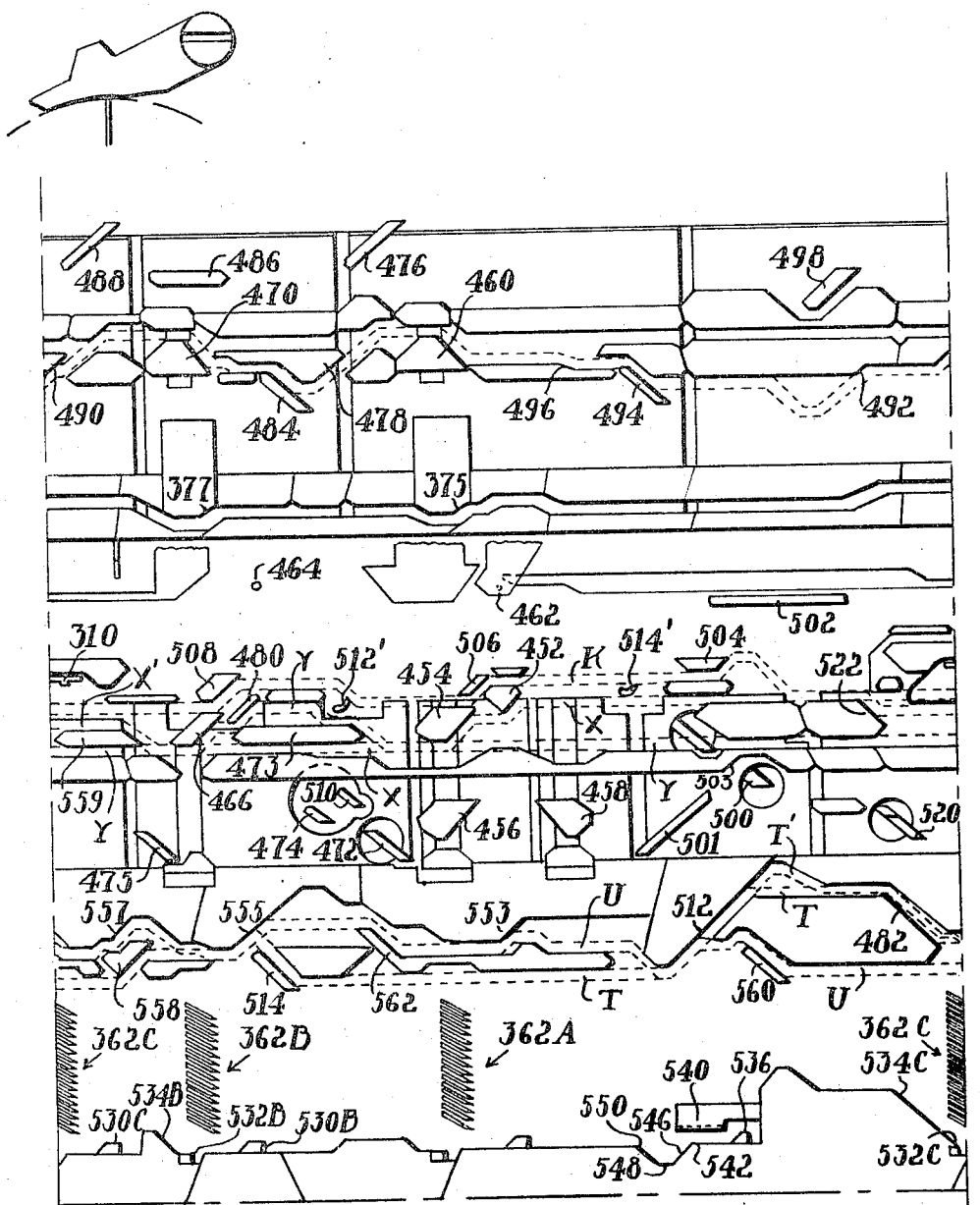
Figure 43:
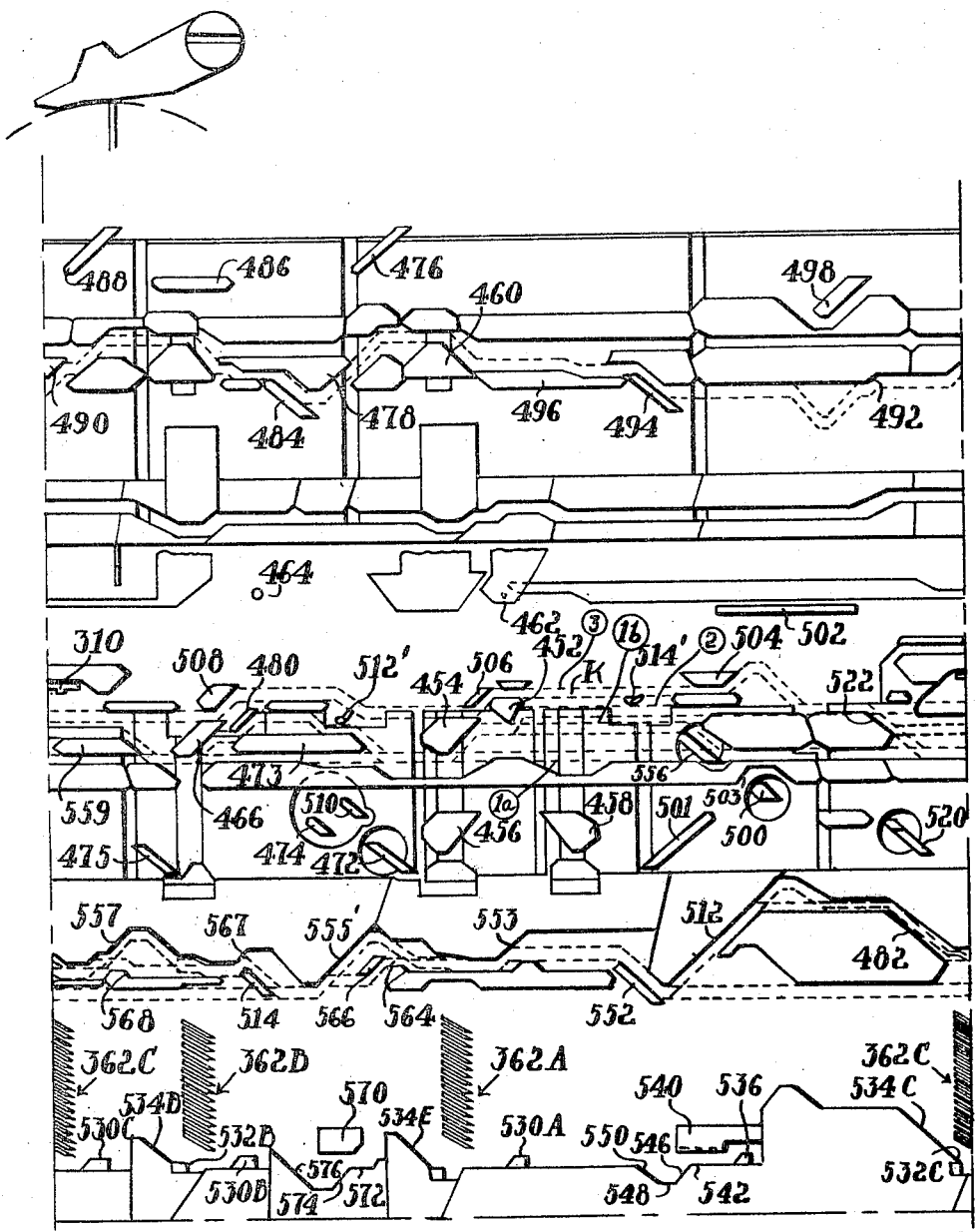
Figure 44:
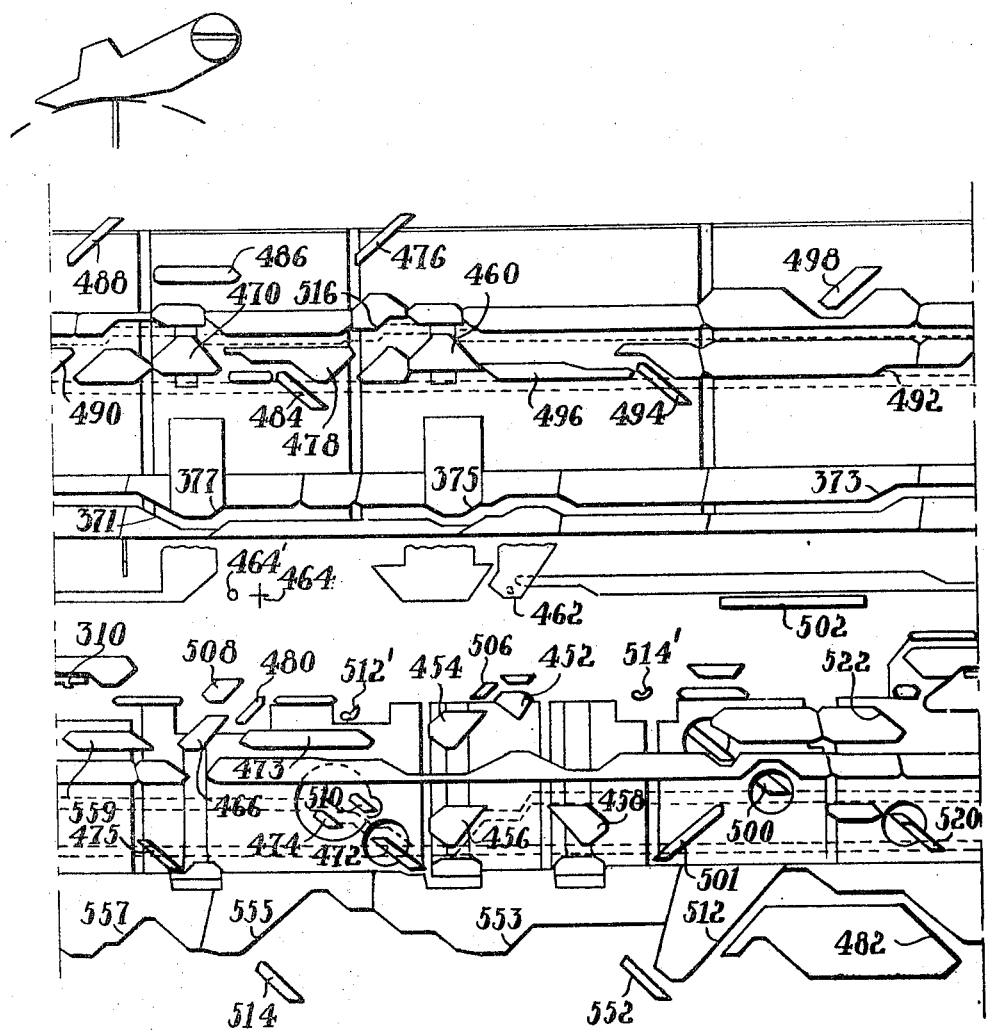
Figure 50:
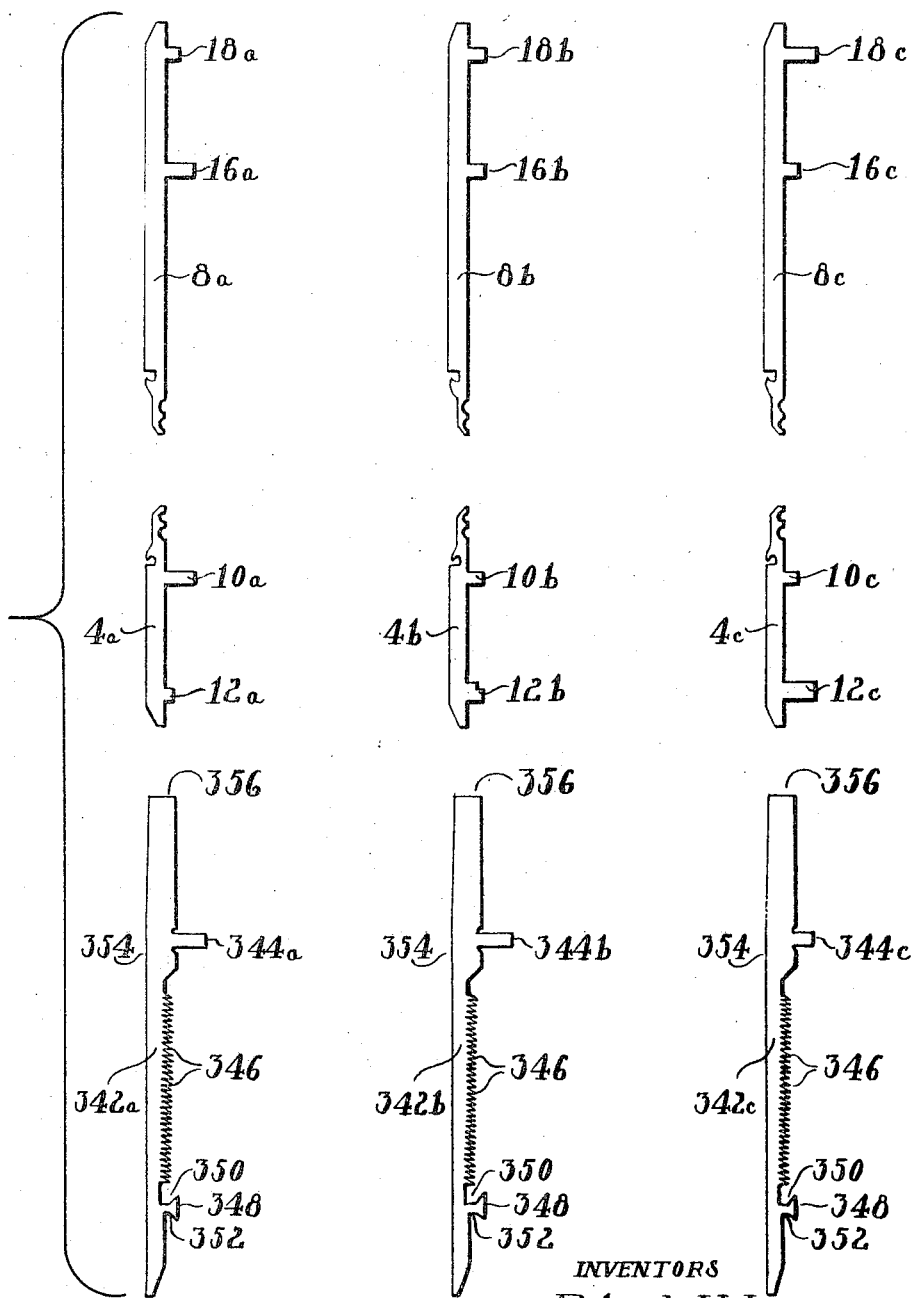
Figure 52:
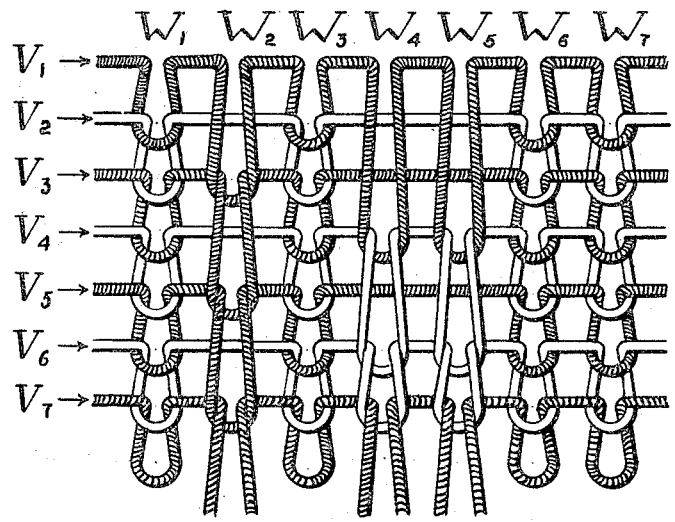
Figure 51:
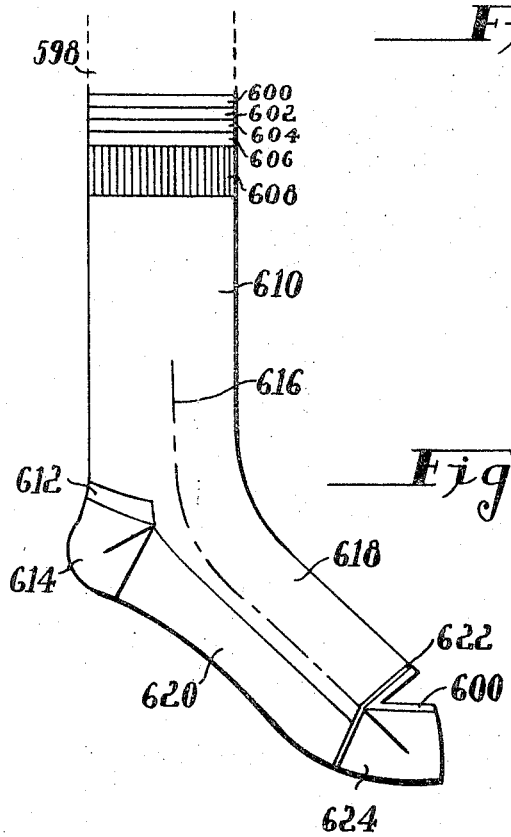
Figure 53:
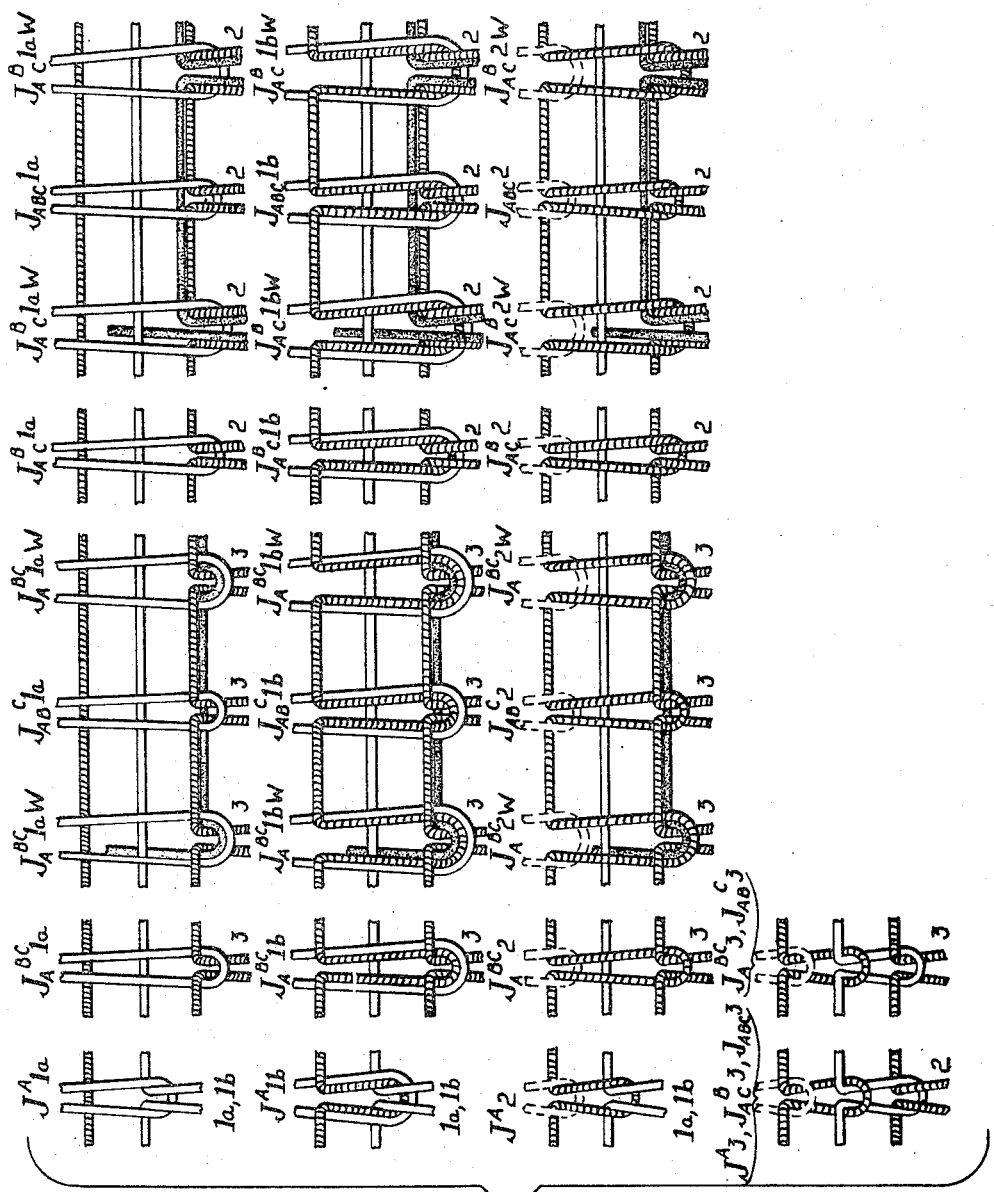
Figure 54:
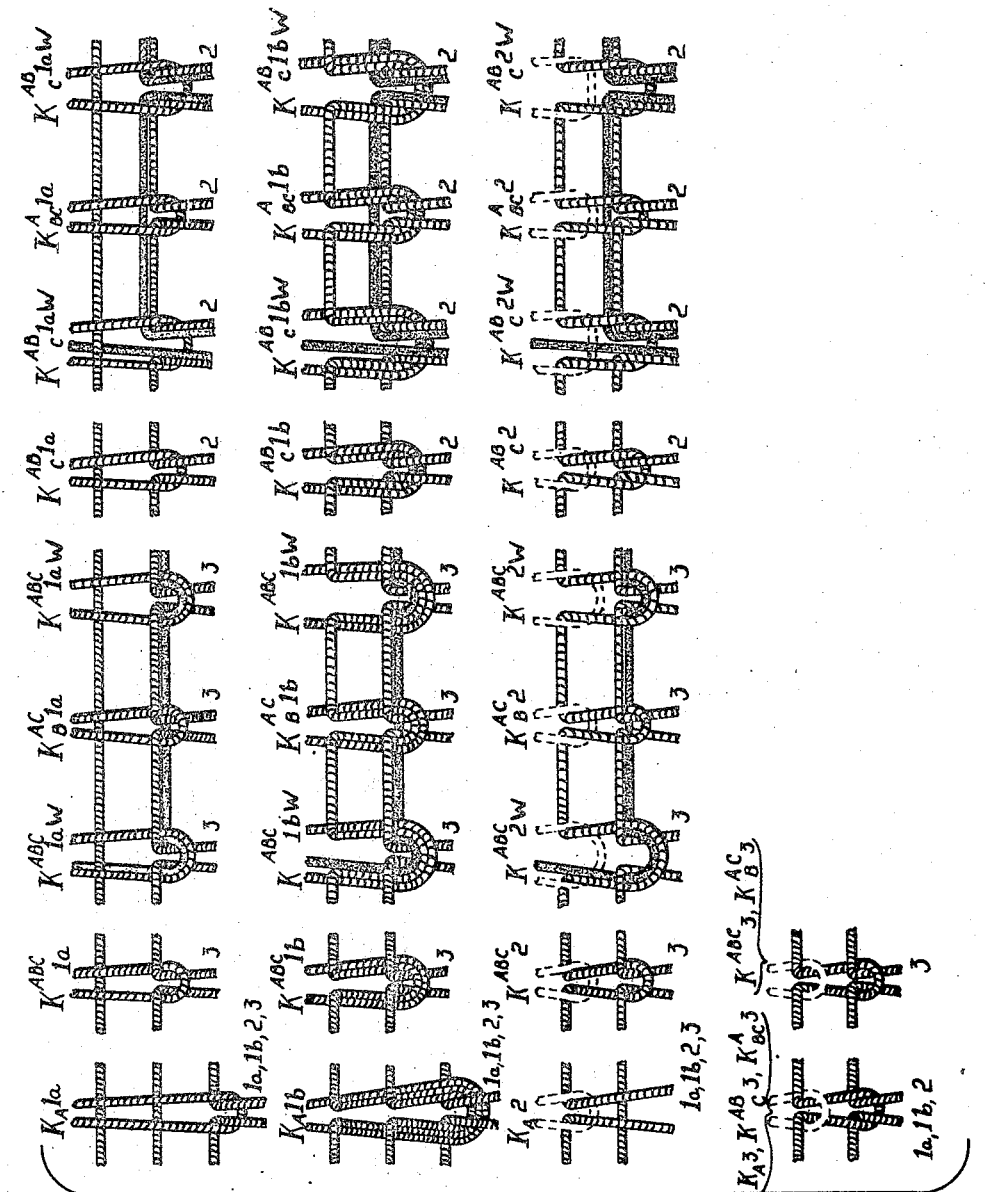
Figure 55:
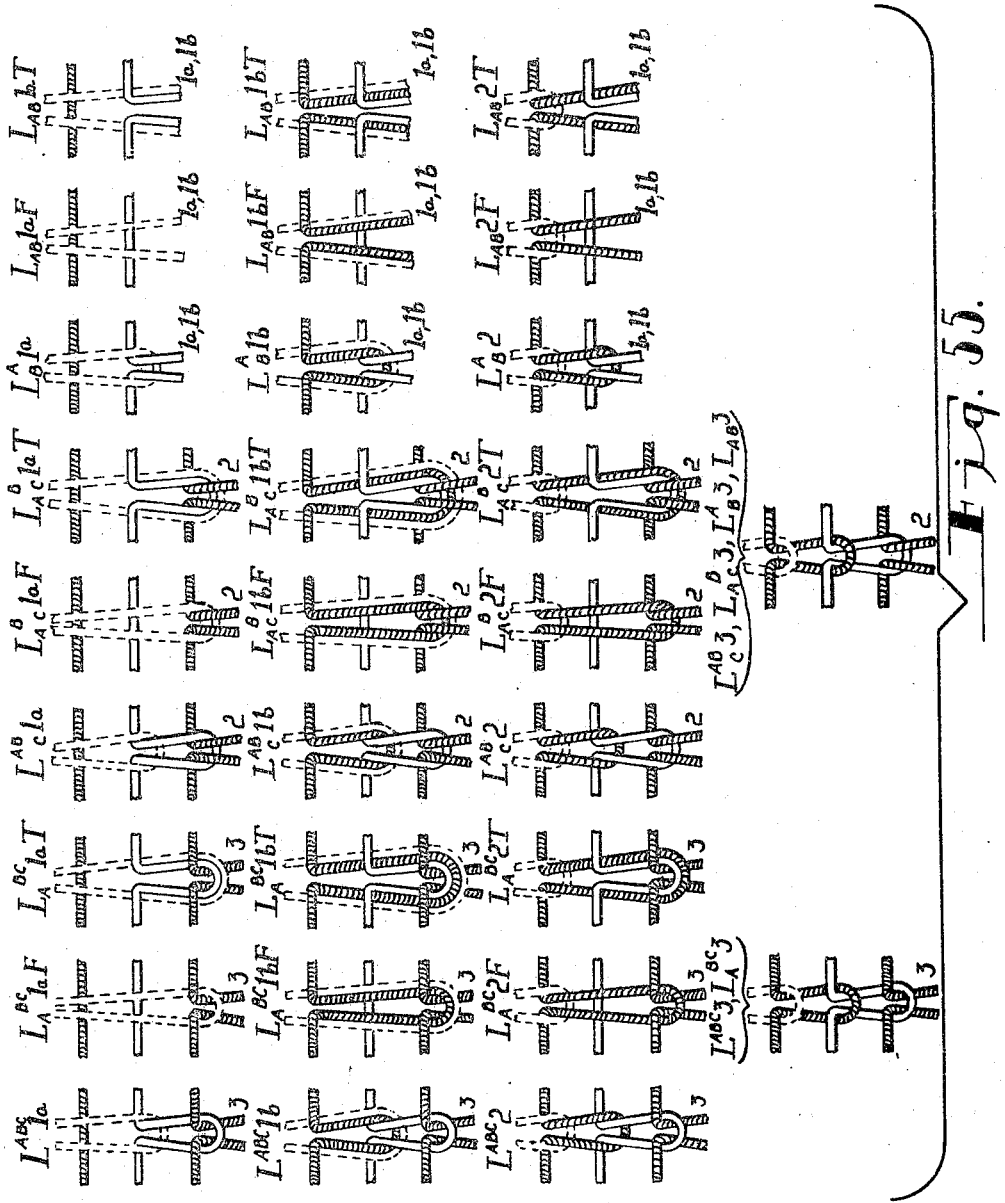

Figures 17 to 21, inclusive, are perspective views illustrating the functions of the elements of Figures 15 and 16;

Figure 22 is a plan view of the jack selecting devices including a trick wheel and the operating means therefor;

Figure 23 is a fragmentary sectional view showing various elements of the trick wheel advancing mechanism;

Figure 24 is a view partly in elevation and partly in section showing the same devices as in Figure 22;

Figure 25 is an approximately radial section showing the same devices associated with the lower cylinder;

Figure 26 is a perspective diagram illustrating the crossover operation of the saw tooth jacks;

Figure 27 is a section taken on the radial plane indicated at 27—27 in Figure 26;

Figure 28 is a section taken on the radial plane indicated at 28—28 in Figure 26;

Figure 29 is a perspective diagram illustrating jack selection;

Figure 30 is a diagrammatic view illustrating in particular the control of needles in a wrapping operation;

Figure 31 is a developed view of the cams of the machine showing the slider paths during the formation of the looper's waste courses, single feed, plain fabric being formed with all needles in the lower cylinder;

Figure 32 is a similar cam development illustrating the transfer to 1 x 1 rib formation;

Figure 33 is a similar cam development showing the slider paths during the formation of the usual type of draw thread;

Figure 34 is a similar cam development showing the formation of a welt;

Figure 35 is a conventionalized diagram showing, looking at the inside of the fabric, the structure of a portion of a stocking involving the usual type of draw thread;

Figure 36 is a similar diagram but involving the structure of a press-off draw thread;

Figure 37 is a development of that cams illustrating the formation of two feed 1 x 1 rib fabric;

Figure 38 is a similar development illustrating single feed formation of a portion of a stocking involving wrapping, links and links, and tuck or float formation;

Figure 39 is a similar development illustrating two feed formation of a portion of a stocking involving tucking or floating at both feeds and links and links;

Figure 40 is a similar development illustrating two feed formation of a portion of a stocking involving wrapping and links and links;

Figure 41 is a similar development illustrating two feed formation of a portion of a stocking involving cross-over rib patterning;

Figure 42 is a similar development illustrating two feed formation of a portion of a stocking involving panels of links and links or rib structure in a fabric having cross-over rib patterning;

Figure 43 is a similar development illustrating two feed formation of a portion of a stocking involving wrapping and panels of plain rib or links and links structure in a fabric having cross-over rib patterning;

Figure 44 is a similar development illustrating the formation of heels and toes;

Figures 45 to 49, inclusive, are developments of certain of the cams associated with the lower cylinder illustrating formation of a heel;

Figure 50 is a diagram illustrating the butt arrangements of the upper and lower sliders and the jacks;

Figure 51 is a diagram showing the parts of a typical stocking knit by the present machine and method;

Figure 52 is a conventionalized diagram showing, as viewed from the outside, a portion of a stocking involving cross-over rib patterning;

Figure 53 is a diagram illustrating the portion of a stocking in which patterning is accomplished in accordance with operation of the machine with the cam arrangements and control depicted in Figure 43, the diagram showing various stitch formations combinable in a wide variety of fashions to achieve elaborate designs;

Figure 54 is a diagram similar to Figure 53 but showing the stitch formations achieved by the cam arrangements and controls depicted in Figure 38; and Figure 55 is a diagram similar to Figure 53 but showing the stitch formations achieved by the cam arrangements and controls depicted in Figure 39.

The knitting machine embodying the inventions indicated above is of the superposed cylinder type comprising a lower cylinder 2 and an upper cylinder 3. Arranged to slide in slots in the lower cylinder are sliders 4 adapted to engage the lower hooks of double hook latch needles 6, the upper hooks of which are engageable by sliders 8a, 8b and 8c in the upper cylinder (see Figure 50).

The lower sliders 4 are provided with butts at two levels 10 and 12 as hereafter more fully described. The upper sliders 8 are provided with butts at two levels, at a lower level 16a, 16b, 16c and at an upper level 18a, 18b, 18c, as shown in Figure 50. The cylinders are preferably provided with inserted fixed walls to define the slots for reception of the sliders and these walls 20 in the case of the upper cylinder terminate substantially above its lower end so that the lower portions of the slider slots are bounded not by stationary walls but by movable walls of two alternative forms arranged to slide in the wall slots in the upper cylinder. One set of these indicated at 22 carry butts 26 and are provided with outwardly and downwardly sloping lower ends as indicated most clearly at 30 in Figure 9. The other slidable walls indicated at 24 are provided with butts 28 and have verge bit extensions such as indicated at 32 in Figure 9. The arrangement and functions of these lower ends 30 and the verge bits 32 will be hereafter described. The verge bits are located between the positions of needles which, in the formation of broad ribs, are located in the upper cylinder.

The cylinders are rotated and reciprocated in unison through the medium of a vertical shaft 34 which, through gearing indicated at 36 is driven by the lower cylinder and which, through gearing indicated at 40 and 42, drives the upper cylinder. The present machine additionally involves the driving of a wrapping assembly which action is effected through gears 44 and 46, the former being carried by the shaft 34.

Arranged to cooperate with the needles are arcuate sinkers 48 which are provided with butts 50 arranged to be acted upon by stationary cams 52 (see Figure 4) supported by a stationary cylinder 54 inside the lower rotating cylinder. This stationary cylinder 54 also supports the fabric guiding tube 56 provided with an extension 57.

Figures 1, 2:
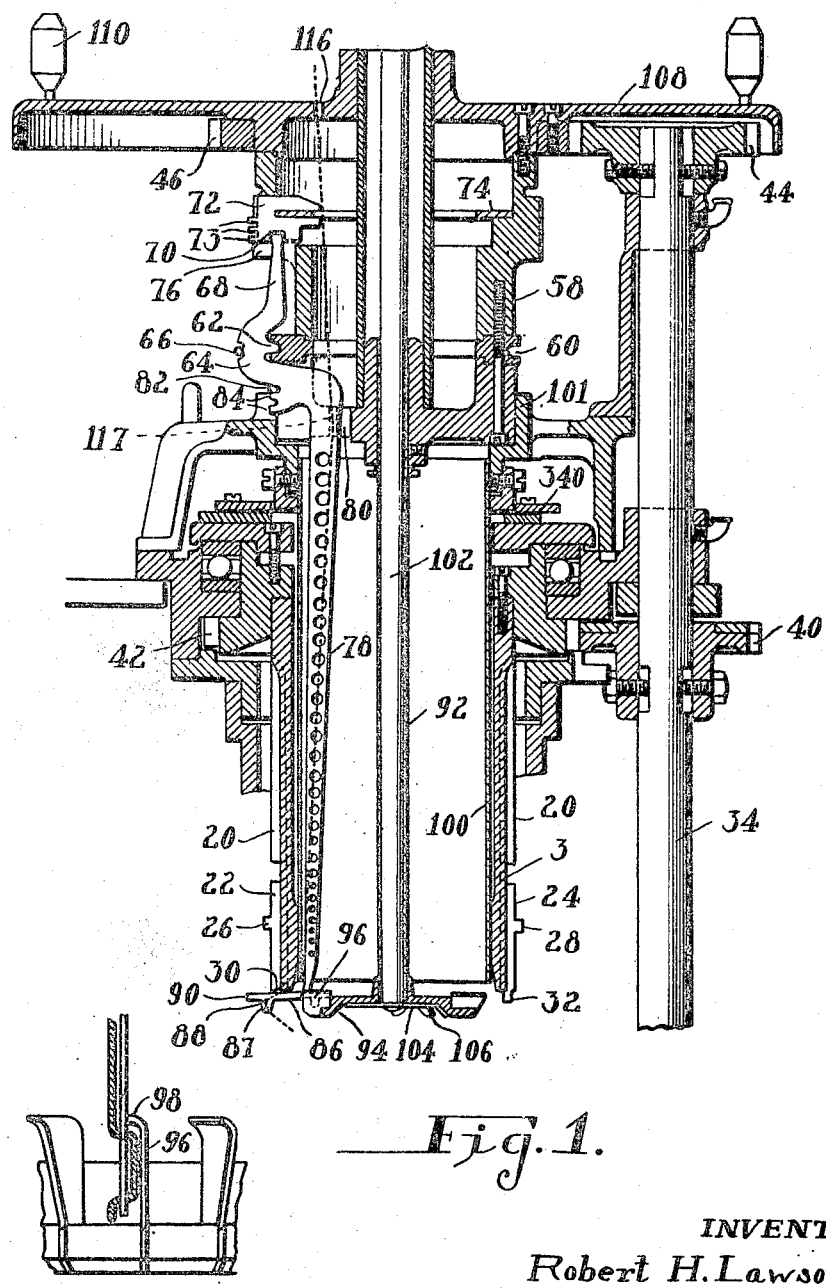
Figure 1 is an axial section through the upper portion of the machine, particularly showing the wrap head and the upper cylinder.
Figure 2 is a fragmentary elevation of the lower end of a wrap yarn guide and the means for maintaining its normal position when it is inactive.
Figure 6:
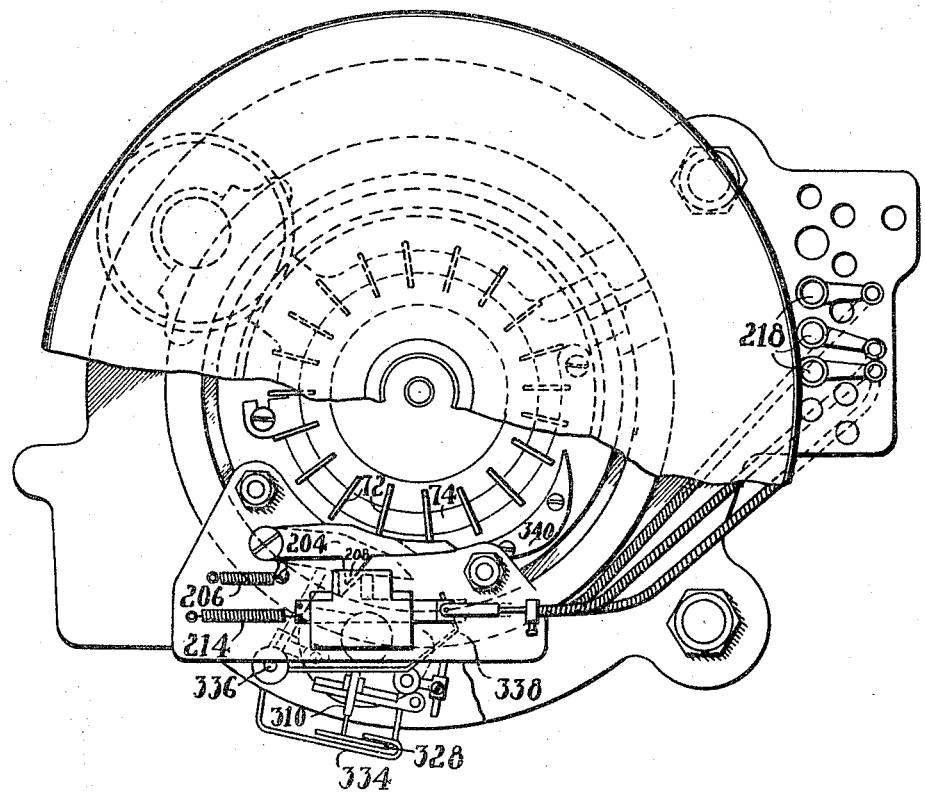
Figure 6 is a plan view, partly broken away, of the wrap yarn guide controlling means.

The rotary support for the wrap yarn carrying means is indicated generally at 58 (Figure 1). It is secured to the gear 46 and includes a member provided with an annular groove 60, in which groove are received the rounded pivot-forming projections 62 of wrap yarn carriers 64 surrounded by spring bands 66 and 82. Each of the wrap yarn carriers 64 has an upper extension 68 received in a notch 70 in an individual slider 72. These sliders 72 are provided with slots arranged so that they may embrace an annular ring 74 carried by the support 58. In order to guide the sliders 72 for radial movement and to position them in fixed circumferential locations they are received in slots 76 in the support 58. Each of the sliders is provided with a plurality of butts 73 indicated in the present instance as three in number. As will be evident hereafter, these butts may be selectively broken away so as to provide selection in the operation of the wrap yarn carriers.

Each of the wrap yarn carriers 64 is provided with a downward extension 78 extending through the upper cylinder and guided at its upper end in a radial slot 80 in the support 58. The lower spring band 82 serves to urge the lower ends of the wrap yarn carriers inwardly. Butts 84 are provided on the wrap yarn guides to provide for the positive inward movements of their lower ends.

At its lower end each wrap yarn carrier is provided with a radially directed extension 86 which has a downwardly extending branch 87 provided with the yarn guiding openings 88. The downwardly extending branches 87 are provided with smooth lower inner edge portions arranged to cam the wrap yarn downwardly as the wrap yarn finger or carrier is withdrawn inwardly following a wrapping movement. Beyond these openings each carrier is provided with an abutment-engaging extension 90.

A tube 92, the upper end of which is secured in the assembly 58, carries at its lower end a disc 94 which is provided with radial fins 96, the upper edges of which are turned, as indicated at 98, in a clockwise direction as viewed in the plan view constituting Figure 3. These edges 98 provide rests for the purpose of definitely positioning the lower ends of the wrap yarn guides which are flexed in a counterclockwise direction as viewed in Figure 3 in order to insure normal engagement with these edges. The disc 94 is notched as indicated at 95 in the sole section thereof for the free passage of wrap yarns which extend in a stocking from a point of interrupted wrapping above the heel, past the heel and other regions where wrapping does not occur. The wrap yarns then lie sufficiently inwardly not to interfere with other operations.

Extending downwardly within the upper cylinder 3 is a stationary cylinder 100, this being interposed between the cylinder 3 and the wrap yarn guides. The cylinder 100 is carried by a portion of the frame which supplies a lower bearing 101 for the rotating support 58.

An axially extending rod 102 is guided for lengthwise movement through the tube 92 and carries at its lower end a fabric take-up disc or pusher 104 provided with rounded fingers 106.

The rotating wrap yarn carrying assembly includes a disc 108 on which are supported the wrap yarn bobbins 110, of which there is one for each wrap yarn, only two of these being illustrated in the interest of clarity in Figure 1. The wrap yarns pass from these bobbins through the individual tension devices and take-up sweeps (not shown) and thence downwardly through openings 116 and 117 about the lower edge of the cylinder 100 (when the wrap yarn guides are outwardly projected) and through the eyes 88 in the individual wrap yarn carriers. The tension and take-up devices are of conventional type.

The warp yarn supporting means is so arranged as to permit the entire wrap yarn assembly to be raised clear of the upper cylinder and swung to one side to permit threading of the wrap yarn carriers. The particular means for effecting this result are not part of the present invention and reference may be made to the patent of Paul W. Bristow, No. 2,255,870, dated June 5, 1951, for the details of this construction. Said Bristow patent shows in detail various other features of the machine which do not form a part of the present invention.

At the lower end of the stationary cylinder 100 there is carried by a bracket member 184 a wrap horn 186 which at its initial end is in the form of a horizontal strip and which, beyond the region of presentation of wrap yarns to the needles, is turned to a vertical position indicated at 188, this, as indicated hereafter, being to insure a high position of the wrap yarns on the needles as they are raised following wrapping. The trailing end of this horn is upwardly bevelled as indicated at 190 and overlaps a plating cam 192 also carried by the stationary cylinder 100. This plating cam is provided with a downwardly sloping forward edge 194 for the purpose of forcing downwardly a wrap yarn as hereafter described. Another function is to assist the yarn take-ups in tightening the wrap yarn when interlacing takes place. Immediately beyond this plating cam is a member 196 which is provided with flat fabric engaging members 198, 200 and 202. The function of these is to hold downwardly, in particular, heels and toes during the knitting operations and to assist the yarn take-up in control of the wrap yarn while stitches are being drawn during wrap patterning.

For the purpose of controlling the wrap yarn carriers there are provided cams 204 pivoted on the machine frame and arranged to cooperate with the butts 73 of the sliders 72 as hereafter described. These cams 204 are provided with tail portions 208 which are urged by individual springs 206 into engagement with cam projections 210 on slides 212, one of which corresponds to each of the cams 204. These slides 212 are urged in a rearward direction, as viewed in Figure 5, by individual springs 214 against the pull of Bowden wires 216 connected to vertical rods 218 which are acted upon by cams on the main cam drum of the machine.

To provide positive return of the wrap yarn carriers following their projection of wrap yarns across the needle cylinders there are provided cams 222 arranged to act upon the butts 84. These cams act to return the wrap yarn carriers at slightly different times for the reasons given hereafter.

For the proper control of the wrap yarn carriers to cause them to wrap a possible plurality of needles in each operation, there is provided a yielding abutment shown at 224 engageable by the ends 90 of these carriers. This abutment 224 (Fig. 7) is carried by a shaft 226 extending downwardly through a stationary tube 228 secured at 230 to the machine frame and carrying at its upper end a stop 232 which is adjustable for the accurate positioning of the abutment 224. At its lower end the shaft 226 carries an arm 234 which is acted upon by a tension spring 236 serving to maintain the abutment normally in contact with the stop 232. The spring 236 is fairly strong so that normally the abutment 224 presents a fixed stop for the wrap yarn carriers. In case of an accident, however, for example, engagement of a wrap yarn carrier with a needle, the abutment 224 may yield against the action of 236 to permit the wrap yarn carrier to pass without mechanical damage.

A lowering picker 310 is pivoted in the usual fashion to a vertical post arranged to oscillate about a vertical axis, the tail end of the picker being urged downwardly by a spring 311 so as to follow a double cam 312 during oscillatory movements of the supporting post upon engagement of the picker by a slider moving in either direction. The conventional spring controlled arrangement indicated at 314 normally maintains the picker in central position. A lever 316 pivoted underneath the tail of the picker carries a cam 318 arranged to act thereon when the lever is rocked against the action of the spring 320 by a Bowden wire actuated from the main cam drum of the machine. When the cam 318 acts on the picker its active end is held depressed to proper level for picking down raised inactive sliders.

In accordance with the present invention there is pivoted on a horizontal pin 330 an arm in the form of bent stiff wire 328, which arm is normally urged inwardly in a direction toward the needle cylinder by a spring (not shown). A wire 334 carried by a vertical shaft 336 has a turned end embracing the lever 328. The upper end of the shaft 336 is provided with a cam following arm 338 adapted to be engaged during rotation of the needle cylinders by a cam 340 carried by the upper needle cylinder. The arrangement, the operation of which will be hereafter described, is such that when the picker is operated so that its tail is raised the wire lever 328 which normally rests against the tail will drop beneath the same, holding the active end of the picker in a lowered position between the raised slider butts heel height and the butts at normal cleared level until release is effected by the action of the cam 340.

To the extent so far described the elements of the machine are essentially the same in both their structure and functions to the corresponding elements shown and described in said Bristow patent referred to above, which patent there are illustrated various details which form no part of the present invention and hence are not specifically disclosed herein. There will now be described those features of the machine which are particularly involved in the present invention, either alone in combination with the matters heretofore described, being understood, however, that certain matters heretofore described are part of the present invention though also appearing in the disclosure of said Bristow patent.

In each of the slots of the lower cylinder below the lower slider therein there is a saw-tooth pattern jack illustrated in Figure 4 and various other figures. Each pattern jack 342 is provided with a butt 344 of one of two lengths as will be shortly described. Below this butt there are saw-tooth butts 346 arranged to be selectively acted upon by cams controlled by trick wheel. Below these saw-tooth butts each jack is provided with a fish-tail butt 348 providing upper and lower notches 350 and 352 in which there may engage cams as described hereafter. The jacks 342 are adapted to tilt in the lower cylinder slots and for this purpose their inner edges comprise straight portions meeting at points 354 which constitute the fulcra for rocking. The upper edges 356 arranged for engagement with the lower ends of lower sliders.

At this point there may be described the butt arrangements of the sliders and jacks. Figure 50 illustrates the various types of these elements which are used in a machine arranged for the production of stockings with narrow heels. The elements of the left hand set those associated with needles which knit the instep the stocking. The elements of the intermediate set those associated with needles which knit the toe which do not knit the heel. The elements of the right hand set are those which are associated with need which knit both the heel and toe. Usually the elements of the left hand set will extend about half the circumference of the cylinder, the elements of the right hand set will extend about the remainder of the circumference with the exception of, say, six to twelve slots on each side while these last slots will contain the elements of the central set.

Referring to the left hand set of elements associated with instep needles, the upper sliders 8a have short upper butts 18a and long lower butts 16a. The lower sliders 4a have long upper butts 10a and short narrow lower butts 12a. The jacks 342a have long butts 344a.

In the case of the intermediate set, the upper sliders 8b have medium length upper and lower butts 18b and 16b. The lower sliders 4b have medium length upper butts 10b while the lower butts 12b are of the form illustrated, these butts being of stepped shape higher than the butt of the sliders 4a with the upper step extending outwardly to the length of the short butt 12a while the lower step extends outwardly to form a medium length butt portion.

The jacks 342b are identical with the jacks 342a, being provided with long butts 344b.

In the case of the right hand set of elements the upper sliders 8c are provided with long upper butts 18c and short lower butts 16c. The lower sliders 4c are provided with short upper butts 10c and long lower butts 12c which have a height corresponding to the overall height of the butts 12b. The jacks 342c are provided with short butts 344c.

The jacks of all three sets have various saw-tooth butts selectively removable to provide patterning as will be hereafter apparent. By reason of the particular arrays of butts they carry they are selectively acted upon by butt-engaging cams which are in action, which cams. in turn, are subject to quite elaborate selection under trick wheel control so that a large number of patterning possibilities are available. It may be here remarked that the saw tooth butts at various levels may be used for special purposes, for example, as described hereafter, the lowermost level of these butts may be used to secure the selection of needles to form a 1 x 1 rib top.

For the control of the saw tooth jacks there are provided sets of cams, there being one cam in each set for each level of the saw-tooth butts. These cams take the form of stacked slides 360 tilted to the horizontal as indicated particularly in Figure 24. Each of these slides is provided with a cam portion 362 which actually engages the jacks. The slides are urged inwardly toward the needle cylinder by engagement of springs 368 and 370 with projections 364 and 366 on the slides. In view of the close arrangement of the slides the projections 364 are provided on alternate slides while the projections 366 are provided on intermediate slides. The springs 368 and 370 take the form of comb-like members, the prongs of which individually engage the projections. The slides are additionally provided with butts 372 which may be selectively broken away. These butts are engageable by three fingers 374 carried by upright shafts controlled from the main pattern drum of the machine so that groups of the slides may be selectively drawn out of action away from the needle cylinder.

Each of the slides is provided with a projection 376, which projections are arranged to be acted upon by the butts on the tricks 378 carried by the trick wheel 379. During the formation of the portions of a stocking in which patterning occurs the trick wheel is advanced in the formation of every course by a mechanism which will be recognized to be that of Lawson patent 2,411,795, dated November 26, 1946. The trick wheel is secured to a gear 380. A cam 382 rotating with the needle cylinders acts upon each rotation of the cylinders upon a follower roller 384 carried by a triple arm lever 386 pivoted at 388 to the frame of the machine. The intermediate arm 389 of this lever is provided with a hardened pad 390 which acts upon an adjustable follower screw 392 carried by an arm 394 of a yoke 395 pivoted on a pin 398 carried by the machine frame. An adjustable screw 400 carried by arm 394 engages a portion of the frame to limit counterclockwise motion of the arm 394 which is urged in a counterclockwise direction as viewed in Figure 22 by a spring 396. A second arm 402 of the yoke 395 carries on a pivot 404 a lever 406 which, at one end, is provided with a gear segment 408. This same end of the lever 406 is adapted to engage an eccentric stop 410 which is secured in adjusted position by a screw 412. The other end of the lever 406 carries an adjustable screw 414 which is arranged to engage a lug 415 carried by the arm 402.

The operation of the mechanism just described in advancing the trick wheel will be clear considering as a starting position the location of the parts illustrated in Figure 22. As the lever 386 is moved counterclockwise by the cam 382 the yoke 395 is moved clockwise with the result that the teeth of the segment 408 engaged the teeth of the trick wheel gear 380. The pivot 404 is provided with sufficient friction, for example, by means of friction washers, so that the lever 406 and the arm 402 move as a unit in this operation. As the clockwise movement on the shaft 398 continues, the angular relationship between the lever 406 and the arm 402 changes so that the segment 408 advances the gear 380. This action continues until the stop screw 414 engages the lug 415 which should coincide, substantially, with the limit of movement of the lever 386 under the action of cam 382. The cam 382 then releases the lever 386 and the spring 396 produces a movement counterclockwise of the yoke 395. The first event of this counterclockwise movement is withdrawal of the segment 408 from the gear 380. Immediately after withdrawal is complete the back of the segment 408 engages the stop 410 so that the further movement of the pin 398 produces a change in the angular relationship of the lever 406 to the arm 402, the back of the segment sliding along the stop 410. Finally there is attained the position illustrated in Figure 22.

In the above described operation, the finally attained position of the parts illustrated in Figure 22, i. e., with the stop screw 400 engaging the frame, so locates the segment 408 that in its operation, as described above, it will advance the trick wheel through two steps by reason of its engagement with the gear 380 two teeth behind the location of previous engagements. In order that a particular succession of single and double steps may be imparted to the trick wheel to result in its complete rotation during the occurrence of various numbers of courses of knitting, provision is made to insure either single or double steps under the control of butts carried by the patterning elements of the trick wheel. Additionally, controls are provided to interrupt the advance of the trick wheel during the formations of heels and also for the timing of the trick wheel to bring it to an initial position during the toe formation and during the knitting of the looper's rounds. For the purpose of such controls, the following mechanisms are provided:

A third arm 416 of the lever 386 has pivoted to it at 418 a member 420 which is held in fixed adjustable relationship with the lever by an adjusting screw 422 and a binding screw 424. This member 420 is provided with an upstanding lug 426 which is arranged to move in a slot 428 in a lever 434 pivoted to the frame at pin 436. The slot 428 has a pair of shoulders 430 and 432 as illustrated. When the lever 434 is in the position illustrated in Figure 23, the lug 426 is unimpeded in its movements, and, accordingly, complete oscillation of the lever 386 may occur, as described above, to give double step advances to the trick wheel. A Bowden wire 438 is connected to one arm of the lever 434 and is actuated through a plunger following cams on the main cam drum of the machine, as described more fully in said Lawson application. A spring 440 normally urges the lever 434 in a clockwise direction to cause a pin 441, carried thereby, to ride on a circular edge 443 of the gear 380 which edge is interrupted by a notch 445.

A lever 442 pivoted on the pin 436 and urged in a clockwise direction by a spring 446 is provided with a hook 444 and with an adjustable screw 448 threaded in an upstanding ear 449, which screw is arranged to be engaged by a downwardly extending portion 450 of the lowermost slide 360, which, though adapted to be acted upon by the lowermost butts on the trick wheel, does not carry a cam portion 362 to act upon the saw-tooth butts of the jacks 342.

The control of this lowermost slide by trick wheel butts provides for the positioning of the hook 444 in either of two alternative positions, either clearing the lug 426 as illustrated in Figure 23 or in the path of this lug to prevent the complete return of the lever 386 as it is released by the cam 382. When the hook 444 is in position to engage the lug 426, the gear segment 408 is not withdrawn sufficiently to engage two teeth behind the teeth previously engaged, but is withdrawn only sufficiently to cause it on the next stroke to engage one tooth behind those previously engaged. Consequently, under these conditions, the trick wheel will be advanced only a single step in each operation.

The Bowden wire 438 is normally positioned by a cam on the main cam drum so that the pin 441 which it carries cannot drop inwardly of the edge 443. When the machine starts knitting a heel, a higher cam pulls the Bowden wire to bring the stop 430 in the path of the lug 426. This stop catches the lug on its reverse stroke and prevents clockwise movement of the lever 386. Consequently, the stepping of the trick wheel is interrupted until the lever 434 is permitted to return to the position indicated in Figure 23.

During the knitting of the toe, the Bowden wire 438 is completely released so that the lever 434 would be free to move clockwise under the action of spring 440 if it were not for engagement of the pin 441 with the circular edge 443. This edge, however, maintains the lever 434 in the condition illustrated so that trick wheel advance continues, the cam 382 being double ended so as to effect advance of the trick wheel during reciprocation. However, as soon as the notch 445 reaches the position of the pin 441, the pin may drop therein with the result that the shoulder 432 may engage the lug 426 and again the oscillations of the lever 386 are prevented. Accordingly, the trick wheel stops. While the retiming of the trick wheel may occur at any time prior to the resumption of active operation of the trick wheel, the retiming during the toe is generally desirable. When, in the formation of the next stocking, patterning is to be resumed under control of the trick wheel, a cam on the main cam drum pulls the Bowden wire 438 to lift the pin 441 out of the notch 445 thereby restoring the lever 434 to an inactive position so that single or double step advances of the trick wheel may be resumed as determined by the position of the lever 442. As will be evident, these various objects are equivalent to those described in said Lawson patent.

The cams which act upon the sliders and jacks may be best considered in describing the operations which they effect during the formation of a stocking. As will be evident as the description of operation proceeds, the cams which control the sliders are the same for all of the various operations of which the machine is capable and consequently reference may be made to Figure 31 or to any of the subsequent figures showing cam developments for an understanding of these cams. In the case of those figures which involve only slider control or only to a very minor degree control of jacks, the jack cams have been omitted, it being understood that the operations to which those figures relate are not dependent upon the particular jack cams which are used.

For the purpose of different types of pattern control it is simpler to provide different cam sets for the jacks rather than to provide a single set of cams which, by movements of the cams, effect different operations. This does not entail substantial inconvenience because changes from one type of patterning to another will normally be made only infrequently and the substitutions of cams constitute minor operations as compared with the setting of the pattern control devices such as trick wheels, the pattern chain or the like. It will be noted that the various cam developments, except in a few instances, show different sets of jack cams, while the slider cams remain the same.

The operation of the machine and the parts involved which have not yet been described may be made clear by considering the sequence of operations involved in knitting stockings starting with the knitting of single feed plain fabric forming the looper's rounds constituting the completion of a stocking after the formation of its toe. The operation then involved is illustrated in Figure 31. All of the needles at this time are in the lower cylinder, and considering the path of the lower sliders from right to left in that figure (the path of the upper butts being indicated), the lower slider butts enter at the level indicated and are moved downwardly by engagement of the top cam 452 and the stitch cam 454 with their upper butts, the needles taking yarn from a finger in the position 462 at the main feed. The sliders are then raised by engagement of the cam 472 with their lower butts and are further raised by engagement of cam 473 with their upper butts and then cam 474 with their lower butts. The level to which they are raised by the cam 473 is the tuck level while the cam 474 raises them to clearing level. Cams 472 and 474 are radially movable and are, at this time, in action. It will be evident that the cam action referred to produces plain, single feed fabric, the auxiliary yarn finger being inactive at position 464'.

During this phase of the operation, though the upper sliders are empty, they are caused to follow the path indicated for their lower butts for the purpose of protecting the latches of the needles which are in the lower cylinder. The upper sliders operate in effect as a latch ring for the needles which are moving at clearing level. Conventional latch guards are provided elsewhere, these being omitted from the showing of the cams. The path of the upper sliders from right to left is under cam 492, over cam 494, over cam 496, over the main stitch cam 460, and below cams 476 and 478, the former of the last two mentioned cams acting on their upper butts, which cams return them to the level at which they enter the right hand side of the figure. Cams 516 and 518 are without action at this time. Cams 494 and 476 are radially slidable and are in action at this time. Cam 488 which is also radially slidable is not at this time effective but is located in its inner position.

The saw-tooth pattern jacks are raised by the cam 514 to put them in position for selection at the time the toe is completed. Accordingly, during the knitting of the looper's rounds their butts 344 follow a path essentially as indicated, irrespective of the particular jack cams which may be in the machine at that time and which are not shown in detail in Figure 31. Inconsequential variations of this path may occur with different jack cam arrangements.

Following the completion of the looper's rounds a transfer is made to produce 1x1 rib, as illustrated in Figure 32. For this purpose the lowermost cam 362 acting on the saw-tooth butts of alternate jacks is caused to be selected to effect transfer. The details of this selection will be described hereafter in conjunction with a complete description of patterning. For the present it will suffice to point out that the lower ends of the jacks which are selected remain out and consequently through the action of a cam on their fish tail butts they are caused to ride high at A at the transfer point immediately preceding the cam 500, now in action, which raises the lower sliders pushed upwardly by the jacks to effect transfer at B of the needles. The cams 503 and 504 then lower these sliders. Transfer occurs in the usual fashion as described in Houseman Patent 2,170,078, dated August 22, 1939, the upper ends of the sliders being acted upon by the cam 502 to release the needles which are then engaged by the upper sliders.

The lower sliders which now do not carry needles move horizontally following depression by the cams 503 and 504 and are then lowered by cam 506, raised by cam 510 and again lowered by the cam 508 to join the sliders which carry needles, the cams 506, 510, and 508 being now in action. The lower sliders which still carry needles move in the same path as was followed by the lower sliders in the operation of Figure 31.

The upper sliders also follow the same path as was described in connection with Figure 31 but this time carry needles and consequently form stitches at the main feed. The result is the formation of 1 x 1 ribbed fabric. The formation of 1 x 1 ribbed fabric need be carried out for only one revolution. It may be here pointed out that Figure 32 may be considered illustrative of the machine operation during the continuous formation of 1 x 1 or other ribbed fabric, disregarding the transfer paths.

The 1 x 1 ribbed fabric may be followed by the provision of a draw thread in either of two alternative ways. One alternative will be referred to as the usual draw thread, while the other, for reasons which will appear hereafter, may be designated press-off draw thread.

Figure 33 illustrates the formation of the usual draw thread. In the preceding figures the yarn feeding finger at the auxiliary feed was indicated as at its inactive position 464', its active position being at 464. For the formation of the usual draw thread this finger is moved to its active position 464. Cam 476 is now withdrawn so that the upper sliders follow the path indicated in Figure 33. Cam 475, referred to later, is inactive. The needle set-up remains the same as before and, consequently, the alternate needles which are in the upper cylinder take yarn at the main feed but fail to take yarn at the auxiliary feed, being cleared by the action of the cams 488 and 490.

The cam 480 is moved in and consequently the lower sliders follow the path indicated in Figure 33, taking yarn at both feeds. Clearing following the auxiliary feed is accomplished by the action of cams 482 and 522. The knitting at the second or auxiliary feed may occur for about one and one-half revolutions.

The resulting stitch formation is illustrated in Figure 35 in the courses designated $C_1$, $C_2$, $C_3$, $C_4$, and $C_5$. The auxiliary yarn is withdrawn as indicated in the course $C_4$, the auxiliary yarn being illustrated shaded in this figure.

This formation of the draw thread is followed by a welt formation which is illustrated in Figure 34. Cam 488 is withdrawn and consequently the needles in the upper cylinder are not cleared and hold their loops without taking yarn at the main feed. The auxiliary yarn feeding finger is, at this time, inactive. Cams 472, 474 and 480 are out of action and consequently stitches drawn by the needles in the lower cylinder at the main feed are cleared by the action of the cams 482 and 522. The resulting welt formation is illustrated in Figure 35 in the courses $C_6$ and $C_7$.

The welt may be followed by 1 x 1 rib as illustrated in courses $C_8$ and $C_9$, the cam arrangement being that illustrated in Figure 32, the paths of the sliders being as illustrated therein, disregarding the portions of the paths which are involved in transfer.

For separation of the stockings, both yarns are severed, for example in courses $C_2$, $C_3$ and $C_4$ on opposite sides of the fabric, leaving a selvedge provided by the course $C_5$ at the top of the stocking.

As an alternative to the usual draw thread formation described above there may be formed the press-off draw thread illustrated in Figure 36. In this figure the courses $D_1$ and $D_2$ are courses of 1 x 1 rib, which courses are followed by welt formation as illustrated by the courses $D_3$ and $D_4$, this welt formation being produced in the fashion previously described and illustrated in Figure 34.

Figure 33 may be considered as illustrating the slider motions in the formation of the press-off draw thread since the cam arrangement is identical with that illustrated in Figure 33 with the exception that cam 475 is now active and no yarn is fed to the needles at the auxiliary feed, the yarn finger at this feed being in its inactive position 464'. As a consequence of this in view of the active position of the cam 480 to lower the sliders in the lower cylinder below the stitch cam 466, the needles in the lower cylinder press off their stitches, and are then raised by cam 475 and pass over cams 559 and 522 to have their latches opened by a latch opener which is not illustrated but which may be of the type, and may operate in the fashion, illustrated in the patent of Albert L. Oberholtzer, No. 2,557,137, dated June 19, 1951. A course such as illustrated at $D_5$ is accordingly produced and this course may be followed by one or more additional similar courses depending upon the desired product. The welt which precedes the course $D_5$ acts as an anti-run-back. The course or courses $D_5$ are then followed by welt formation in the fashion described above, this being illustrated in courses $D_6$, $D_7$ and $D_8$. These, in turn, are followed by 1 x 1 rib in courses $D_9$ and $D_{10}$.

It will, of course, be evident that the lower cylinder loops in the courses such as $D_5$ will pull out under tension applied to the fabric with consequent elongation of the upper cylinder loops, and it is, therefore, to be understood that they are illustrated in Figure 36 solely for purposes of explanation of the fabric formation. Severance of the yarn in the course $D_5$ will permit separation of the stockings, leaving a selvedge provided by the course $D_6$.

While instead of the welt indicated a conventional reverse welt may follow either the usual draw thread or the press-off draw thread, for example when it is desired to get a good appearance in the turned-over top of a stocking, a reverse welt may not be used ahead of the press-off draw thread because it will not provide an anti-run-back structure.

Instead of a single feed 1 x 1 ribbed top as described heretofore it may be desirable to provide two feed 1 x 1 ribbed structure. Figure 37 illustrates this. If needle transfer has not previously been accomplished to put alternate needles in the upper cylinder the 1 x 1 arrangement may be secured as described above. Figure 37 is substantially self-explanatory as to the events which occur in the two feed knitting. The auxiliary yarn finger is in its active position 464. Cams 494, 476, 484, 488, 472, 474, 480 and 514 are in their active positions to cause the needles in both cylinders to knit the yarns at both feeds. It may be here noted that the cam set-up illustrated in Figure 37 may also be used for the formation of other two feed structures in which needles knit in both the upper and lower cylinders, suitable arrangement of the needles being secured by jack selection as will be made clear hereafter.

The major variations in operation of the present machine are involved in the leg formations of stockings and require jack selection of the needles for various purposes. Before proceeding with descriptions of certain typical alternatives reference will be made to certain elements of the machine and their operations since these elements effect the various types of selective controlling actions which are involved in patterning.

Reference may first be made to Figure 29 which illustrates the fundamental typical elements involved in the selection of jacks 342. The jacks are moved downwardly into engagement with a cam 530 having a sharp edge arranged to be embraced by the notches underneath the fish-tail butts 348. The sharp upper edge of the cam 530 extends in a direction away from the cylinder with the result that it tilts outwardly the lower ends of the jacks 342 as the jacks are moved downwardly into engagement with it. It may be noted that the outward tilting of the lower ends of jacks occurs as they move downwardly; this eases the tilting action because it occurs as a part of a continuous jack movement. As they leave this cam 530 the jacks are riding at a proper height for engagement of their saw-tooth butts for selection by the trick wheel controlled cams 362. Accordingly, if one of these cams is in position to engage a saw-tooth butt on a jack, the jack such as illustrated at 342' in Figure 29 will be raised by the cam. On the other hand, any jack such as 342" which does not have a saw-tooth butt in position to be engaged by one of the trick wheel controlled cams will continue to ride at the level determined by the cam 530.

A cam surface 532 bevelled inwardly is located in position to engage and push inwardly the fish-tail butts of those jacks 342" which have not been raised while it will miss the fish-tail butts of the jacks 342' which are raised thereover by one of the cams 362. This cam 532 is followed by a sharp-edged cam 534 which may take various particular shapes as will be evident hereafter. A jack which has been raised and which has consequently missed the cam 532 will have its lower end in an outer position and will accordingly engage the cam 534 to be raised thereby, the sharp-edge of this cam engaging the notch 352 beneath its fish-tail butt. On the other hand, those jacks 342", the lower ends of which have been moved inwardly by the cam 532, will miss the cam 534 so as to continue to ride at the level at which they left the cam 530. Thus a segregation of the jacks is secured for any one of a number of different purposes.

A second type of jack control which will be designated as cross-over is accomplished as illustrated in Figures 26, 27 and 28. This cross-over action involves a crossing of paths of two sets of jacks with the result that jacks approaching the cross-over point at an upper level will leave at a lower level while those approaching at a lower level will leave it at an upper level, the two sets of jacks being maintained independent of each other.

The jacks approaching at the lower level are designated 342A while those approaching at an upper level are designated 342B. The jacks 342A engage a sharp-edged cam 536 somewhat similar to the cam 530 described in connection with Figure 29, which cam 536 has a portion 538 extending outwardly to tilt outwardly the lower ends of the jacks 342A which are held in engagement with this cam by a suitable cam active on the upper butts 344 of the jacks. The cams 536 and 538 engage within the notches below the fish-tail butts 348. The cam 538 directs the jacks into a dovetail passage 544 having an upper edge 540 and a lower edge 542. These edges engage within the notches above and below the fish-tail butts and have a vertical spacing less than the outer edges of the fish-tail butts. Accordingly, any jack, the fish-tail butt of which enters the dovetail passage 544, is constrained to follow this passage with its lower end held outwardly. At the end of this passage the edge 542 merges with an edge 546 and with successive sharp cams 548 and 550 which engage in the notches beneath the fish-tail butts and serve to cause the jacks 342A to attain the successive positions illustrated in Figure 26, the jacks being caused to ride down the sloping cam 546 by the action of a suitable cam 512 (Fig. 38) on butts 344.

The jacks 342B which approach from an upper level are moved downwardly by cam 512 so as to pass the edge 540 in such fashion that their fish-tail butts are cammed inwardly by its sloping upper edge if they do not already occupy an inner position. As they move downwardly under the action of cam 512 on their upper butts 344 they will miss the edge 542 and consequently since they cannot enter the dovetail passage they will not engage the cam 542 or the cams 546, 548 and 550, the lower corner of the fish-tail butts moving below and inside the upper edges of cams 542, 546 and 548. They will accordingly leave the cross-over point at a lower level as indicated at the right of Figure 26, this level being that attained by reason of their depression by the action of cam 512 on their upper butts 344. Thus the two sets of jacks follow crossing paths without any possibility that a jack from one path may get into the other.

Figure 38 gives one example of the pattering possibilities of the machine in its application, for example to the formation of designs in the leg and instep of a stocking. Specifically, this figure illustrates the formation of a single feed fabric involving wrapping, links and links, and tuck or float patterning. A yarn finger is active at 462 at the main feed while at the auxiliary feed the finger is inactive at 464'. There are three selection stations associated with three sets of jack cams 362A, 362B and 362C controlled by individual trick wheels of the type and in the fashion heretofore described. With each of these sets of selection cams there are associated cams 530, 532 and 534 as described above in connection with Figure 29, these cams in Figure 38 having appended thereto letters corresponding to the three selection stations. The crossover cam arrangement illustrated in Figure 26 is also indicated though, as will presently appear, it is not used for cross-over purposes in the operations about to be described.

There may be considered first saw-tooth jack paths and matters of jack selection. The various paths of the cam following butts 344 of the jacks are indicated. Starting at the right-hand end of the figure certain of the jacks are being raised by the cams 362C while others are being missed thereby, depending upon the selection of the cams and the arrangement of the saw-tooth butts on the individual jacks. Those jacks which are not acted upon by any of the cams 362C follow the path E. As described above the fish-tail butts of these jacks will not engage cam 534C moving inwardly of that cam since their lower ends will be pressed inwardly by the cam 532C. These jacks, however, will be almost immediately raised by engagement of the cam 482 with their upper butts 344. Those jacks which were engaged by one of the cams 362C will not be engaged by the cam 532C and hence their lower ends will be in outer position so that their fish-tail butts will ride up the cam 534C. This cam may move them along a path indicated at E' slightly higher than the path E. The differentiation between the paths E and E' occurs at F where a high point of the cam 534C raises the selected jacks to cause them to move their lower sliders upwardly to effect transfer of needles to the upper cylinder. In this operation of the machine the cam 498 is active upon upper sliders producing a downward wave causing all of the upper sliders to transfer their needles to the lower cylinder. Then, due to the action at F, selected needles are transferred to the upper cylinder, which transfer may involve needles which were both just transferred to the lower cylinder or which were, previous to the downward transfer, in the lower cylinder. Those lower sliders which transfer their needles to the upper cylinder then follow the path K below the cams 504 and 506 over the cam 510 and below the cam 508. The raceway thus provided, it will be noted, segregates these sliders from those which carry needles in the lower cylinder so that the empty sliders must return to the lower transfer point, riding at a level at which they are capable of receiving needles from the upper cylinder. Insurance is thereby provided against the possibility that due to selection these empty sliders can be in a lower raceway at the transfer point and hence not in position to accept transferred needles. Returning to the jack butts, the jacks following both the paths E and E' join in passing under the cam 512 and are raised by the cam 552 to be depressed by the cam 553 into engagement with the cam 530A, whereby their lower ends are pulled outwardly and they are leveled for approach to the jack selecting cams 362A. By the action of the cams 362A and cams 532A and 534A associated therewith, the jacks are again divided into two groups to follow the paths H and I. Those following the latter path are lowered by the cam 554 and pass the cam 514, which is out of action, to follow the lower path G, joining the other jacks following the paths E and E' in moving upwardly over the cam 552.

Those jacks which follow the path H are depressed by the cam 555 which causes their fish-tail butts to engage the cam 530B to line them up for selection by the cams 362B. Through the selection action of these cams on the saw-tooth butts and through the action of associated cams 532B and 534B, the jacks are again differentiated so that some of the jacks rise along the path J to receive wrap yarns. The cam 557 lowers those jacks which were selected upwardly along the path J and then moves both sets of jacks downwardly to engage the cam 530C to position the jacks for selection by the cams 362C.

Considering now the upper sliders, following the transfer these sliders are raised by the cam 494 which is now active to cause their needles to take yarn at the main feed drawing stitches by the action of the stitch cam 460, clearing of the stitches being effected by the actions of the cams 488 and 490.

The path of the lower sliders which do not carry needles has been described. The lower sliders which are associated with jacks following either of the paths E or E' will be raised along the path N over the cam 522 and then those sliders associated with jacks following the path E will move past the transfer point beneath the cams 452 and 454, following the path L, to take yarn at the main feed. Those needles which are associated with jacks selected by the cams 362B and 534B will be raised to the tuck level at M to receive wrap yarn, retaining this level as they enter the right-hand side of the figure until over the cam 522 they join the needles following the path N previously described. In passing upwardly over the cam 522 the needles are raised to clearing level. The jacks which follow the path I are too low to engage either the cam 532B, 532C or the cam 482 and pass beneath the latter even if any of their saw-tooth butts cause them to be slightly lifted by engagement with cams 362B or 362C. Accordingly, the sliders associated with these jacks follow the path O. If the cam 556 is inactive the needles associated with the sliders following the path O will not be raised but will follow the path Q beneath the stitch cam 454. As a result the stitches which they carry will not be cleared and they will fail to take yarn at the main feed, thus producing float work.

If, however, the cam 556 is active these sliders following the path O will be raised to the tuck level along the path P so that, while their stitches will not be cleared, they will take yarn and will draw loops in passing down the cam 454. The result is the formation of tuck work.

In summary of what is illustrated in Figure 38 it will now be clear that selection by the cams 362A produces tuck or float patterning depending on whether the cam 556 is in action or out of action, selection by the cams 362B determines those needles which are to be wrapped, while selection by the cams 362C determines the transfer of needles to the upper cylinder for the production of links and links. It will be noted that while all of the jacks may be selected by the cams 362A, selection by the cams 362B for wrapping and by cams 362C for links and links, is only made out of those jacks which have been selected upwardly by the cams 362A. The result is that only those needles can be wrapped which will be cleared at the cam 522 and further, only those needles can be transferred which have been cleared at the cam 522.

Figure 39 illustrates the arrangement of the machine for the purposes of producing selective tucking or floating at both feeds in combination with links and links. The cams in the machine during this operation are, for the most part, those in the machine as illustrated in Figure 38. A comparison of these figures will show, however, that a cam 558' has been substituted for cam 558 and is active to lower jacks and a high cam 534D has been substituted for the cam 534A. Cams 476 and 484 are moved into action to act upon the butts of the upper sliders while cam 480 is brought into action to act on the butts of lower sliders. Additionally, cam 514 is rendered active to act upon the upper jack butts.

As will be clear from the pathways illustrated, the needles controlled by upper sliders will take yarn at both feeds, an auxiliary yarn finger being in active position at 464. Verge bits 32 are depressed by the actions of cams 375 and 377 at the main and auxiliary feeds, respectively, to aid in the formation of stitches by the needles in the upper cylinder. Transfer of needles for the production of links and links is performed as heretofore described, the selection for links and links occurring at the cams 362C. The path of empty lower sliders is the same as previously described and is shown at K.

All of the jacks are presented for selection to the cams 362A, at which point those selected upwardly by following the cam 534D cause their needles to rise to clearing level and then pass through the cams at the auxiliary feed to draw yarn thereat. Those jacks which are not selected upwardly by the cams 362A follow a path below the cam 554 and the corresponding needles pass beneath the cam 473 to miss the yarn at the auxiliary feed, thus producing floats. If, however, it is desired to produce tuck work rather than floats at the auxiliary feed the cam 472 is rendered active, in which case the needles corresponding to unselected jacks will ride up cam 472 and over cam 473 at tuck level taking yarn and drawing loops under the auxiliary stitch cam 466. The cams 514 and 555 again bring the jacks together for selection by the cams 362B. The jacks which are selected upwardly follow the cam 534B and the lower sliders corresponding thereto pass over the cam 559 and are raised to clearing level by the cam 522. From this group of sliders are selected those which are to effect transfer of their needles to the upper cylinder. The needles of this group of sliders which are not transferred, as well as retransferred needles, take yarn at the main feed and knit at cam 454 as indicated. All transferred needles also knit at this feed in the upper cylinder.

The jacks which are not selected upwardly by the cams 362B are lowered by the cam 558' and are eventually raised by the cam 552 to join the other jacks. The lower sliders which are associated with these unselected jacks follow the path O beneath the cams 559 and 522. If their needles are to miss yarn at the main feed the cam 556 is out of action so that the sliders follow the path Q. If tucking is to occur the cam 556 is moved into action whereupon the lower sliders are raised to tuck level at P and their needles will then take yarn at the main feed without clearing their previous loops. It will be evident from the foregoing that quite elaborate tuck or float designs may be combined with links and links in a two feed fabric.

Figure 40 illustrates a further variation of knitting which may be accomplished by the present machine. In this case, two feed fabric is knitted with wrapping and links and links patterning, the wrapped needles knitting at the main feed and being floated under the auxiliary feed. In this instance there is utilized the cross-over action previously described in general terms.

The upper slider path is identical with that described in connection with Figure 39, the needles controlled by the upper sliders taking yarn at both feeds. Of the radially movable cams which act upon lower sliders and jacks, cams 520, 500, 506, 510, 474, 480 and 508 are active, the remaining slidable cams being inactive. By comparison with Figure 39 it will be noted that the cams acting upon the upper jack butts are the same except that cam 552 is removed or withdrawn while a cam 560 is provided. Actually the cam 552 may be merely located in the new position 560. A cam 562 is also provided for the purpose of raising upper jack butts. The cams which act upon the fish-tail jack butts are the same as have been illustrated in Figure 38. In the action of the machine now under consideration the cams 362A are inactive, selections being made solely by the cams 362B and 362C.

The present operation may be best considered by beginning with the selection at 362B where all of the jacks are presented for possible selection. The selection at 362B raises the jacks associated with needles which are to be either wrapped or transferred to the upper cylinder. The sliders associated with these selected jacks pass upwardly over the cam 559 at tuck level whereupon certain needles presented in the path of the wrap yarns are wrapped. It will, of course, be understood that in this and the other arrangements herein described, needles which are raised at the wrap point to the tuck level are not necessarily wrapped, being wrapped only when they are in the path of presentation of a wrap yarn. The jacks which are upwardly selected by the cams 362B are lowered by cam 557 for a further selection by cams 362C which, by selection of jacks, effects transfer of needles to the upper cylinder out of those groups which have not been wrapped for the purpose of producing links and links or rib patterns. The jacks unselected at 362C are raised by the cam 482 and follow the path R and the corresponding sliders which have been raised to clearing level by the cam 522 pass through the cams at the main feed to take yarn thereat. All sliders, whether selected or not, follow a path to knit at the main feed, those sliders not raised by jacks being raised by cam 520. The empty sliders which have transferred their needles again follow the path K. The cam 472 is inactive so that the needles which take wrap yarns will pass under the second feed producing floats of the auxiliary feed yarn due to cross-over action of the associated jacks.

The jacks which were not selected upwardly at the cams 362B are lowered by the cam 558' and follow the path S, being raised by the cam 560 for approach to the cross-over point, being levelled for this approach by the cam 561. The cross-over occurs as illustrated by the paths R and S, the jacks following the path R approaching the cross-over point at a high level and leaving at a low level, while those moving along the path S approach at a low level and leave at a high level, being raised by the cam 550. The sliders associated with the jacks moving along the path S are raised by the cam 520 and then by the cam 522 to clearing level. Their needles then move with the other needles in the lower cylinder to take yarn at the main feed. The cam 562 raises the jacks following the path S and the corresponding sliders are raised to engage the cam 473 and are then raised to clearing level by the cam 474, their needles thereafter taking yarn at the auxiliary feed. It will accordingly be noted that all of the needles in the lower cylinder knit at the main feed while those needles which have been wrapped or which have been raised to wrap level fail to take yarn at the auxiliary feed in their subsequent passage by that feed.

Figure 41 illustrates the production of cross-over rib knitting which is sometimes referred to as two feed Jacquard. This is not true Jacquard but there is produced a similar bulky fabric in which floats existing in the loops drawn by the needles in the lower cylinder are knit into the loops knit in the upper cylinder. The needles in the upper cylinder knit at both feeds while the needles in the lower cylinder knit only at one feed in a single round. It may be here remarked, as will be evident from the explanation, that more than two feeds may be involved in the formation of this type of fabric, though, consistent with the other descriptions herein, the machine will be specifically considered as one having only two feeds.

The upper slider path is again the same as in Figures 39 and 40 so that the needles in the upper cylinder take yarn at both feeds. It may be considered in the present case that transfers have been effected by a previous action of cams 362C to transfer needles to the upper cylinder, the cams thereafter being rendered inactive. The cams 362A are also inactive in this type of knitting. For good fabric it is desirable that no more than two adjacent needles should constitute any panel in the lower cylinder between needles in the upper cylinder and generally speaking, the best results are secured if a 1 x 1 arrangement of the needles in the upper and lower cylinders is used.

The jack cams are the same as in Figure 40. Of the slidable cams acting on the lower sliders only the cams 474 and 480 are now acting.

Beginning with the selection at the cams 362B, those jacks which are selected upwardly cause their lower sliders to follow the path X over the cam 559 and then over the cam 522 to pass through a knitting wave at the main feed to take yarn thereat. These sliders then pass under the cam 473 so that their needles miss yarn at the auxiliary feed. The jacks thus selected upwardly by the cams 362B follow the path indicated at T through the cross-over, the selected jacks merging with the unselected jacks through the action of the cam 514.

Those jacks which are not selected by the cams 362B are lowered by the cam 558' and follow the path U through the cross-over, being raised by the cam 562 and lowered by the cam 555. The corresponding sliders follow the path Y beneath the cams 559 and 522 and are first raised by their jacks as the jacks rise over the cam 562. These sliders are then raised by the cam 473 and the cam 474 to clearing level, thereafter taking yarn at the auxiliary feed.

As will appear from the foregoing, patterning may result from the various alternative selections which are possible by the cams 362B.

A needle which draws a loop of auxiliary yarn may be selected to again take auxiliary yarn in the next round, in which case a float of main yarn will occur.

Alternatively, a needle which takes yarn at the auxiliary feed may be selected to take yarn at the main feed in the next round, in which case no float will occur between the two loops.

A needle which takes yarn at the main feed may be selected to take yarn again at the main feed, in which case a float of auxiliary yarn will be produced.

A fourth alternative is for a needle which takes yarn at the main feed to be selected to take yarn in the next round at the auxiliary feed, in which case two floats, first of auxiliary yarn and then of main yarn, will be produced. By combinations of these four alternatives quite elaborate patterns may be produced.

Figure 52 is illustrative of the structure of the resulting fabric. In this figure the yarn at the auxiliary feed is indicated in white while the yarn at the main feed is shaded. The wales $W_1$, $W_3$, $W_6$ and $W_7$ are produced by needles in the upper cylinder and will be observed to consist of alternate loops of the two yarns. The wales $W_2$, $W_4$ and $W_5$ are formed by needles in the lower cylinder. In the case of the wale $W_2$ the needle is shown consistently taking yarn at the main feed only and accordingly loops are drawn in the courses $V_1$, $V_3$ and $V_5$, while floats of the auxiliary yarn occur in the courses $V_2$, $V_4$ and $V_6$. In the case of the wales $W_4$ and $W_5$ the needles are indicated as having been selected to take yarn at the main feed with the next selection to take yarn at the auxiliary feed so that floats are produced of the auxiliary yarn in course $V_2$ and of the main yarn in course $V_3$. Following the selection to take yarn at the auxiliary feed in the course $V_4$, the selection is again made to take yarn at the auxiliary feed in the next course and accordingly a float of main yarn is produced in each wale in the course $V_5$. This is followed by a selection to take yarn at the main feed in the course $V_7$ with the result that no float occurs between the loops drawn by the needles.

Figure 42 illustrates the formation of a somewhat more elaborate fabric in which two feed cross-over rib knitting is involved in a fabric containing panels or areas of links and links or other rib design. As will be evident by comparison with Figure 41, the cam set-up is the same except that cams 498, 500, 506, 510 and 508 are additionally active. Cams 362C are also now active to provide selection for links and links for rib knitting.

Cams 362B effect upward selection of all jacks except those associated with needles which are to knit in the lower cylinder at the auxiliary feed, i. e., upward selection of needles occurs at this point if the needles are to knit in the lower cylinder at the main feed or are to be transferred or retransferred to the upper cylinder. Ordinarily in the regions in which cross-over rib knitting is to occur needles are transferred down from the upper cylinder to the lower cylinder under the action of the cam 498 and are immediately retransferred into the upper cylinder by reason of the jack action under control of the cams 362C. Where links and links or other rib designs occur, however, any desired selection of needles for transfer may take place.

Comparison with Figure 41 and the description thereof will make clear that so far as the cross-over rib knitting is concerned the needles are identically handled and consequently the description of the operations involved need not be repeated. In the case of the links and links or rib regions, the lower cylinder needles follow the path X and take yarn at the main feed. Needles in the upper cylinder take yarn at both feeds in both the cross-over rib regions and the links and links or ordinary rib areas. The movement of the jacks to effect needle transfer to the upper cylinder is indicated at T'. At X' are moving those sliders which carry both needles which are to knit at the main feed and which are to be transferred to the upper cylinder.

Figure 43 illustrates the formation of a fabric including two feed cross-over rib knitting with wrapped regions together with other regions of links and links or other rib design. In the cam arrangement for this purpose there are provided various cams of types not heretofore described as at 555', 564, 566, 568 and 534E. A cross-over arrangement is provided between the selection cams 362A and 362B, the cross-over including cams 570 and 572 corresponding to cams 540 and 542 heretofore described and cooperating to provide a dovetail passage together with the associated cams 574 and 576 which correspond to cams 546 and 550.

The description of the operation may be considered beginning at the cam 553 where all of the jacks have been brought together for selection by the cams 362A. These cams select upwardly the jacks which are associated with lower cylinder needles which are to knit at the second feed. The selected jacks rise over the cam 534E and then by the action of cam 555' are lowered past the cross-over point whereupon they cross the cam 514 which is in outer inactive position and move beneath the cams 568 and 482 to be raised by the cam 552 which is active. At this point they join the other jacks. As will be evident the jacks selected by the cams 362A cannot thereafter be selected by either of the sets of cams 362B or 362C prior to their return to the location of cams 362A for reselection.

The jacks which are not selected by the cams 362A are raised by the cam 564 and then lowered by the cam 566 to a level to enter the dovetail passage between the cams 570 and 572. These jacks are then raised by the cam 576 and are consequently caused to cross over the jacks which were selected at 362A. After levelling by the cam 567 the jacks following the path now under discussion may be selected by the cams 362B. Those which are selected upwardly follow the cam 534B raising their needles for wrapping. Those so raised then join the jacks unselected at 362B under the action of the cam 557 and pass for selection to the cams 362C where selection occurs for transfer in the fashion previously described. All of the jacks passing over the cam 482 are then lowered by the cam 512 to join the jacks moving below the cam 482. It will be noted that no cross-over occurs in this case at the position of the cross-over cam 540.

The jack actions just described produce movements of the lower sliders as indicated. Those sliders which control needles to take yarn at the auxiliary feed rise above the cam 473 under the action of their jacks and are lifted to clearing level by the cam 474 thereafter being lowered by the cams 480 and 466 so that their needles take yarn at the auxiliary feed 464. Thereafter these sliders pass beneath the cams 559 and 522 and their needles move at low level past the main feed to miss yarn. The sliders associated with needles which do not take yarn at the auxiliary feed, whether or not they are raised for wrapping, pass upwardly over the cam 522 to clearing level. Certain of the needles associated with these sliders may then be transferred to the upper cylinder. The empty sliders from which needles are transferred then follow the path K. The other sliders which still carry needles pass under the stitch cams at the main feed to take yarn thereat.

The upper sliders follow the path heretofore described to control the needles in the upper cylinder to take yarn at both feeds.

From the several descriptions which have been presented of typical fabric formations it will be evident that the machine described is capable of being modified to make a large variety of different patterns of fabric, including those described and numerous others. In general, all that is involved in changing from one type of fabric to another is the selection of positions of various bolt cams with substitutions of various arrangements of jack cams which are made interchangeable. While it will be evident that these various jack cams could be made selectively movable into and out of active position, the machine is simplified by providing for substitutions of cams rather than their movements inasmuch as, in general, a machine of this type will be operated for long periods for the formation of a single type of fabric and the work involved in substituting cams is minor in comparison with the changes of the patterns on the trick wheel and the other changes to be made on the controlling devices of the machine in passing from one type of fabric to another.

In the knitting of stockings it will be evident that the patterning described above will, in general, be carried through the leg and instep of each stocking. The controlling devices associated with the trick wheels which control the selection cams 362A, 362B and 362C may interrupt the patterns in the soles of the stockings by rendering inoperative groups of the cams which, in the formation of the leg, correspond to the rear of a stocking. However, the preferred method is to render inactive the jacks 356 with short butts 344C, so they cannot be selected at stations 362A, 362B or 362C, by stepping out cams 514 and 552 so that only long butts 344A and 344B are raised and racked outward for selection. Meanwhile cams 520, 472 and 474 are stepped in to raise butts 12c of sole sliders 4c causing all sole needles to take yarn at both knitting stations in the lower cylinder during two feed knitting. This action occurs ahead of the heel and in the foot. The advances of the trick wheels are simultaneously interrupted, as described heretofore, during the formation of heels and are simultaneously timed up during the formation of toes as mentioned heretofore.

In the present machine wrapping of the needles occurs after they are raised to tuck level following the drawing of loops and the casting off of previous stitches. Wrapping at tuck level has the advantages that the cylinders need not be separated as far as would be necessary if wrapping were done at clearing level, and that wrapping may be done below the sliding walls without having to move them to an extreme height. The needles are better supported by the lower cylinder when they are wrapped, being projected above it to a minimum degree. The wrapping operation will be made clear from a consideration of Figures 5 and 9 to 20, inclusive. Selection of the wrap yarn is effected by the control of the sliders 212 from the main cam drum of the machine through plungers 218. The cams 204 are thus rendered selectively active and if an active cam is reached by a butt 73 of a sliding element 72 the corresponding wrap yarn finger or carrier is projected outwardly across a needle circle in advance of a series of needles in the lower cylinder and generally immediately following a group of needles in the upper cylinder. The outward projection of the lower end of the wrap yarn carrier occurs just prior to engagement with the abutment 224 and at a position following the completed rise due to cam 559 of a lower slider which controls a needle supposed to take the wrap yarn. The condition immediately following the rocking outwardly of the lower end of the wrap yarn carrier is illustrated in Figure 9 and 10. The wrap yarn extends from the point at which it was last knit into the fabric and accordingly it is drawn about the portion 186 of the wrap horn. As will be clear from Figure 9, the wrap yarn extends across the needle circle at a level below the upper ends of the upwardly selected needles but at a level above the hooks of the needles which were not selected.

The cams 204 and 222 may be arranged as indicated in Figure 38. The uppermost cam 204 is arranged to provide for the wrapping of wide panels and is sufficiently long to delay the return of a wrap yarn carrier by its spring until the last needle of a wide panel is passed by the carrier, the positive return cam, the upper one of the cams 222, being arranged for correspondingly delayed action. The two lower cams 204 and the lower return cam 222 act upon the carriers for more usual narrower multiple needle panels. The middle cam 204 acts on carriers associated with instep needles, while the lowermost cam 204 acts on carriers associated with sole needles. Thus, when the lowermost cam is withdrawn, the wrapping in the instep may be continued without wrapping in the sole.

As rotation proceeds, the wrap yarn carrier is retarded by the abutment 224, the spring which holds this abutment being sufficiently strong so that it will retain its fixed position while the long wrap yarn carrier flexes relative to the cylinders and away from the edge 98 of its corresponding fin 96, with which it was previously in contact and which guided its outward movement. Accordingly, as indicated in Figures 11 and 12, the wrap yarn is presented to the selected needles below the bills of their hooks.

The action of one of the cams 222 then returns the lower end of the wrap yarn carrier inwardly, releasing it from the abutment 224, whereupon it immediately snaps into its original position in contact with its fin 96, the latter condition being illustrated by the position existing in Figures 2, 13 and 14. During this inward movement of the lower end of the wrap yarn carrier, the yarn is cammed downwardly about the depending extension 87.

Up to this time the sliding wall elements 22 have been raised due to the action of the cam rise 371, so that they are out of position to interfere with the movements of the wrap yarn carrier. (Prior to this the verge elements 32 were lowered by the cams 375 at the main feed and 377 at the auxiliary feed to cooperate with rib needles knitting in the upper cylinder at these feed points to aid in the formation of the rib stitches, this action occurring whenever rib needles form stitches at the feeds. The sliding wall elements 22 had similar, but inactive, movements.) The sliding wall elements 22 are now lowered by the cam 373 at the time of rise of the unselected needles due to the cam 522. As these unselected needles rise, the lower edges 30 of the movable walls engage the wrap yarn, as indicated in Figure 17, and due to the slope of these edges, the wrap yarn extending between the selected needles is cammed or held inwardly, so that the rising unselected needles will pass outside the wrap yarn to provide proper interlacing, as also indicated in Figure 17. At about the same time, the needles carrying the wrap yarn pass beyond the horizontal portion 186 of the wrap horn and reach the vertical portion 188, the upper edge of which is at a higher level than the upper surface of 186. As a consequence of this, despite the rise of the wrapped needles over the cam 522 (which rise of wrapped needles begins later than the rise of the unwrapped needles due to the higher approaching level of the former), the wrap yarn is held high in the hooks and some degree of tension is imparted thereto which is thereafter maintained to insure that the wrap yarn takes a plating position in the stitches which are drawn. The needles accordingly rise to the clearing level without any possibility that the wrap yarn will get below the latches. The entry of the elements 22 between the needles serves to limit their flexure by the wrap yarns and thus they have an additional function in avoiding damage.

As the needles move down the cam 452, the wrap yarn is brought into contact with the plating cam slope 194, which overlaps the end 190 of the wrap horn. As indicated in the successive views, Figures 18, 19 and 20, this results in a substantial tensioning of the wrap yarn, resulting in plating when the wrap yarn, along with the main yarn taken at the main yarn feed, is drawn for the formation of stitches. Both the wrap yarn and the main yarn are thereafter held down by the sinkers as the needles rise to clear the latches.

The verge bits 24 with verge ends 32 function in conventional fashion to cause the proper formation of rib stitches by the needles in the upper cylinder.

In accordance with the present invention narrow heels are provided which are knit on the needles controlled by the sliders 4c, which sliders, as pointed out heretofore, occupy substantially less than one-half the circumference of the cylinder. The object of the formation of the narrow heel is primarily to keep the corner needles knitting the heel away from the sweep of wrap yarns forming clocks down the centers of the sides of stockings so that wrapping can occur immediately upon coming off the heel without interruption of the clocks where they pass the heel corner. As will be evident, all of the other patterning disclosed herein may also be carried closely past the corners of the heel pocket to give designs uninterrupted from the leg into the instep. The narrow heels also have advantages in preventing the heel from showing above the tops of low shoes and of giving a better fit to the stocking over the instep.

For an understanding of the knitting of heels reference may be made to Figure 44 on which are illustrated the paths of the lower butts of both the upper and lower sliders. All of the sole needles at this time have been transferred to the lower cylinder by the action of cam 498. Cams 476 and 488 are in position to engage only long butts 18c of upper sliders and will miss the short butts 18a and medium butts 18b of upper sliders. By the action of these cams during the last rotation preceding the first reciprocation in the formation of the heel all of the upper sliders 8c are caused to move into the race at cleared level beneath the cams 478 and 496 where they act as latch guards for the needles which knit the heel.

Cams 484 and 494 are located in position to engage the long butts 16a and the intermediate butts 16b of upper sliders while missing the short butts 16c of the sliders 8c. By the action of these cams the sliders 8a and 8b are caused to follow the welt race indicated in Figure 44 passing over the stitch cams 460 and 470.

Cams 514, 552 and 560 are withdrawn for heel and toe knitting, leaving all jacks in the low inactive race. Cams 375 and 377 are raised so that the verge bits do not stretch the rib stitches held by instep needles in the upper cylinder.

During the formation of the heel yarn drawing movements are imparted to the needles through the action of the stitch cams 456 and 458 which are moved into action sufficiently far to engage the long butts 12c of sliders 4c but to miss the short butts 12a and the steps of the intermediate butts 12b of the sliders 4a and 4b, these cams overlapping the narrow part of the intermediate butts 12b without engaging the same. By reason of the positions just described of the cams 456 and 458 they will not pull down the sliders 4a and 4b and accordingly will not stretch the loops carried by the needles controlled by these sliders. Cams 472 and 501 are located to engage long butts 12c only. With the exception of cam 474 all of the other radially movable cams, including stitch cam 454, are out of action.

Figure 45:
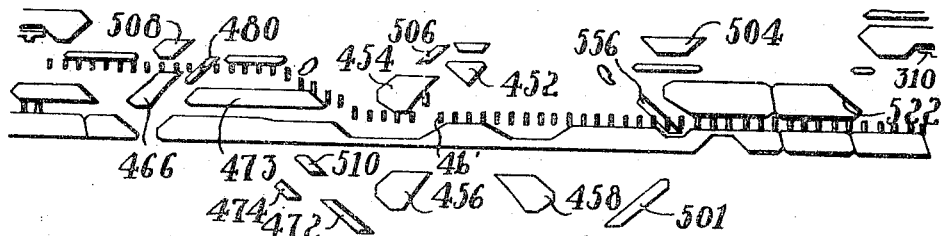

As a consequence of the cam arrangement just described the sliders 4a and 4b follow the lowermost welt race indicated in Figure 44, i. e., beneath the stitch cams 456 and 458 passing the cams 472 and 501. The sliders 4c, on the other hand, follow the upper active path indicated in this figure during forward reciprocations, i. e., these sliders are moved downwardly by the cams 452 and 456 and then upwardly to cleared level by the successive actions of the cams 472, 473 and 474. In reverse reciprocation they are moved downwardly by the cams 452 and 458 and then upwardly to cleared level by the cam 501. The action involved is illustrated in Figure 45 in which the sliders 4a and 4b are shown riding at the low inactive level while the sliders 4c pass through knitting waves in both directions of movement. The leading slider 4b is indicated at 4b', this figure representing conditions shortly prior to the end of the last rotation, at the end of which rotation the trailing slider 4c will have risen over the top of the cam 474. In Figure 45 and the successive figures of this same group the upper butts of the lower sliders are illustrated.

Figure 46:
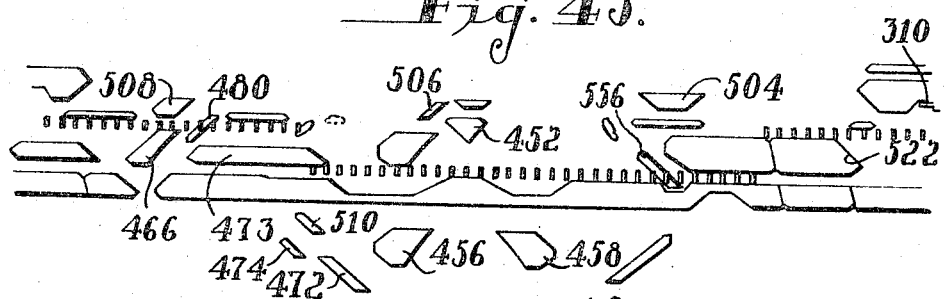
Figure 47:
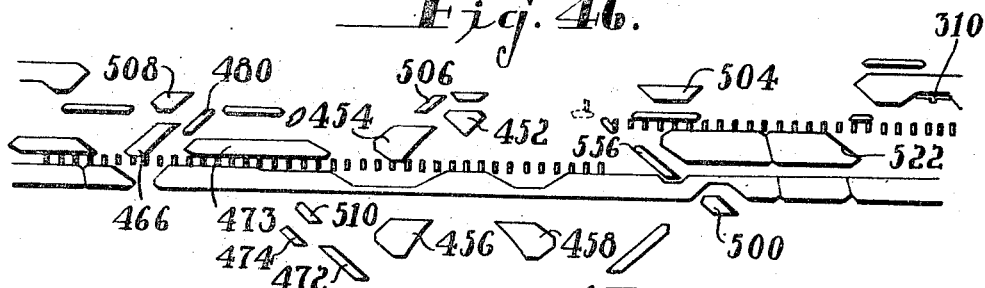

Narrowing now takes place in conventional fashion, the leading slider 4c in each reciprocation being raised by one of the pickers 512' and 514' so that the needles controlled by these sliders are successively raised out of action. At this time the lowering picker 310 occupies an upper position above the level of the upper butts of the raised sliders 4c. The picking action in the first reverse reciprocation is indicated in Figure 46 and in the following first forward reciprocation in Figure 47.

When the narrowing is completed, and the widening is to begin, the lowering picker 310 has its active end moved downwardly by the action of cam 318 on its tail portion. It is then in position to be engaged by the leading inactive sliders 4c which are to be picked downwardly.

Figure 48:
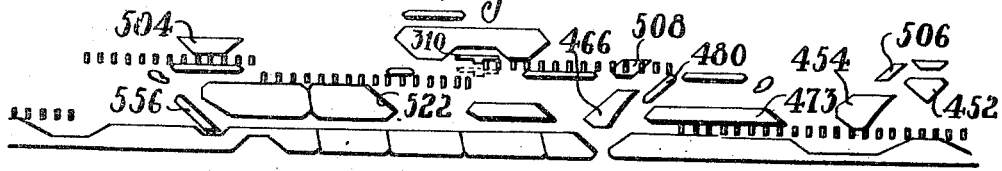
Figure 49:
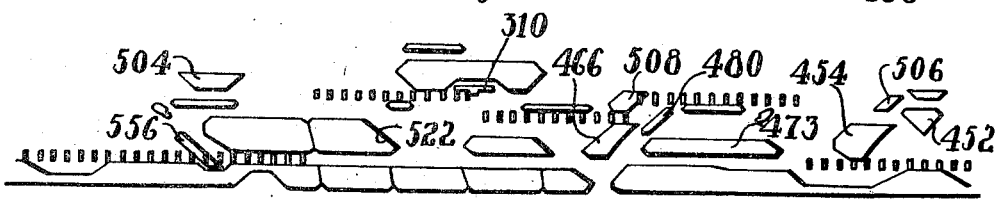

A problem now arisen, however, in the operation of the lowering picker in that unless proper precautions were taken it would be engaged by the leading inactive sliders of both groups on either end of the series of active sliders 4c in both directions of reciprocation rather than merely the leading inactive sliders 4c following the group of lower active sliders 4c. Accordingly, there comes into operation the lever 328. The initial lowering of the lowering picker by the cam 318 is caused to occur at the end of the stroke as the picker is reached by the central group of active sliders 4c. Accordingly, it will engage the butts of the first two inactive sliders following this group and they will carry it forwardly so that by the action of one of the cams 312 its inner end will move downwardly to lower these sliders to the active level. When the picker 310 is so lowered, the lever 328 will drop below its tail portion to hold it at a level between the inactive and active levels of the upper butts of the sliders 4c. It is accordingly passed by the upper butts of the inactive sliders 4c at the ends of the series of these sliders in both directions of reciprocation, being released to an upper level by the action of the cam 340 which rocks the lever 328 out from beneath the tail portion of the picker at the end of each reciprocation when the picker is reached by the central group of sliders 4c. Picking accordingly takes place in proper fashion despite the lower inactive positions of the sliders 4a and 4b which, in conventional picking operations, would ride at a high level and prevent the undesired action of the lowering picker. The widening accordingly proceeds with the lowering of two sliders and the raising of one in each reciprocation, the latter action being due to the continued action of the narrowing pickers. Figures 48 and 49 illustrate respectively the lowering picker action in forward and reverse reciprocations shortly following the release of the picker by the cam 340. Its latched inactive position is indicated in dotted lines in Figure 48.

The knitting of the heel, while holding the inactive instep needles at a low or welt level, is for the purpose of making possible the immediate wrapping of instep needles at tuck level upon completion of the heel and also to make unbroken float and tuck patterns since the loops carried by the inactive instep needles will not have cleared the latches prior to restoration to action. In the restoration of the sliders 4a and 4b to operation following the completion of the heel they are caused to ride upwardly by the restoration of cam 514 to action so that immediately upon coming into action jacks may pass through the necessary selection to render needles ready to take the wrap yarn. Stitch cam 454 is again rendered active, moving down while the long butts 12c are being moved by cam 456. Stitch cams 456 and 458 are withdrawn. It may here be noted that all required cam movements in the present machine not specifically described are under conventional control by a main cam drum so that detailed description is unnecessary. Insertion of cams takes place in general either when no butts are passing them or during the passage of short butts with completion of inward movement following such passage in the step fashion just indicated. At the completion of the heel the trick wheels, the advances of which were interrupted, are again stepped around to control the patterning.

In the formation of the foot substantially the same operations as occurred during the formation of the leg are permitted to take place with the exception that in the formation of the foot wrapping may be interrupted in the sole and there may also be interrupted in the sole other pattern formation such as occurred in the leg and should now continue through the instep. Wrapping in the sole is interrupted by control of the wrap yarn cams 204 as described above in conjunction with a proper butt differentiation at 73 between the wrap yarn carriers which wrap instep needles and those which wrap sole needles.

The formation of the toe is carried out in a fashion quite similar to the formation of the heel with the exception that in the formation of the toe the sliders 4b and 4c together constitute the group controlling active needles. Likewise, the sliders 8b join the sliders 8c so far as their paths are concerned. As will be evident, this requires that the cams 476 and 488 should engage not only long butts 18c but intermediate butts 18b while missing short butts 18a, while cams 484 and 494 are located to engage long butts 16a while missing intermediate butts 16b and short butts 16c. Stitch cams 456 and 458 are moved all the way inwardly to engage not only the butts 12c but the high inner portions of the butts 12b. Cams 472 and 501 are positioned to engage not only the long butts 12c but the intermediate butts 12b as well. As a result of these cam positions the panel of needles knitting the toe is increased beyond the panel knitting the heel so that, as usual, approximately one-half the needles are used for the formation of the toe.

The formation of the toe is followed by the formation of loopers rounds in the fashion described above.

The present machine involves the action of the heel take up 106 but since this forms no part of the present invention reference may be made to the aforementioned patent of Paul W. Bristow, No. 2,555,870 for a discussion of its operation.

The same Bristow patent describes the special sinker wave which is desirable to prevent the yarn from being retained, with the formation of loops, under the nebs of sinkers during the passage of the idle needles in reciprocation at low level.

Various fabrics and stockings comprising the same produced in accordance with the foregoing are new and constitute aspects of the present invention. The description of the various knitting operations will have indicated generally the nature of the fabrics produced but there will now be described the characteristics of these fabrics and stockings.

Reference may first be made to the patterned fabrics produced by the operations described above in conjunction with Figure 43. The fabrics so produced may contain in numerous combinations what might be designated individual stitch elements consisting of various arrangements of the yarns. The combinations of these stitch elements which may be provided by suitable arrangements of butts on the trick wheels, by suitable controls of the wrap fingers, and by other controls, constitute the fabrics of which the machine in the set-up of Figure 43 is capable. Figure 53 is a diagrammatic representation of the constitution of a fabric and illustrates the various stitch elements which are producible in accordance with Figure 43 and the description thereof.

In order to correlate the stitch elements of Figure 53 with the operations in accordance with Figure 43 the stitch elements are indicated by coded designations which are tied up with the jack and slider paths. The letters J with superscripts and subscripts A, B and C represent the jack paths as controlled by the respective selecting cams 362A, 362B and 362C. A letter superscript associated with a J indicates that the jacks are raised by the cams 362 associated with the corresponding letter, while a subscript indicates that the jack is not raised by the cams 362 carrying the corresponding letter. These stitch elements may be best regarded as having their origins in the events following the approach of the sliders and jacks to the cams 362A.

As will be evident from Figure 43 there are four approach paths of the sliders which in Figure 43 are designated in small circles as 1a, 1b, 2 and 3. Path 1a results from knitting at the auxiliary feed 464, effected by raising of a jack by a cam 362A, and an inactive position of cam 556. Path 1b results from knitting at the auxiliary feed and an active position of cam 556 which raises needles to tuck level at the main feed. Path 2 results from either cross-over action bringing needles to clearing level over cam 522 or from transfer of needles from the upper cylinder without retransfer to the upper cylinder. Path 3 results from transfer of needles to the upper cylinder. The numeral with or without a letter following the jack designation indicates the corresponding path of approach of the slider associated with the jack. The letter W means that a wrap yarn is presented across the needle circle at the wrap position above the cam 559. The absence of a W means either that no wrap finger moves its yarn outwardly to take a path engageable by or crossing the needle in question, or, alternatively, means that if a wrap yarn is thus presented it is not engaged with a needle and consequently does not enter into the stitch. Which of the two alternatives is involved will be obvious from the figure. Below each stitch element there are one or more numbers with or without letters indicating the path or paths which may possibly follow the stitch elements, representing accordingly the stitch elements which may be subsequent to those indicated.

The first loop having its shanks open at the top of each of the indicated elements in general represents the loop which is carried by the needle at the time of entry into the knitting phase which is under consideration. Where these loops are indicated in dotted lines there is intended to be represented any of the alternative loop structures which may be carried by needles engaged by sliders, or corresponding to sliders, entering the knitting phase under consideration along the various numbered paths.

The yarn fed at the main feed is represented shaded by hatching; the yarn fed at the auxiliary feed is unshaded; and a wrap yarn is stippled.

With the above explanation, Figure 53 will be clear and only a few additional remarks are necessary.

Where incorporation of a wrap yarn is involved there are indicated in triple sets of stitch elements respectively the incorporation of the yarn in the stitch element, the omission of the wrap yarn from the next stitch element and the incorporation of the yarn in the third stitch element in order to indicate the characteristic structures obtained in panel wrapping of a plurality of needles with an intermediate needle which is not wrapped. As will be evident the sliders associated with the first and third stitch elements move upwardly over the cam 559 by reason of upward selection of their jacks by cams 362B, while the sliders associated with the second stitch element pass under the cam 559 by reason of their not being selected upwardly by any of the cams 362B.

Whereas indicated in the central groups of stitch elements in the first three rows of Figure 53, the needles, after having wrap yarns wrapped thereon, are transferred before reaching the main feed, the wrap yarns are not actually knit into stitches but are merely tied into the fabric by being looped about the shanks of rib loops. In such case the wrap yarn is scarcely, if at all, apparent on the face of the fabric and the resulting structure is merely an incident of the operation involved.

In the last groups of stitch elements of the first three rows in Figure 53 there are indicated the stitch elements involving the incorporation of the wrap yarns into loops drawn in the lower cylinder in which case the wrap yarn is plated over the loop so as to appear on the face of the fabric for the formation of a wrap design. It is to be noted that the loop actually wrapped is the one drawn in the next round past the main feed. Consequently, it will be understood that, while for simplicity the wrap yarn is not indicated in the first loop of the main yarn in the various stitch elements which involve entrance of sliders on the path 2, this loop will actually include the wrap yarn when wrapping has occurred in the previous phase.

When a needle is in the upper cylinder at the time of passing the wrapping location there may not be projected across the needle cylinder any wrap finger which would have a path of movement past the position of such needle, consequently wrap yarn incorporation cannot be involved in the stitch elements of the fourth group. Accordingly, various combinations of jack paths as indicated will give rise to the same stitch elements. Figure 53 is, therefore, to be read with this limitation in mind.

In order to avoid undue complication of Figure 53 there has not been illustrated still another stitch element producible by making cam 472 active, this cam being movable inwardly and outwardly as permitted by the short and long butts of the lower sliders in conventional fashion, the movement of the cam inwardly taking place in a complete revolution in successive steps, first against the short butts and then, after their passage, to full inward position. If cam 472 is active, the lower sliders will move over cam 473 without the needles' rising to clearing level. As a consequence yarn will be taken at the auxiliary feed 464 with consequent tucking. Accordingly, where floats of the auxiliary yarn are illustrated in Fig. 53, tucking may be alternatively produced, giving rise to still further types of stitches. This type of operation is more fully described in connection with Figure 55.

It may be noted that usually tucking should occur on no more than two successive needles since resulting floated loops on the outside of the needles may cause trouble by getting outside the sinker wave and the verge bit line. While, therefore, in the illustration of approaches along path 1b, tucking on three successive needles is illustrated, this in general should be avoided. The same remarks would apply to the operations discussed in the preceding paragraph.

From the foregoing it will be clear that there are possible a very large number of combinations of the stitch elements illustrated with resulting possible great complexity of the fabric structure. Wrap panels may be produced in an almost unlimited variety of forms involving therein unwrapped loops between wrapped loops as well as wrapped loops in adjacent wales. Various areas of the fabric may incorporate a wide variety of rib or links and links designs. Still other areas may involve designs produced by floating and tucking, and in particular there may be incorporated areas involving the crossover rib structure previously described and illustrated in Figure 52. Since all of these matters may be incorporated in a single fabric, it will be evident that extremely complex fabric structures are possible, designs being further made variable if desired by yarn changes at both the main and auxiliary feeds to incorporate in the fabric differently colored yarns.

Consideration of Figure 53 will show that this figure embodies all the stitch elements and fabric structure possibilities of the arrangements of the machine elements described in connection with Figures 40, 41 and 42, which are arrangements producing results falling short of the complexity of those of Figure 43.

Figure 54 is similar in its general character to Figure 53 and illustrates in similar fashion the stitch elements which are producible in various combinations through the use of the cam arrangement of Figure 38. The letter K associated with the lettered superscripts and subscripts has the same significance in defining the jack paths as in the case of the letter J in Figure 53. Again the events are initiated with the approach of the lower sliders to the first feed. The lower slider paths are as designated in Figure 38. This Figure 54 requires no special consideration, it being obvious that an extreme variety of combinations of wrap, links and links, rib, tuck and float designs is possible.

Figure 55 is a further figure similar to Figure 53 but illustrative of the stitch elements which are producible using the cam set-ups of Figure 39. Here the letter L is used with appropriate superscripts and subscripts to indicate the jack paths in combination with the lower paths designated in Figure 39, the events being initiated in the main feed. The letter F is used to indicate that the cam 472 is out of action so as to produce a float at the auxiliary feed when a jack is not selected upwardly by any of the cams 362A. The letter T is used to indicate the result of activity of the cam 472 to cause a slider to rise to the tuck level at the auxiliary feed when associated with a jack which is not selected upwardly by any of the cams 362A. As pointed out above, the stitch elements involving the letter T will serve to illustrate the nature of the stitch elements which could be produced through the activity of the cam 472 in the cam arrangement of Figure 43.

Figure 55 illustrates the possibility of a very great variety of combinations of stitch elements involving tucking and floating at both feeds together with links and links and rib formation.

Figure 51 indicates diagrammatically the component parts of stockings formed in accordance with the procedures indicated above. As will have become apparent, stockings are produced in a continuous series by the present machine, to be separated by removal of draw threads. In Figure 51, 598 indicates the terminal portion of a stocking preceding the one which will be briefly described. The loopers rounds 600, the formation of which constitutes the first event described above, are followed by 1 x 1 rib which need only be approximately one course in extent, this being indicated at 602. Following this at 604 is one of the draw thread constructions previously described including, in the case of the press-off draw thread, a preliminary welt formation.

The draw thread structure is followed at 606 by a welt and the top of the stocking is preferably formed as 1 x 1 ribbed fabric 608 formed with single or two feed.

The rib top is followed by the leg 610, which, in Figure 51, has been illustrated without an attempt to show its structure, since its structure may be of any of the numerous types previously described. It will be evident that all of the types of patterns which have been discussed are consistent with the formation of the other parts of the stocking, and may be interrupted during the formation of the heel, above the heel, and in the sole as indicated. In particular, designs (wrap, tuck, float, rib, links and links, jacquard, etc.) may be carried continuously from the leg into the instep past the corners of the heel in those wales which form the toe but not the heel.

Preceding the formation of the heel, plain fabric may be knitted as indicated at 612 on the needles which are to form the sole, this being accomplished by interruption of the patterning. The narrow heel which has been described above is indicated at 614 and it will be noted that its corners terminate short of the wale indicated by the chain line 616 which corresponds to the corner of the toe. The leg patterning will normally be continued through the instep 618 but may be interrupted in the sole 620 where plain fabric is knit with single or two feed.

An advance toe 622 of plain fabric may precede the toe 624 which is followed by the loopers round 600 completing the cycle. It will be evident from the description of the machine that stockings of numerous types other than that just indicated may be produced and also that the invention is applicable to the knitting of other articles than stockings. It is, therefore, to be understood that the invention described herein is not to be construed as limited except as required by the following claims.

What we claim and desire to protect by Letters Patent is:

1. A knitting machine comprising a pair of cylinders, double-ended needles slidable in said cylinders, sliders mounted in said cylinders and movable to control movements of said needles, means for feeding at least two yarns to said needles, means for presenting at least one wrap yarn to needles, and means actuating said sliders and said wrap yarn presenting means to produce in one area of a fabric wales in some of which loops are concatenated in one direction and in others of which loops are concatenated in the opposite direction, with wales of the first mentioned type comprising loops of alternate yarns drawn in successive courses, and the wales of the second mentioned type comprising concatenated loops drawn in non-successive courses and crossed by floats in intermediate courses, to produce wrapping in another area thereof, and to produce in a third area of the fabric wales of said yarns in some of which loops of alternate yarns drawn in successive courses are concatenated in one direction and in others of which loops of alternate yarns drawn in successive courses are concatenated in the opposite direction.

2. A knitting machine comprising a pair of cylinders, double-ended needles slidable in said cylinders, sliders mounted in said cylinders and movable to control movements of said needles, means for feeding yarn to said needles, means for presenting at least one wrap yarn to needles, and means actuating said sliders and said wrap yarn presenting means to produce in an area of a fabric wales having tuck designs formed therein by the concatenation of loops with combined loops drawn from a plurality of courses, and to wrap at least one of the first mentioned loops.

3. A knitting machine comprising a pair of cylinders, double-ended needles slidable in said cylinders, sliders mounted in said cylinders and movable to control movements of said needles, means for feeding at least two yarns to said needles, means for presenting at least one wrap yarn to needles, and means actuating said sliders and said wrap yarn presenting means to produce in an area of a fabric wales having tuck designs formed therein by the concatenation of loops with combined loops of different yarns drawn from a plurality of courses, and to wrap at least one of the first mentioned loops.

4. A knitting machine comprising a pair of cylinders, double-ended needles slidable in said cylinders, sliders mounted in said cylinders and movable to control movements of said needles, means for feeding yarn to said needles, means for presenting at least one wrap yarn to needles, and means actuating said sliders and said wrap yarn presenting means to produce in an area of a fabric wales in which float designs are produced by the concatenation of loops with loops drawn from a non-succeeding course with floating across the first mentioned loops of yarn of at least one intermediate course, and to wrap at least one of the second mentioned loops.

5. A knitting machine comprising a pair of cylinders, double-ended needles slidable in said cylinders, sliders mounted in said cylinders and movable to control movements of said needles, means for feeding at least two yarns to said needles, means for presenting at least one wrap yarn to needles, and means actuating said sliders and said wrap yarn presenting means to produce in an area of a fabric wales in which float designs are produced by the concatenation of loops with loops drawn from a non-succeeding course with floating across the first mentioned loops of a yarn other than the yarn of the second mentioned loops of at least one intermediate course, and to wrap at least one of the second mentioned loops.

6. A knitting machine comprising a needle cylinder, latch needles carried by said cylinder, means for feeding main yarn to the needles, means for presenting at least one wrap yarn to needles, means for selecting at least one needle and moving the selected needle to a level to cause a stich previously drawn by its hook to occupy a position on its latch without clearing the latch, means cooperating with the wrap yarn presenting means to effect engagement of a wrap yarn with the needle at a level between the hook and said stitch while the needle occupies the last mentioned level, means for thereafter moving said needle to a level to cause said stitch to clear the latch, means for engaging the portion of the wrap yarn extending from the needle to a point where the wrap yarn was previously knit into the fabric to cause said yarn to remain in engagement with the needle at a level between the end of the latch and the hook, and means for thereafter causing the needle to move to take yarn from the main yarn feeding means.

7. A knitting machine comprising a needle cylinder, latch needles carried by said cylinder, means for feeding main yarn to the needles, means for presenting at least one wrap yarn to needles, means for selecting at least one needle and moving the selected needle to a level to cause a stitch previously drawn by its hook to occupy a position on its latch without clearing the latch, means cooperating with the wrap yarn presenting means to effect engagement of a wrap yarn with the needle at a level between the hook and said stitch while the needle occupies the last mentioned level, means for thereafter moving said needle to a level to cause said stitch to clear the latch, means for engaging the portion of the wrap yarn extending from the needle to a point where the wrap yarn was previously knit into the fabric to move said yarn in the direction of clearing movement of the needle to cause it to remain in engagement with the needle at a level between the end of the latch and the hook, and means for thereafter causing the needle to move to take yarn from the main yarn feeding means.

8. A knitting machine comprising a needle cylinder, latch needles carried by said cylinder, means for feeding main yarn to the needles, means for presenting at least one wrap yarn to needles, means for selecting a plurality of needles and moving the selected needles to a level to cause stitches previously drawn by their hooks to occupy positions on their latches without clearing the latches, means cooperating with the wrap yarn presenting means to effect engagement of a wrap yarn with said selected needles at a level between the hooks and said stitches while the needles occupy the last mentioned level, means for thereafter moving said selected needles to a level to cause said stitches to clear the latches, means for engaging the portion of the wrap yarn extending from the needles to a point where the wrap yarn was previously knit into the fabric to cause said yarn to remain in engagement with the needles at a level between the ends of the latches and the hooks, means for moving unselected needles to join the selected needles at the last mentioned level, so that stitches carried by the unselected needles clear their latches, and means for thereafter causing both selected and unselected needles to move to take yarn from the main yarn feeding means.

9. A knitting machine comprising a needle cylinder, latch needles carried by said cylinder, means for feeding main yarn to the needles, means for presenting at least one wrap yarn to needles, means for selecting a plurality of needles and moving the selected needles to a level to cause stitches previously drawn by their hooks to occupy positions on their latches without clearing the latches, means cooperating with the wrap yarn presenting means to effect engagement of a wrap yarn with said selected needles at a level between the hooks and said stitches while the needles occupy the last mentioned level, means for thereafter moving said selected needles to a level to cause said stitches to clear the latches, means for engaging the portion of the wrap yarn extending from the needles to a point where the wrap yarn was previously knit into the fabric to move said yarn in the direction of clearing movement of the needles to cause it to remain in engagement with the needles at a level between the ends of the latches and the hooks, means for moving unselected needles to join the selected needles at the last mentioned level, so that stitches carried by the unselected needles clear their latches, and means for thereafter causing both selected and unselected needles to move to take yarn from the main yarn feeding means.

10. A knitting machine comprising a cylinder, needles slidable in said cylinder, jacks individually associated with said needles to impart longitudinal movements to the needles, said jacks being tiltable in said cylinder and provided with butts, and means acting upon said butts for causing jacks approaching a cross-over point along respectively upper and lower paths to following crossing paths to leave the cross-over point along respectively lower and upper paths, the last mentioned means including a passageway within which butts of jacks approaching the cross-over point along one path enter to pass therethrough, walls bounding said passageway acting to cam inwardly butts of jacks following the other path of approach and to prevent their entrance into said passageway as their path reaches the path of the jacks following the first mentioned path.

11. A knitting machine comprising a cylinder, needles slidable in said cylinder, jacks individually associated with said needles to impart longitudinal movements to the needles, said jacks being tiltable in said cylinder and provided with butts, and means acting upon said butts for causing jacks approaching a cross-over point along respectively upper and lower paths to follow crossing paths to leave the cross-over point along respectively lower and upper paths, the last mentioned means including a passageway within which butts of jacks approaching the cross-over point along one path enter to pass therethrough, means arranged to tilt outwardly the butts of the last mentioned jacks to cause them to enter said passageway, said passageway serving to retain said butts in outer position, walls bounding said passageway acting to cam inwardly butts of jacks following the other path of approach and to prevent their entrance into said passageway as their path reaches the path of the jacks following the first mentioned path, and cam means selectively engageable with butts in outer position to segregate the two sets of jacks.

12. A knitting machine comprising a cylinder, needles slidable in said cylinder, jacks individually associated with said needles to impart longitudinal movements to the needles, said jacks being tiltable in said cylinder and provided with dovetail butts, and means acting upon said butts for causing jacks approaching a cross-over point along respectively upper and lower paths to following crossing paths to leave the cross-over point along respectively lower and upper paths, the last mentioned means including a dovetail passageway within which dovetail butts of jacks approaching the cross-over point along one path enter to pass therethrough, walls bounding said passageway acting to cam inwardly dovetail butts of jacks following the other path of approach and to prevent their entrance into said passageway as their path reaches the path of the jacks following the first mentioned path.

13. A knitting machine comprising a cylinder, needles slidable in said cylinder, jacks individually associated with said needles to impart longitudinal movements to the needles, said jacks being tiltable in said cylinder and provided with dovetail butts, and means acting upon said butts for causing jacks approaching a cross-over point along respectively upper and lower paths to follow crossing paths to leave the cross-over point along respectively lower and upper paths, the last mentioned means including a dovetail passageway within which dovetail butts of jacks approaching the cross-over point along one path enter to pass therethrough, means arranged to tilt outwardly the dovetail butts of the last mentioned jacks to cause them to enter said passageway, said passageway serving to retain said butts in outer position, walls bounding said passageway acting to cam inwardly dovetail butts of jacks following the other path of approach and to prevent their entrance into said passageway as their path reaches the path of the jacks following the first mentioned path, and cam means selectively engageable with butts in outer position to segregate the two sets of jacks.

14. A knitting machine comprising a cylinder, needles slidable in said cylinder, means for feeding yarn to needles at a plurality of feed points, jacks individually associated with said needles to impart longitudinal movements to the needles, means for selecting jacks to respective upper and lower paths in advance of one of said feed points, the jacks selected to the upper path raising their needles, means for presenting a wrap yarn to needles so raised, means for causing jacks approaching a cross-over point along said respective upper and lower paths to follow crossing paths to leave the cross-over point along respective lower and upper paths, and means for raising jacks which leave the cross-over point along the upper path to raise their needles to take yarn at another of said feed points, the needles associated with jacks leaving the cross-over point along the lower path missing yarn at the last mentioned feed point.

15. A knitting machine comprising a cylinder, needles slidable in said cylinder, means for feeding yarn to needles at a plurality of feed points, jacks individually associated with said needles to impart longitudinal movements to the needles, means for selecting jacks to respective upper and lower paths in advance of one of said feed points, the jacks selected to the upper path raising their needles, means for presenting a wrap yarn to needles so raised, means for causing jacks approaching a cross-over point along said respective upper and lower paths to follow crossing paths to leave the cross-over point along respective lower and upper paths, means for causing needles associated with jacks following both of said paths to take yarn at the first mentioned feed point, and means for raising jacks which leave the cross-over point along the upper path to raise their needles to take yarn at another of said feed points, the needles associated with jacks leaving the cross-over point along the lower path missing yarn at the last mentioned feed point.

16. A knitting machine comprising a cylinder, needles slidable in said cylinder, means for feeding yarn to needles at a plurality of feed points, jacks individually associated with said needles to impart longitudinal movements to the needles, means for selecting jacks to respective upper and lower paths in advance of one of said feed points, means for causing jacks approaching a cross-over point along said respective upper and lower paths to follow crossing paths to leave the cross-over point along respective lower and upper paths, means for selecting jacks from the group leaving the cross-over point along the upper path to cause them to raise their needles, means for presenting a wrap yarn to needles so raised, and means for causing needles associated with jacks leaving the cross-over point along the upper path to take yarn at another of said feeds.

17. A knitting machine comprising a cylinder, needles slidable in said cylinder, means for feeding yarn to needles at a plurality of feed points, jacks individually associated with said needles to impart longitudinal movements to the needles, means for selecting jacks to respective upper and lower paths in advance of one of said feed points, means for causing jacks approaching a cross-over point along said respective upper and lower paths to follow crossing paths to leave the cross-over point along respective lower and upper paths, means for causing only needles associated with jacks approaching said cross-over point along the upper path to take yarn at the first mentioned feed point, means for selecting jacks from the group leaving the cross-over point along the upper path to cause them to raise their needles, means for presenting a wrap yarn to needles so raised, and means for causing needles associated with jacks leaving the cross-over point along the upper path to take yarn at another of said feeds.

18. A knitting machine comprising a pair of cylinders, double-ended needles slidable in said cylinders, sliders mounted in said cylinders and movable to control movements of said needles, means for feeding yarn to needles at a plurality of feed points, jacks individually associated with said needles to impart longitudinal movements to the needles through associated sliders, means for selecting jacks to respective upper and lower paths in advance of one of said feed points, means for selecting jacks following one of said paths to cause them to effect transfer of needles from one cylinder to the other, means for causing jacks approaching a cross-over point along said respective upper and lower paths to follow crossing paths to leave the cross-over point along respective lower and upper paths, and means for raising jacks which leave the cross-over point along the upper path to raise their needles to take yarn at another of said feed points, the needles in the lower cylinder associated with jacks leaving the cross-over point along the lower path missing yarn at the last mentioned feed point.

19. A knitting machine comprising a pair of cylinders, double-ended needles slidable in said cylinders, sliders mounted in said cylinders and movable to control movements of said needles, means for feeding yarn to needles at a plurality of feed points, jacks individually associated with said needles to impart longitudinal movements to the needles through associated sliders, means for selecting jacks to respective upper and lower paths in advance of one of said feed points, means for selecting jacks following one of said paths to cause them to effect transfer of needles from one cylinder to the other, means for causing jacks approaching a cross-over point along said respective upper and lower paths to follow crossing paths to leave the cross-over point along respective lower and upper paths, means for causing needles associated with jacks following both of said paths to take yarn at the first mentioned feed point, and means for raising jacks which leave the cross-over point along the upper path to raise their needles to take yarn at another of said feed points, the needles in the lower cylinder associated with jacks leaving the cross-over point along the lower path missing yarn at the last mentioned feed point.

20. A knitting machine comprising a pair of cylinders, double-ended needles slidable in said cylinders, sliders mounted in said cylinders and movable to control movements of said needles, means for feeding yarn to needles at a plurality of feed points, jacks individually associated with said needles to impart longitudinal movements to the needles through associated sliders, means for selecting jacks to respective upper and lower paths in advance of one of said feed points, means for selecting jacks following one of said paths to cause them to effect transfer of needles from one cylinder to the other, means for causing jacks approaching a cross-over point along said respective upper and lower paths to follow crossing paths to leave the cross-over point along respective lower and upper paths, means for raising jacks which leave the cross-over point along the upper path to raise their needles to take yarn at another of said feed points, the needles in the lower cylinder associated with jacks leaving the cross-over point along the lower path missing yarn at the last mentioned feed point, and means for causing all sliders from which needles have been transferred to follow a path presenting such sliders to receive retransferred needles.

21. A knitting machine comprising a pair of cylinders, double-ended needles slidable in said cylinders, sliders mounted in said cylinders and movable to control movements of said needles, means for feeding yarn to needles at a plurality of feed points, jacks individually associated with said needles to impart longitudinal movements to the needles through associated sliders, means for selecting jacks to respective upper and lower paths in advance of one of said feed points, the jacks selected to the upper path raising their needles, means for presenting a wrap yarn to needles so raised, means for selecting jacks following the upper path to cause them to effect transfer of needles from the lower to the upper cylinder, means for causing jacks approaching a cross-over point along said respective upper and lower paths to follow crossing paths to leave the cross-over point along respective lower and upper paths, and means for raising jacks which leave the cross-over point along the upper path to raise their needles to take yarn at another of said feed points, the needles in the lower cylinder associated with jacks leaving the cross-over point along the lower path missing yarn at the last mentioned feed point.

22. A knitting machine comprising a pair of cylinders, double-ended needles slidable in said cylinders, sliders mounted in said cylinders and movable to control movements of said needles, means for feeding yarn to needles at a plurality of feed points, jacks individually associated with said needles to impart longitudinal movements to the needles through associated sliders, means for selecting jacks to respective upper and lower paths in advance of one of said feed points, the jacks selected to the upper path raising their needles, means for presenting a wrap yarn to needles so raised, means for selecting jacks following the upper path to cause them to effect transfer of needles from the lower to the upper cylinder, means for causing jacks approaching a cross-over point along said respective upper and lower paths to follow crossing paths to leave the cross-over point along respective lower and upper paths, means for causing needles associated with jacks following both of said paths to take yarn at the first mentioned feed point, and means for raising jacks which leave the cross-over point along the upper path to raise their needles to take yarn at another of said feed points, the needles in the lower cylinder associated with jacks leaving the cross-over point along the lower path missing yarn at the last mentioned feed point.

23. A knitting machine comprising a pair of cylinders, double-ended needles slidable in said cylinders, sliders mounted in said cylinders and movable to control movements of said needles, means for feeding yarn to needles at a plurality of feed points, jacks individually associated with said needles to impart longitudinal movements to the needles through associated sliders, means for selecting jacks to respective upper and lower paths in advance of one of said feed points, the jacks selected to the upper path raising their needles, means for presenting a wrap yarn to needles so raised, means for selecting jacks following the upper path to cause them to effect transfer of needles from the lower to the upper cylinder, means for causing jacks approaching a cross-over point along said respective upper and lower paths to follow crossing paths to leave the cross-over point along respective lower and upper paths, means for raising jacks which leave the cross-over point along the upper path to raise their needles to take yarn at another of said feed points, the needles in the lower cylinder associated with jacks leaving the cross-over point along the lower path missing yarn at the last mentioned feed point, and means for causing all sliders from which needles have been transferred to follow a path presenting such sliders to receive retransferred needles.

24. A knitting machine comprising a pair of cylinders, double-ended needles slidable in said cylinders, sliders mounted in said cylinders and movable to control movements of said needles, means for feeding yarn to needles at a plurality of feed points, jacks individually associated with said needles to impart longitudinal movements to the needles through associated sliders, means for selecting jacks to respective upper and lower paths in advance of one of said feed points, means for selecting jacks following one of said paths to cause them to effect transfer of needles from one cylinder to the other, means for causing jacks approaching a cross-over point along said respective upper and lower paths to follow crossing paths to leave the cross-over point along respective lower and upper paths, means for causing only needles associated with jacks approaching said cross-over point along the upper path to take yarn at the first mentioned feed point, and means for raising jacks which leave the cross-over point along the upper path to raise their needles to take yarn at another of said feed points, the needles in the lower cylinder associated with jacks leaving the cross-over point along the lower path missing yarn at the last mentioned feed point.

25. A knitting machine comprising a pair of cylinders, double-ended needles slidable in said cylinders, sliders mounted in said cylinders and movable to control movements of said needles, means for feeding yarn to needles at a plurality of feed points, jacks individually associated with said needles to impart longitudinal movements to the needles through associated sliders, means for selecting jacks to respective upper and lower paths in advance of one of said feed points, means for causing jacks approaching a cross-over point along said respective upper and lower paths to follow crossing paths to leave the cross-over point along respective lower and upper paths, means for selecting jacks from the group leaving the cross-over point along the upper path to cause them to raise their needles, means for presenting a wrap yarn to needles so raised, means for selecting jacks from the group leaving the cross-over point along the upper path to cause them to effect transfer of needles from the lower to the upper cylinder, and means for causing needles associated with jacks leaving the cross-over point along the upper path to take yarn at another of said feeds.

26. A knitting machine comprising a pair of cylinders double-ended needles slidable in said cylinders, sliders mounted in said cylinders and movable to control movements of said needles, means for feeding yarn to needles at a plurality of feed points, jacks individually associated with said needles to impart longitudinal movements to the needles through associated sliders, means for selecting jacks to respective upper and lower paths in advance of one of said feed points, means for causing jacks ap proaching a cross-over point along said respective upper and lower paths to follow crossing paths to leave the cross-over point along respective lower and upper paths, means for selecting jacks from the group leaving the cross-over point along the upper path to cause them to effect transfer of needles from the lower to the upper cylinder, and means for causing needles associated with jacks leaving the cross-over point along the upper path to take yarn at another of said feeds.

27. A knitting machine comprising a pair of cylinders, double-ended needles slidable in said cylinders, sliders mounted in said cylinders and movable to control movements of said needles, means for feeding yarn to needles at a plurality of feed points, jacks individually associated with said needles to impart longitudinal movements to the needles through associated sliders, means for selecting jacks to respective upper and lower paths in advance of one of said feed points, means for causing jacks approaching a cross-over point along said respective upper and lower paths to follow crossing paths to leave the cross-over point along respective lower and upper paths, means for causing only needles associated with jacks approaching said cross-over point along the upper path to take yarn at the first mentioned feed point, means for selecting jacks from the group leaving the cross-over point along the upper path to cause them to raise their needles, means for presenting a wrap yarn to needles so raised, means for selecting jacks from the group leaving the cross-over point along the upper path to cause them to effect transfer of needles from the lower to the upper cylinder, and means for causing needles associated with jacks leaving the cross-over point along the upper path to take yarn at another of said feeds.

28. A knitting machine comprising a pair of cylinders, double-ended needles slidable in said cylinders, sliders mounted in said cylinders and movable to control movements of said needles, means for feeding yarn to needles at a plurality of feed points, jacks individually associated with said needles to impart longitudinal movements to the needles through associated sliders, means for selecting jacks to respective upper and lower paths in advance of one of said feed points, means for causing jacks approaching a cross-over point along said respective upper and lower paths to follow crossing paths to leave the cross-over point along respective lower and upper paths, means for causing only needles associated with jacks approaching said cross-over point along the upper path to take yarn at the first mentioned feed point, means for selecting jacks from the group leaving the cross-over point along the upper path to cause them to effect transfer of needles from the lower to the upper cylinder, and means for causing needles associated with jacks leaving the cross-over point along the upper path to take yarn at another of said feeds.

29. A knitting machine comprising a pair of cylinders, double-ended needles slidable in said cylinders, sliders mounted in said cylinders and movable to control movements of said needles, means for feeding yarn to needles at a plurality of feed points, jacks individually associated with said needles to impart longitudinal movements to the needles through associated sliders, means for selecting jacks to respective upper and lower paths in advance of one of said feed points, means for causing jacks approaching a cross-over point along said respective upper and lower paths to follow crossing paths to leave the cross-over point along respective lower and upper paths, means for selecting jacks from the group leaving the cross-over point along the upper path to cause them to raise their needles, means for presenting a wrap yarn to needles so raised, means for selecting jacks from the group leaving the cross-over point along the upper path to cause them to effect transfer of needles from the lower to the upper cylinder, means for causing needles associated with jacks leaving the cross-over point along the upper path to take yarn at another of said feeds, and means for causing all sliders from which needles have been transferred to follow a path presenting such sliders to receive retransferred needles.

30. A knitting machine comprising a pair of cylinders, double-ended needles slidable in said cylinders, sliders mounted in said cylinders and movable to control movements of said needles, means for feeding yarn to needles at a plurality of feed points, jacks individually associated with said needles to impart longitudinal movements to the needles through associated sliders, means for selecting jacks to respective upper and lower paths in advance of one of said feed points, means for causing jacks approaching a cross-over point along said respective upper and lower paths to follow crossing paths to leave the cross-over point along respective lower and upper paths, means for selecting jacks from the group leaving the cross-over point along the upper path to cause them to effect transfer of needles from the lower to the upper cylinder, means for causing needles associated with jacks leaving the cross-over point along the upper path to take yarn at another of said feeds, and means for causing all sliders from which needles have been transferred to follow a path presenting such sliders to receive retransferred needles.

31. A knitting machine comprising a cylinder, needles slidable in said cylinder, means for feeding yarn to needles, jacks individually associated with said needles to impart longitudinal movements to the needles, said jacks having outwardly extending butts which have lower edges sloping downwardly and outwardly, a cam having a downwardly and outwardly sloping upper surface, means for moving said jacks downwardly to engage the sloping edges of their butts with said sloping cam surface to cause the portions of the jacks carrying said butt to be cammed outwardly during downward movement of the jacks, and means for selectively moving longitudinally jacks so positioned.

32. A knitting machine comprising a cylinder, needles slidable in said cylinder, means for feeding yarn to needles, jacks individually associated with said needles to impart longitudinal movements to the needles, said jacks having outwardly extending butts which have lower edges sloping downwardly and outwardly, a cam having a downwardly and outwardly sloping upper surface, means for moving said jacks downwardly to engage the sloping edges of their butts with said sloping cam surface to cause the portions of the jacks carrying said butt to be cammed outwardly during downward movement of the jacks, said jacks having other variously located butts, and a plurality of cams engageable with the last mentioned butts to move the jacks longitudinally when so positioned.

33. A knitting machine comprising a cylinder, needles slidable in said cylinder, means for feeding yarn to needles, jacks individually associated with said needles to impart longitudinal movements to the needles, said jacks having outwardly extending butts which have lower edges sloping downwardly and outwardly, a cam having a downwardly and outwardly sloping upper surface, means for moving said jacks downwardly to engage the sloping edges of their butts with said sloping cam surface to cause the portions of the jacks carrying said butt to be cammed outwardly during downward movement of the jacks, said jacks having other variously located butts, a plurality of cams engageable with the last mentioned butts to move the jacks longitudinally when so positioned, and a cam engageable with the outer surfaces of the first mentioned butts of jacks which are not moved longitudinally by the last mentioned cams to move inwardly the portions of the jacks carrying the first mentioned butts, and engageable beneath the sloping lower edges of the first mentioned butts of those jacks moved longitudinally by the last mentioned cams to raise such jacks.

34. A knitting machine comprising a cylinder, needles slidable in said cylinder, and means for presenting a wrap yarn to a plurality of needles in a single wrapping operation, said means including a wrap finger, a plurality of cams arranged to project said wrap finger across the needles for different lengths of time, and a pair of cams for returning the wrap finger at different times.

35. A knitting machine comprising a cylinder, needles slidable in said cylinder, and means for presenting a wrap yarn to a plurality of needles in a single wrapping operation, said means including a wrap finger, and a plurality of cams, each of the cams being arranged to project said wrap finger across the needles at substantially the same phase in the cycle of rotary knitting, but arranged to maintain said projection of the wrap finger for different durations of time.

36. In a knitting machine equipped with latch needles, thread feeding means, and means for operating the needles to knit fabric of the thread fed by the feeding means, wrap striping or patterning mechanism comprising a wrap finger for feeding a wrap thread, means for operating it to make a wrapping traverse past a predetermined group of the needles at a stage prior to that at which the needles of said group clear their old loops, means for causing at least one selected needle of the group to occupy a higher position than the remainder thereof during said traverse and to receive the wrap thread above the uncleared old loop, means for clearing said old loop without clearing the wrap thread, means for causing each selected needle to knit the wrap thread with thread of a new course derived from the thread feeding means, and a separator for separating the old loop of the previous course from the wrap thread on each selected needle prior to clearing the old loop.

37. A superimposed needle cylinder machine, having a wrap finger mounted within the needle circle to make wrapping movements between the two cylinders to feed wrap thread to selected needles of a predetermined group thereof, means for operating said finger to make wrapping traverse circumferentially past said group of needles at a stage prior to that at which said needles clear their old loops, means for causing said needles to knit the wrap-thread with thread of a new course and a tube located between the finger and the needle cylinder with a window therein for the wrapping movements of the finger, and having a separator for separating the old loops of the previous course from the wrap threads on the needles prior to clearing, which separator is supported by the tube and extends from the leading edge of the window to a point adjacent the rear edge thereof.

38. In a knitting machine equipped with latch needles, thread feeding means, and means for operating the needles to knit fabric of the thread fed by the feeding means, wrap striping or patterning mechanism comprising a wrap finger for feeding a wrap thread, means for operating it to make a wrapping traverse past a predetermined group of the needles at a stage prior to that at which the needles of said group clear their old loops, means for causing at least one selected needle of the group to occupy a higher position than the remainder thereof during said traverse and to receive the wrap thread above the uncleared old loop, means for clearing said old loop without clearing the wrap thread, means for causing each selected needle to knit the wrap thread with thread of a new course derived from the thread feeding means, and a separator for separating the old loop of the previous course from a wrap thread on each selected needle prior to clearing the old loop, said separator being located at the plain side of the needles and extending along the line thereof at a height below that at which the wrap thread is applied to each selected needle.

39. A method of wrap striping or patterning in a knitting machine having independent latch needles, which comprises laying a wrap thread past a predetermined group of the needles at a stage prior to that at which the needles of that group clear their old loops, positioning each selected needle, of said group, that is required to receive and knit the wrap thread at a level which is less than the clearing height but is greater than the height of the remaining needles of the group and is such that each selected needle receives the wrap thread above the uncleared old loop, clearing the old loops from the needles without clearing the wrap thread on each selected needle, feeding thread for a new course to the needles including each selected needle and causing the needles to knit said new thread, in which latter operation each selected needle knits the wrap thread along with the new thread.

40. In a knitting machine having independent latch needles and means for feeding thread to them to be knitted into courses of fabric, wrap striping or patterning mechanism having means for laying a wrap thread past a predetermined group of the needles at a stage prior to that at which the needles clear their old loops, means for positioning at least one selected needle of that group at a height, less than clearing height but above the remaining needles of the group, such that each such selected needle receives the wrap thread above its old loop, means for clearing the old loops from the needles without clearing the wrap thread from each selected needle, and means for operating the needles to take and knit new thread for a new course of the fabric and for causing each said selected needle to knit the wrap thread along with the thread of the new course.

41. A superimposed needle cylinder machine, having a wrap finger mounted within the needle circle to make wrapping movements between the two cylinders to feed wrap thread to selected needles of a predetermined group thereof, means for operating said finger to make wrapping traverse circumferentially past said group of needles at a stage prior to that at which said needles clear their old loops, means for causing said needles to knit the wrap-thread with thread of a new course, and a tube located between the finger and the needle cylinder with a window therein for the wrapping movements of the finger.

42. A superimposed needle cylinder machine, having a wrap finger mounted within the needle circle to make wrapping movements between the two cylinders to feed wrap thread to selected needles of a predetermined group thereof, means for operating said finger to make wrapping traverse circumferentially past said group of needles at a stage prior to that at which said needles clear their old loops, means for causing said needles to knit the wrap-thread with thread of a new course, and a tube located within the upper cylinder between the finger and said cylinder, which tube has a lower edge for holding down the fabric and a window for the wrapping movements of the finger.

43. A knitting machine comprising a pair of cylinders, double-ended needles slidable in said cylinders, sliders mounted in said cylinders and movable to control movements of said needles, means for feeding at least two yarns to said needles, means for selectively transferring needles from one cylinder to the other to produce links-links patterns, means for presenting at least one wrap yarn to needles, and means actuating said sliders and said wrap yarn presenting means to produce in one area of a fabric wales in some of which loops are concatenated in one direction and in others of which loops are concatenated in the opposite direction, with wales of the first mentioned type comprising loops of alternate yarns drawn in successive courses, and the wales of the second mentioned type comprising concatenated loops drawn in non-successive courses and crossed by floats in intermediate courses, and to produce wrapping in another area thereof of loops concatenated in the direction of the loops of the wales of the second mentioned type.

44. A knitting machine comprising a pair of cylinders, double-ended needles slidable in said cylinders, sliders mounted in said cylinders and movable to control movements of said needles, means for feeding yarn to needles at a plurality of feed points, jacks individually aligned with said needles to impart longitudinal movements to the needles through associated sliders, means for selecting jacks to respective upper and lower paths in advance of one of said feed points, means for selecting jacks following one of said paths to cause them to effect transfer of needles from one cylinder to the other, means for causing jacks approaching a cross-over point along said respective upper and lower paths to follow crossing paths to leave the cross-over point along respective lower and upper paths, means for causing needles in both cylinders aligned with jacks following both of said paths to take yarn at the first mentioned feed point, and means for raising jacks which leave the cross-over point along the upper path to raise needles in the lower cylinder to take yarn at another of said feed points, the needles in the lower cylinder aligned with jacks leaving the cross-over point along the lower path missing yarn at the last mentioned feed point.

45. A knitting machine comprising a pair of cylinders, double-ended needles slidable in said cylinders, sliders mounted in said cylinders and movable to control movements of said needles, means for feeding yarn to needles at a plurality of feed points, jacks individually aligned with said needles to impart longitudinal movements to the needles through associated sliders, means for selecting jacks to respective upper and lower paths in advance of one of said feed points, the jacks selected to the upper path raising their needles, means for presenting a wrap yarn to needles so raised, means for selecting jacks following the upper path to cause them to effect transfer of needles from the lower to the upper cylinder, means for causing jacks approaching a cross-over point along said respective upper and lower paths to follow crossing paths to leave the cross-over point along respective lower and upper paths, means for causing needles in both cylinders aligned with jacks following both of said paths to take yarn at the first mentioned feed point, and means for raising jacks which leave the cross-over point along the upper path to raise needles in the lower cylinder to take yarn at another of said feed points, the needles in the lower cylinder aligned with jacks leaving the cross-over point along the lower path missing yarn at the last mentioned feed point.

46. A knitting machine comprising a pair of cylinders, double-ended needles slidable in said cylinders, sliders mounted in said cylinders and movable to control movements of said needles, means for feeding yarn to said needles, means for presenting at least one wrap yarn to needles, means for effecting selective transfers of needles between the cylinders to provide links-links designs, and means actuating said sliders and said wrap yarn presenting means to produce wales having tuck designs formed therein by the concatenation of loops with combined loops drawn from a plurality of courses to form tuck stitches, and to produce wrapping of at least one stitch concatenated with a tuck stitch.

47. A knitting machine comprising a pair of cylinders, double-ended needles slidable in said cylinders, sliders mounted in said cylinders and movable to control movements of said needles, means for feeding at least two yarns to said needles, means for presenting at least one wrap yarn to needles, means for effecting selective transfers of needles between the cylinders to provide links-links designs, and means actuating said sliders and said wrap yarn presenting means to produce wales having tuck designs formed therein by the concatenation of loops with combined loops of different yarns drawn from a plurality of courses to form tuck stitches, and to produce wrapping of at least one stitch concatenated with a tuck stitch.

48. A multifeed knitting machine comprising a pair of cylinders, double-ended needles slidable in said cylinders, sliders mounted in said cylinders and movable to control movements of said needles, means for feeding at least two yarns to said needles at spaced feed points, and means for actuating said sliders to produce, in coursewise alignment with each other, a plurality of stitch structures, one comprising links-links patterns provided by stitches concatenated in both directions, another comprising concatenated stitches of one only of said yarns, certain of said last stitches being selectively held from a course preceding one in which a change of concatenation has occurred in the first of said structures, and a third structure comprising concatenated loops of another only of said yarns.

49. A knitting machine comprising a pair of cylinders, double-ended needles slidable in said cylinders, sliders mounted in said cylinders and movable to control movements of said needles, means for feeding at least one yarn to said needles, and means for actuating said sliders to produce, in coursewise alignment with each other, a plurality of stitch structures, one comprising links-links patterns provided by stitches concatenated in both directions, and another comprising stitches of said yarn concatenated in the same direction, certain of said last stitches being selectively held for more than one course from a course preceding one in which a change of concatenation has occurred in the first of said structures.

50. A knitting machine comprising a pair of cylinders, means for effecting rotation and reciprocation of said cylinders, double-ended needles slidable in said cylinders, sliders mounted in said cylinders and movable to control movements of said needles, means for feeding at least one yarn to said needles, means for actuating said sliders to produce, in coursewise alignment with each other during rotary knitting, a plurality of stitch structures, one comprising links-links patterns provided by stitches concatenated in both directions, and another comprising stitches of said yarn concatenated in the same direction, certain of said last stitches being selectively held for more than one course from a course preceding one in which a change of concatenation has occurred in the first of said structures, and means for actuating said sliders during reciprocatory knitting to form heel and toe pockets.

51. A knitting machine comprising a pair of cylinders, double-ended needles slidable in said cylinders, sliders mounted in said cylinders and movable to control movements of said needles, means for feeding at least one yarn to said needles, means for controlling any of said sliders to transfer needles between the cylinders, and means for holding selected stitches at a feed at which needles first knit following transfer including holding selected stitches on needles which have been transferred in a preceding course, all empty sliders following a path to receive transferred needles irrespective of selection of said held stitches.

52. A knitting machine comprising a pair of cylinders, double-ended needles slidable in said cylinders, sliders mounted in said cylinders and movable to control movements of said needles, means for feeding yarns to said needles at a plurality of feeds, means for controlling any of said sliders to transfer needles between the cylinders, and means for holding selected stitches at the feed at which needles first knit following transfer including holding selected stitches on needles which have been transferred in a preceding course, all empty sliders following a path to receive transferred needles irrespective of selection of said held stitches.

53. A knitting machine comprising a pair of cylinders, double-ended needles slidable in said cylinders, sliders mounted in said cylinders and movable to control movements of said needles, means for feeding at least one yarn to said needles, means for controlling any of said sliders to transfer needles between the cylinders, and means for holding selected stitches at a feed at which needles first knit following transfer including holding selected stitches on needles which have been transferred in a preceding course, all empty sliders following a path to receive transferred needles irrespective of selection of said held stitches, and means for actuating said sliders during reciprocatory knitting to form heel and toe pockets.

54. A knitting machine comprising a pair of cylinders, means for effecting rotation and reciprocation of said cylinders, double-ended needles slidable in said cylinders, sliders mounted in said cylinders and movable to control movements of said needles, means for feeding yarns to said needles at a plurality of feeds, means for controlling any of said sliders to transfer needles between the cylinders, and means for holding selected stitches during rotary knitting at the feed at which needles first knit following transfer including holding selected stitches on needles which have been transferred in a preceding course, all empty sliders following a path to receive transferred needles irrespective of selection of said held stitches, and means for actuating said sliders during reciprocatory knitting to form heel and toe pockets.

55. A knitting machine comprising first and second superposed cylinders, double-ended needles slidable in said cylinders, sliders mounted in said cylinders and movable to control movements of said needles, means for feeding yarn to needles at a plurality of feed points, jacks individually associated with said needles to impart longitudinal movements to the needles through associated sliders, means for selecting jacks to respective upper and lower paths in advance of one of said feed points, means for selecting jacks following one of said paths to cause them to effect transfer of needles from the first cylinder to the second cylinder, means for causing jacks approaching a cross-over point along said respective upper and lower paths to follow crossing paths to leave the cross-over point along respective lower and upper paths, and means for moving jacks which leave the cross-over point along one path to move their needles to take yarn at another of said feed points, the needles in the first cylinder associated with jacks leaving the cross-over point along the other path missing yarn at the last mentioned feed point.

56. A knitting machine comprising first and second superposed cylinders, double-ended needles slidable in said cylinders, sliders mounted in said cylinders and movable to control movements of said needles, means for feeding yarn to needles at a plurality of feed joints, jacks individually associated with said needles to impart longitudinal movements to the needles through associated sliders, means for selecting jacks to respective upper and lower paths in advance of one of said feed points, means for selecting jacks following one of said paths to cause them to effect transfer of needles from the first cylinder to the second cylinder, means for causing jacks approaching a cross-over point along said respective upper and lower paths to follow crossing paths to leave the cross-over point along respective lower and upper paths, means for causing needles associated with jacks following both of said paths to take yarn at the first mentioned feed point, and means for moving jacks which leave the cross-over point along one path to move their needles to take yarn at another of said feed points, the needles in the first cylinder associated with jacks leaving the cross-over point along the other path missing yarn at the last mentioned feed point.

57. A knitting machine comprising first and second superposed cylinders, double-ended needles slidable in said cylinders, sliders mounted in said cylinders and movable to control movements of said needles, means for feeding yarn to needles at a plurality of feed points, jacks individually associated with said needles to impart longitudinal movements to the needles through associated sliders, means for selecting jacks to respective upper and lower paths in advance of one of said feed points, means for selecting jacks following one of said paths to cause them to effect transfer of needles from the first cylinder to the second cylinder, means for causing jacks approaching a cross-over point along said respective upper and lower paths to follow crossing paths to leave the cross-over point along respective lower and upper paths, and means for moving jacks which leave the cross-over point along one path to move their needles to take yarn at another of said feed points, the needles in the first cylinder associated with jacks leaving the cross-over point along the other path missing yarn at the last mentioned feed point, and means for causing all sliders from which needles have been transferred to follow a path presenting such sliders to receive retransferred needles.

58. A knitting machine comprising first and second superposed cylinders, double-ended needles slidable in said cylinders, sliders mounted in said cylinders and movable to control movements of said needles, means for feeding yarn to needles at a plurality of feed points, jacks individually associated with said needles to impart longitudinal movements to the needles through associated sliders, means for selecting jacks to respective upper and lower paths in advance of one of said feed points, means for selecting jacks following one of said paths to cause them to effect transfer of needles from the first cylinder to the second cylinder, means for causing jacks approaching a cross-over point along said respective upper and lower paths to follow crossing paths to leave the cross-over point along respective lower and upper paths, means for causing only needles associated with jacks following one of said approach paths to take yarn at the first mentioned feed point, and means for moving jacks which leave the cross-over point along the leaving path corresponding to the other of said approach paths to move their needles to take yarn at another of said feed points, the needles in the first cylinder associated with jacks leaving the cross-over point along the other path missing yarn at the last mentioned feed point.

59. A knitting machine comprising first and second superposed cylinders, double-ended needles slidable in said cylinders, sliders mounted in said cylinders and movable to control movements of said needles, means for feeding yarn to needles at a plurality of feed points, jacks individually associated with said needles to impart longitudinal movements to the needles through associated sliders, means for selecting jacks to respective upper and lower paths in advance of one of said feed points, means for causing jacks approaching a cross-over point along said respective upper and lower paths to follow crossing paths to leave the cross-over point along respective lower and upper paths, means for selecting jacks from the group leaving the cross-over point along one of said paths to cause them to effect transfer of needles from the first cylinder to the second cylinder, and means for causing needles associated with jacks leaving the cross-over point along the same path to take yarn at another of said feeds.

60. A knitting machine comprising first and second superposed cylinders, double-ended needles slidable in said cylinders, sliders mounted in said cylinders and movable to control movements of said needles, means for feeding yarn to needles at a plurality of feed points, jacks individually associated with said needles to impart longitudinal movements to the needles through associated sliders, means for selecting jacks to respective upper and lower paths in advance of one of said feed points, means for causing jacks approaching a cross-over point along said respective upper and lower paths to follow crossing paths to leave the cross-over point along respective lower and upper paths, means for causing only needles associated with jacks approaching said cross-over point along one of said approach paths to take yarn at the first mentioned feed point, means for selecting jacks from the group leaving the cross-over point along the leaving path corresponding to the other of said approach paths to cause them to effect transfer of needles from the first cylinder to the second cylinder, and means for causing needles associated with jacks leaving the cross-over point along the last mentioned leaving path to take yarn at another of said feeds.

61. A knitting machine comprising first and second superposed cylinders, double-ended needles slidable in said cylinders, sliders mounted in said cylinders and movable to control movements of said needles, means for feeding yarn to needles at a plurality of feed points, jacks individually associated with said needles to impart longitudinal movements to the needles through associated sliders, means for selecting jacks to respective upper and lower paths in advance of one of said feed points, means for causing jacks approaching a cross-over point along said respective upper and lower paths to follow crossing paths to leave the cross-over point along respective lower and upper paths, means for selecting jacks from the group leaving the cross-over point along one of said paths to cause them to effect transfer of needles from the first cylinder to the second cylinder, and means for causing needles associated with jacks leaving the cross-over point along the same path to take yarn at another of said feeds, and means for causing all sliders from which needles have been transferred to follow a path presenting such sliders to receive retransferred needles.

62. A multifeed knitting machine comprising a pair of cylinders, double-ended needles slidable in said cylinders, sliders mounted in said cylinders and movable to control movements of said needles, means for feeding at least two yarns to said needles at spaced feed points, and means for actuating said sliders to produce, in coursewise alignment with each other, a plurality of stitch structures, one comprising links-links patterns provided by stitches concatenated in both directions, and another comprising concatenated stitches of one only of said yarns, drawn by needles in the same cylinder, certain of said last stitches being selectively knit at one feed point and others of said last stitches being selectively held at the same feed point from a course preceding one in which a change of concatenation has occurred in the first of said structures.

63. A multifeed knitting machine comprising a pair of cylinders, double-ended needles slidable in said cylinders, sliders mounted in said cylinders and movable to control movements of said needles, means for feeding at least two yarns to said needles at spaced feed points, and means for actuating said sliders to produce, in coursewise alignment with each other, a plurality of stitch structures, one comprising multifeed links-links patterns provided by stitches concatenated in both directions, and another comprising concatenated stitches of one only of said yarns drawn by needles in the same cylinder, certain of said last stitches being selectively knit at one feed point and the others of said last stitches being selectively held at the same feed point from a course preceding one in which a change of concatenation has occurred in the first of said structures.

64. A multifeed knitting machine comprising a pair of cylinders, double-ended needles slidable in said cylinders, sliders mounted in said cylinders and movable to control movements of said needles, means for feeding at least two yarns to said needles at spaced feed points, and means for actuating said sliders to produce, in coursewise alignment with each other, a plurality of stitch structures, one comprising links-links patterns provided by stitches concatenated in both directions, another comprising concatenated stitches of one only of said yarns drawn by needles in the same cylinder, certain of said last stitches being selectively knit at one feed point and the others of said last stitches being selectively held at the same feed point from a course preceding one in which a change of concatenation has occurred in the first of said structures, and a third structure comprising loops of both of said yarns concatenated in the same direction.

65. A multifeed knitting machine comprising a pair of cylinders, means for effecting rotation and reciprocation of said cylinders, double-ended needles slidable in said cylinders, sliders mounted in said cylinders and movable to control movements of said needles, means for feeding at least two yarns to said needles at spaced feed points, means for actuating said sliders to produce, in coursewise alignment with each other during rotary knitting, a plurality of stitch structures, one comprising links-links patterns provided by stitches concatenated in both directions, and another comprising concatenated stitches of one only of said yarns drawn by needles in the same cylinder, certain of said last stitches being selectively knit at one feed point and the others of said last stitches being selectively held at the same feed point from a course preceding one in which a change of concatenation has occurred in the first of said structures, and means for actuating said sliders during reciprocatory knitting to form heel and toe pockets.

66. A multifeed knitting machine comprising a pair of cylinders, double-ended needles slidable in said cylinders, sliders mounted in said cylinders and movable to control movements of said needles, means for feeding at least two yarns to said needles at spaced feed points, and means for actuating said sliders to produce, in both coursewise and walewise alignment with each other, a plurality of stitch structures, one comprising links-links patterns provided by stitches concatenated in both directions, and another comprising concatenated stitches of one only of said yarns drawn by needles in the same cylinder, certain of said last stitches being selectively knit at one feed point and the others of said last stitches being selectively held at the same feed point from a course preceding one in which a change of concatenation has occurred in the first of said structures, and certain wales containing both stitches concatenated in both directions and concatenated stitches of only the last-mentioned yarn.

67. A knitting machine comprising a pair of cylinders, double-ended needles slidable in said cylinders, sliders mounted in said cylinders and movable to control movements of said needles, means for feeding at least one yarn to said needles, means for controlling any of said sliders to transfer needles between the cylinders, and means for holding selected stitches on needles in one cylinder at a feed at which other needles in the same cylinder first knit following transfer, said transfer and holding of stitches occurring in the same course.

68. A knitting machine comprising a pair of cylinders, double-ended needles slidable in said cylinders, sliders mounted in said cylinders and movable to control movements of said needles, means for feeding yarns to said needles at a plurality of feeds, means for controlling any of said sliders to transfer needles between the cylinders, and means for holding selected stitches on needles in one cylinder at the feed at which other needles in the same cylinder first knit following transfer, said transfer and holding of stitches occurring in the same course.

69. A knitting machine comprising a pair of cylinders, means for effecting rotation and reciprocation of said cylinders, double-ended needles slidable in said cylinders, sliders mounted in said cylinders and movable to control movements of said needles, means for feeding at least one yarn to said needles, means for controlling any of said sliders to transfer needles between the cylinders, means for holding selected stitches on needles in one cylinder during rotary knitting at a feed at which other needles in the same cylinder first knit following transfer, said transfer and holding of stitches occurring in the same course, and means for actuating said sliders during reciprocatory knitting to form heel and toe pockets.

70. A knitting machine comprising a pair of cylinders, means for effecting rotation and reciprocation of said cylinders, double-ended needles slidable in said cylinders, sliders mounted in said cylinders and movable to control movements of said needles, means for feeding yarns to said needles at a plurality of feeds, means for controlling any of said sliders to transfer needles between the cylinders, and means for holding selected stitches on needles in one cylinder during rotary knitting at the feed at which other needles in the same cylinder first knit following transfer, said transfer and holding of stitches occurring in the same course, and means for actuating said sliders during reciprocatory knitting to form heel and toe pockets.

References Cited in the file of this patent

UNITED STATES PATENTS

| 1,434,108 | Egan | Oct. 31, 1922 |
| 1,922,119 | Bristow et al. | Aug. 15, 1933 |
| 2,019,396 | Deans et al. | Oct. 29, 1935 |

(Other references on following page)

UNITED STATES PATENTS

| | | |
|---|---|---|
| 2,027,276 | Grothey | Jan. 7, 1936 |
| 2,104,626 | Spiers et al. | Jan. 4, 1938 |
| 2,111,492 | Lawson et al. | Mar. 15, 1938 |
| 2,204,417 | Lawson | June 11, 1940 |
| 2,248,875 | Hutton et al. | July 8, 1941 |
| 2,258,569 | Holmes et al. | Oct. 7, 1941 |
| 2,313,642 | Holmes et al. | Mar. 9, 1943 |
| 2,362,041 | Wildt et al. | Nov. 7, 1944 |
| 2,376,246 | Getaz | May 15, 194? |
| 2,387,253 | Getaz | Oct. 23, 194? |
| 2,412,248 | Bristow | Dec. 10, 1946 |
| 2,464,126 | Fregeolle | Mar. 8, 194? |

FOREIGN PATENTS

| | | |
|---|---|---|
| 413,042 | Great Britain | July 12, 193? |
| 426,276 | Great Britain | Apr. 1, 193? |